Figure 1:
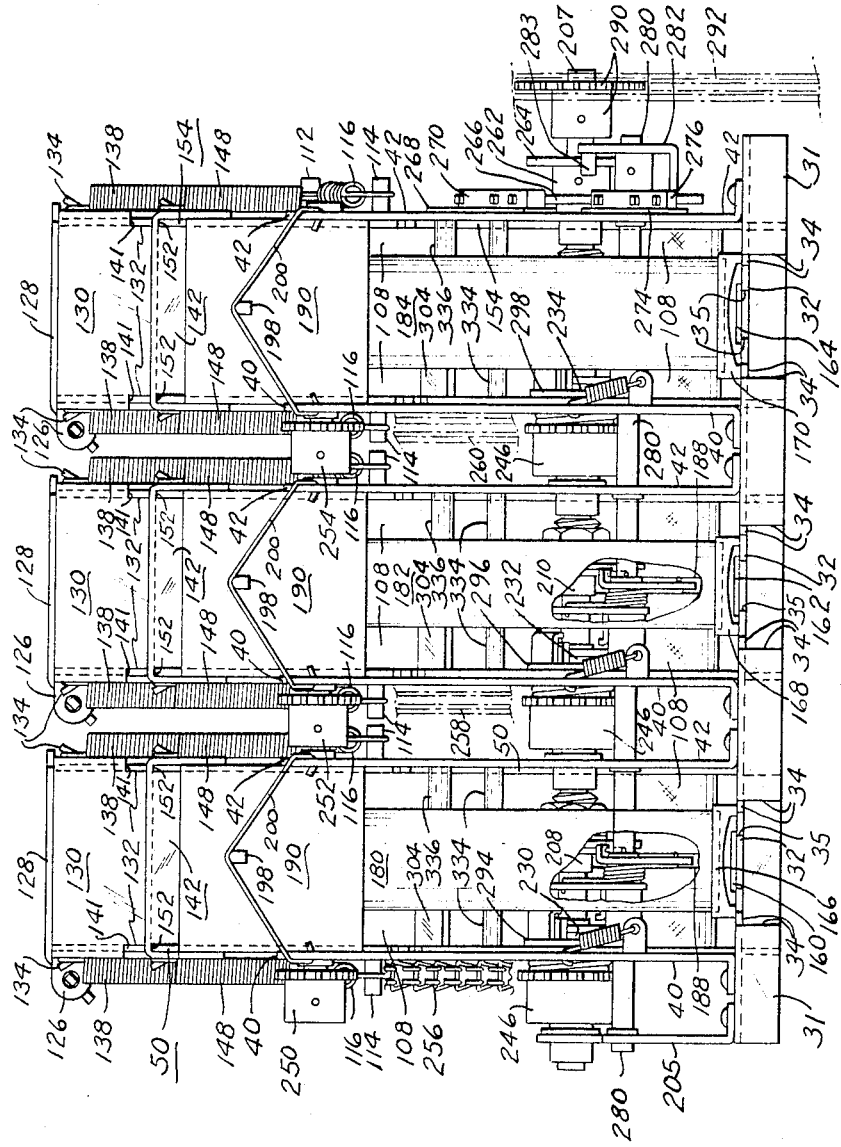

Oct. 25, 1966  G. F. ERICKSON  3,280,827
MONEY-HANDLING DEVICES
Original Filed Sept. 20, 1962  11 Sheets-Sheet 1

INVENTOR.
GUSTAV F. ERICKSON
BY
Rey Eilers
ATTORNEY.

Oct. 25, 1966  G. F. ERICKSON  3,280,827
MONEY-HANDLING DEVICES
Original Filed Sept. 20, 1962  11 Sheets-Sheet 2

INVENTOR.
GUSTAV F. ERICKSON
BY Roy Eilers
ATTORNEY.

Oct. 25, 1966          G. F. ERICKSON                 3,280,827
                     MONEY-HANDLING DEVICES
Original Filed Sept. 20, 1962                      11 Sheets-Sheet 3

INVENTOR.
GUSTAV F. ERICKSON
BY Roy Eilers
ATTORNEY.

Oct. 25, 1966     G. F. ERICKSON     3,280,827
MONEY-HANDLING DEVICES
Original Filed Sept. 20, 1962     11 Sheets-Sheet 4
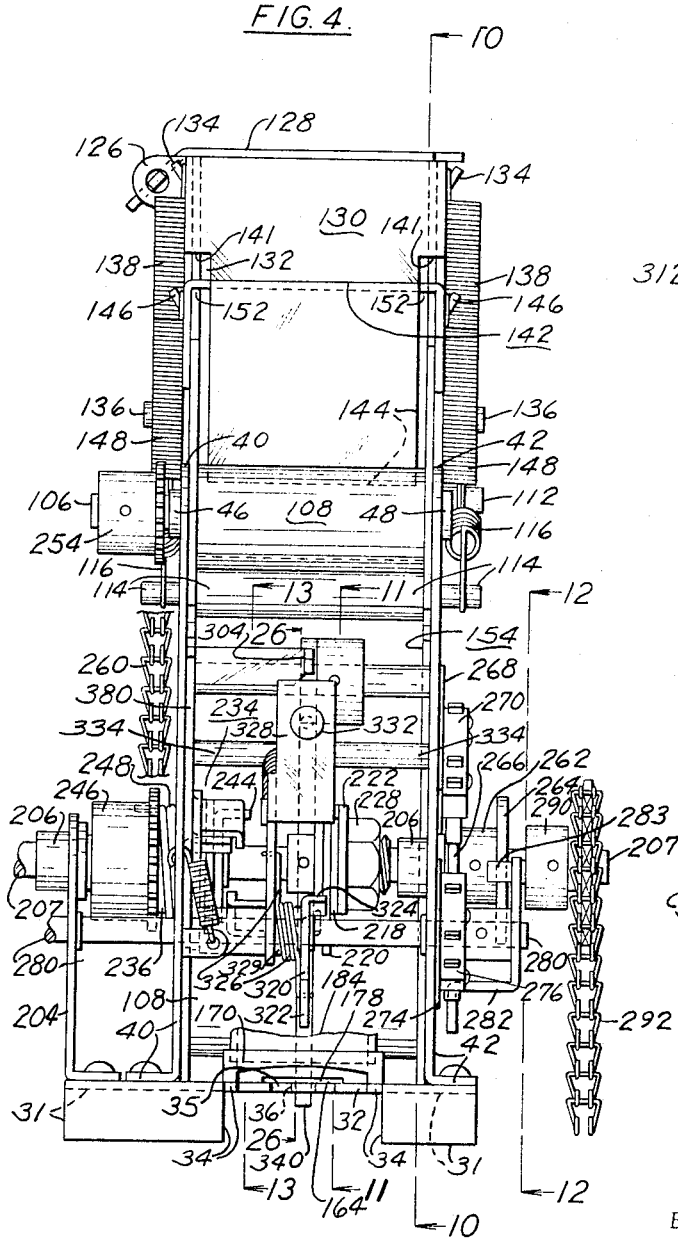
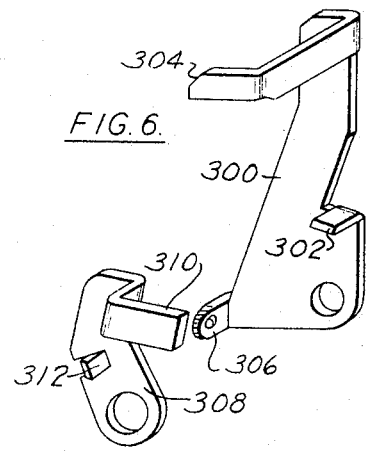
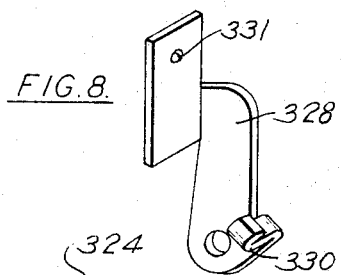
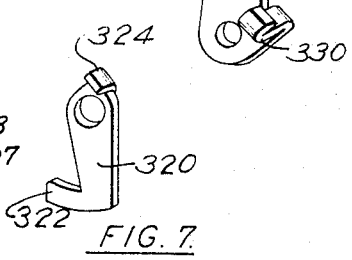
INVENTOR.
GUSTAV F. ERICKSON
BY Roy Eilers
ATTORNEY.

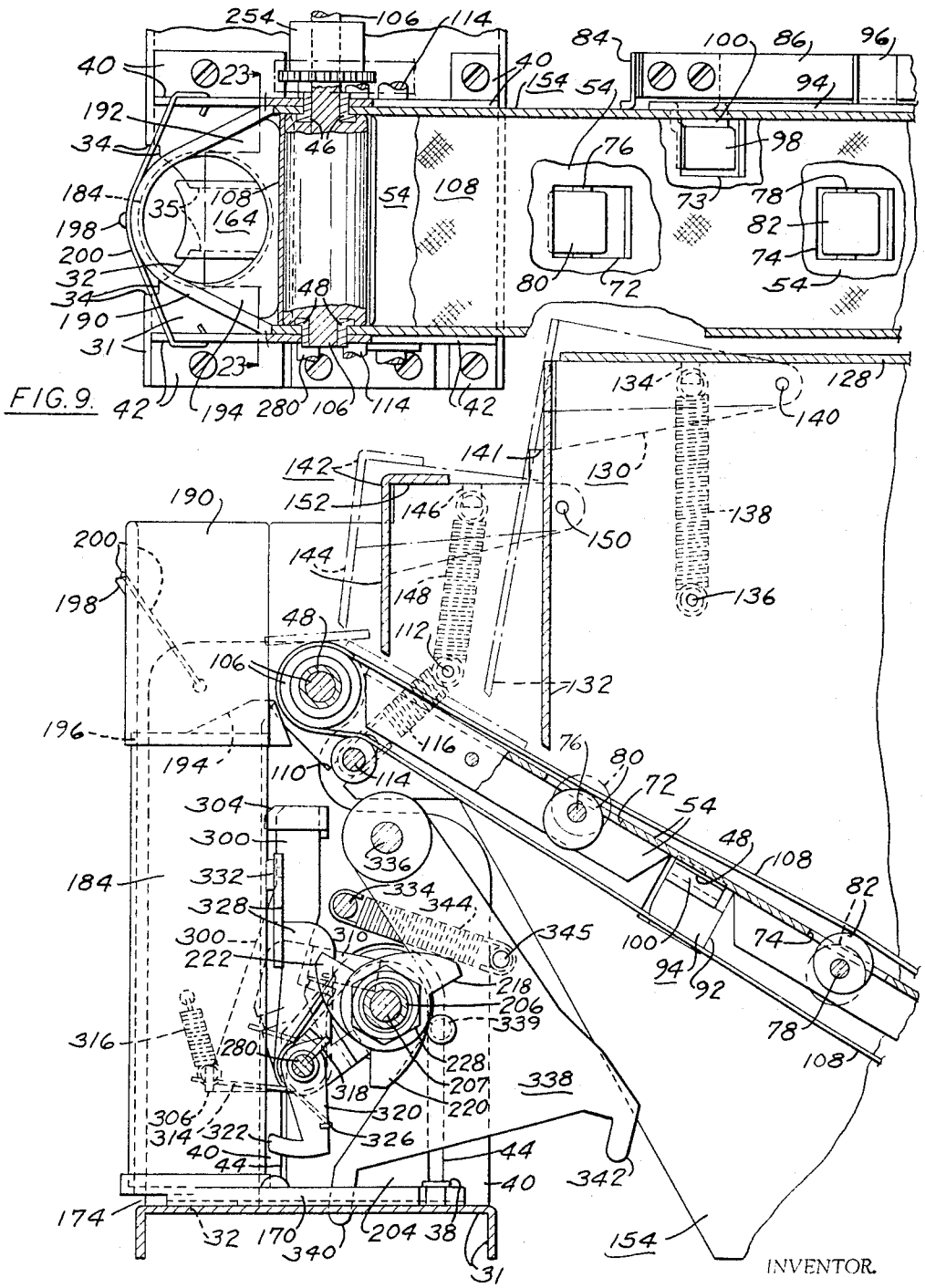

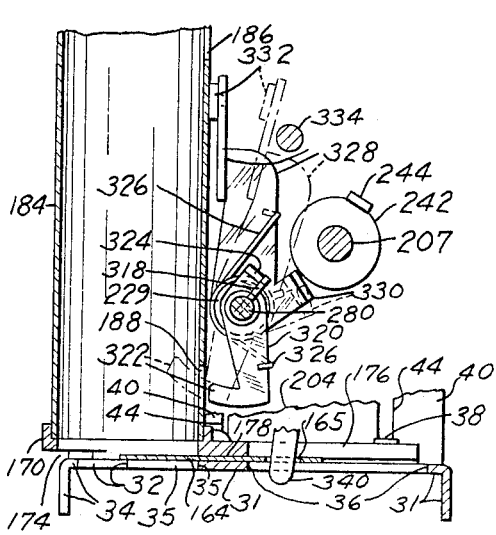
FIG. 11.
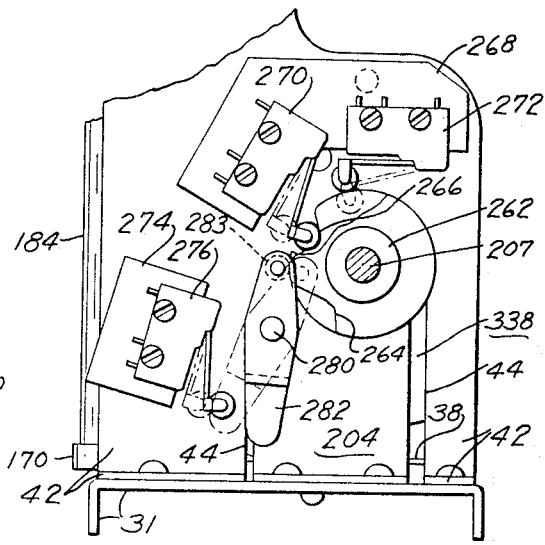
FIG. 12.
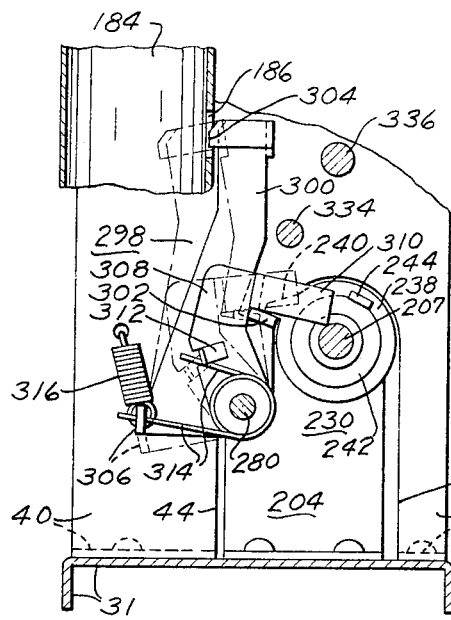
FIG. 13.
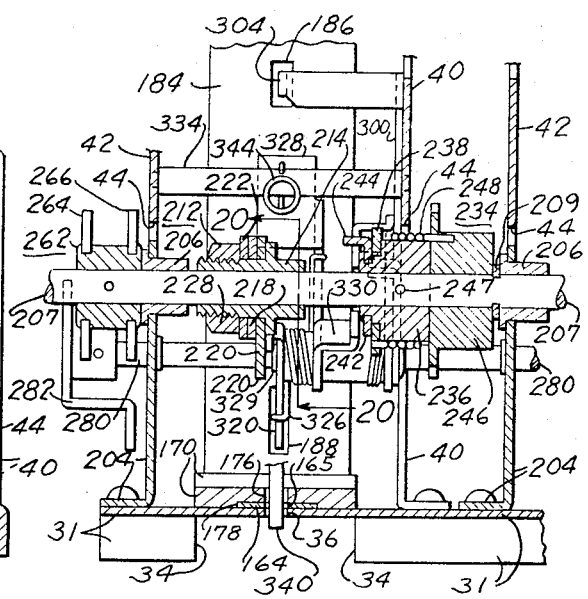
FIG. 14.
INVENTOR.
GUSTAV F. ERICKSON
BY
ATTORNEY.

Oct. 25, 1966   G. F. ERICKSON   3,280,827
MONEY-HANDLING DEVICES
Original Filed Sept. 20, 1962   11 Sheets-Sheet 7

INVENTOR.
GUSTAV F. ERICKSON
BY
*Rey Eilers*
ATTORNEY.

Oct. 25, 1966  G. F. ERICKSON  3,280,827
MONEY-HANDLING DEVICES
Original Filed Sept. 20, 1962  11 Sheets-Sheet 8

INVENTOR.
GUSTAV F. ERICKSON
BY
Rey Eilers
ATTORNEY.

INVENTOR.
GUSTAV F. ERICKSON
BY
Roy Eilers
ATTORNEY.

Oct. 25, 1966 G. F. ERICKSON 3,280,827
MONEY-HANDLING DEVICES
Original Filed Sept. 20, 1962 11 Sheets-Sheet 10
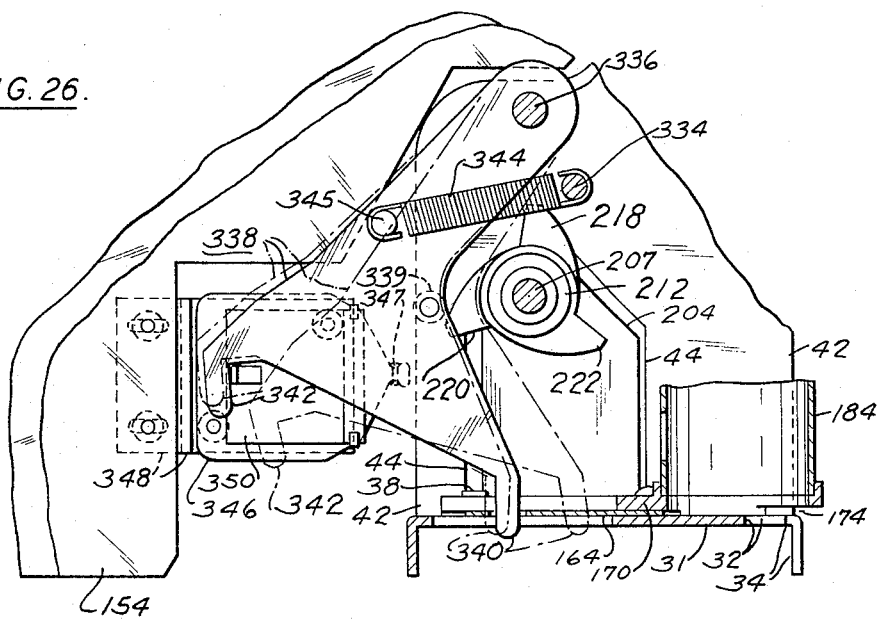
FIG. 26.
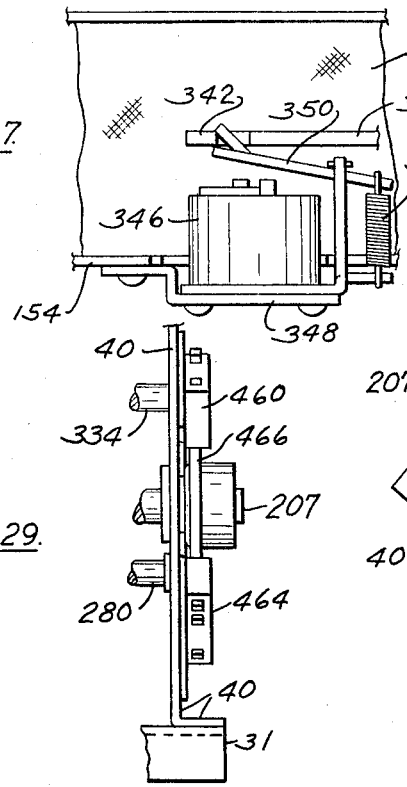
FIG. 27.
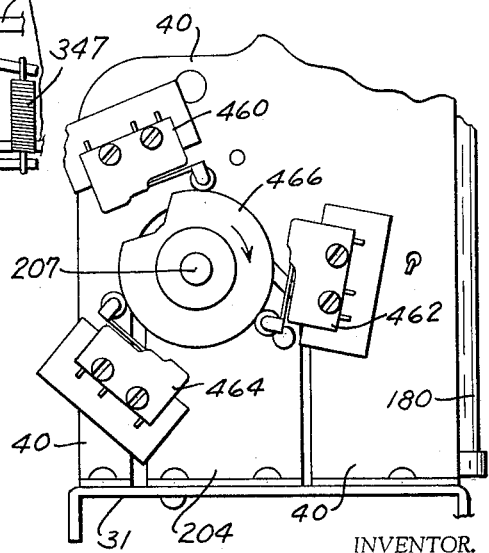
FIG. 28.
FIG. 29.
INVENTOR.
GUSTAV F. ERICKSON
BY Rey Eilers
ATTORNEY.

Oct. 25, 1966      G. F. ERICKSON      3,280,827

MONEY-HANDLING DEVICES

Original Filed Sept. 20, 1962      11 Sheets-Sheet 11

INVENTOR.
GUSTAV F. ERICKSON
BY
Roy Eilers
ATTORNEY.

United States Patent Office 3,280,827
Patented Oct. 25, 1966

3,280,827
MONEY-HANDLING DEVICES
Gustav F. Erickson, Kirkwood, Mo., assignor to National Rejectors, Inc., St. Louis, Mo., a corporation of Missouri
Continuation of application Ser. No. 225,027, Sept. 20, 1962. This application June 11, 1965, Ser. No. 467,813
46 Claims. (Cl. 133—4)

This invention relates to improvements in Money-Handling Devices. More particularly, this invention relates to improvements in coin-dispensing devices, and is a continuation of application Serial No. 225,027, filed September 20, 1962 now abandoned.

It is, therefore, an object of the present invention to provide an improved coin-dispensing device.

Coin-dispensing devices customarily hold coins in vertically-directed tubes and use coin ejectors adjacent the outlets of those tubes to dispense the desired coins. Where the coin-dispensing devices will, during the operation thereof, receive coins that are inserted by patrons and that can replace the coins dispensed by those devices, the coin-holding capacities of those coin-dispensing devices do not have to be very large. However, where a coin-dispensing device will not, during the operation thereof, receive coins that are inserted by patrons and that can replace the coins dispensed by that device, the coin-holding capacity of that device must be very large. In application Serial No. 35,504 of Francis T. Vaccaro, Jerome Buddenbaum and myself for Coin Separators which was filed on June 13, 1960, and which became Patent No. 3,138,165, elongated tubes were used to provide the required large coin-holding capacity. Such elongated tubes are quite usable; but it is not always commercially desirable or practical to design money-actuated devices so they have tall spaces therein to accommodate such elongated tubes. Consequently, it would be desirable to provide a coin-dispensing device which used a short tube but which had a large coin-holding capacity. The present invention provides such a coin-dispensing device; and it does so by mounting a coin-holding hopper adjacent the tube and by recurrently transferring coins from that hopper to that tube. It is, therefore, an object of the present invention to provide a coin-dispensing device which has a short tube and which has a coin-holding hopper adjacent that tube, and which recurrently transfers coins from that hopper to that tube.

The present invention makes it possible to transfer coins from the hopper to the tube at a rate which is at least as great as the rate at which that tube dispenses coins. Such an arrangement is very desirable because it makes the use of a very short tube quite practical. It is, therefore, an object of the present invention to provide a coin-dispensing device which has a hopper and a tube and which transfers coins from that hopper to that tube at a rate which is at least as great as the rate at which that tube dispenses coins.

The hopper of the coin-dispensing device provided by the present invention can receive coins of random orientation; and that coin-dispensing device can thereafter cause those coins to assume a desired orientation as they enter and come to rest within the tube of that device. The coin-dispensing device provided by the present invention orients the coins with minimal wearing of the surfaces of those coins, and thereby avoids injury to those coins and also avoids the formation of metal dust that could interfere with proper operation of that coin-dispensing device. It is, therefore, an object of the present invention to provide a coin-dispensing device which has a hopper that can receive coins of random orientation, which can thereafter cause those coins to assume a proper orientation as they enter and come to rest within the tube of that device, and which can orient those coins with minimal wearing of the surfaces of those coins.

The hopper of the coin-dispensing device provided by the present invention has an endless belt which serves as a portion of the bottom of that hopper; and the upper face of that belt can be caused to move toward the tube of the coin-dispensing device. In serving as a portion of the bottom of the hopper, the belt underlies and helps support the coins; and, in having the upper face thereof move toward the tube, that belt helps transfer coins from the hopper to the tube. The belt of the coin-dispensing device provided by the present invention thus performs a dual function. Further, in performing that dual function, that belt obviates any inefficiencies and any errors of operation which could arise if the coins were supported on one member and moved toward the tube by a separate and additional member. It is, therefore, an object of the present invention to provide a hopper with an endless belt which serves as a portion of the bottom of that hopper and which has the upper face thereof movable toward the tube of that device.

The hopper of the coin-dispensing device provided by the present invention has a gate with an edge that is spaced from the upper face of the belt a distance greater than the thicknesses of the coins held within that hopper but that is spaced from that belt a distance less than twice the thicknesses of those coins. Further, that gate is mounted adjacent the outlet-end of the hopper so coins passing from that hopper to the coin tube must pass under the edge of that gate. In addition, that gate is mounted so it will move rather than permit coins to jam against it; but that gate will be sufficiently resistant to moving to hold back coins that are superimposed on other coins. As a result, that gate will usually permit just the lowermost coin of a group of superimposed coins to pass to the tube of the coin-dispensing device. It is, therefore, an object of the present invention to provide the hopper of a coin-dispensing device with a gate that is spaced from the belt of that hopper and that can intercept coins which are superimposed upon other coins and that can hold back those superimposed coins while permitting those other coins to pass to the tube.

The hopper of the coin-dispensing device provided by the present invention has a second gate that is generally similar to the first gate. That second gate is disposed between the first gate and the tube; and if, somehow, some superimposed coins manage to pass under the edge of the first gate, the edge of the second gate will intercept and hold back these superimposed coins. This means that the first gate will provide the initial resistance to the movement of superimposed coins and that the second gate will provide the final resistance to the movement of superimposed coins. It is, therefore, an object of the present invention to provide two gates adjacent a hopper and to mount those gates so they are in tandem.

A funnel is provided for the tube of the coin-dispensing device of the present invention; and that funnel has an entrance which is wide enough to accommodate all coins that are moved toward the tube by the belt. That funnel has two vertically-spaced and horizontally-displaced coin-guiding surfaces; and those surfaces are intended to receive coins which leave the belt and enter the funnel in side-by-side relation, and are also intended to guide those coins into the tube. Because those coin-guiding surfaces are disposed at different levels, one of those coin-guiding surfaces will intercept and momentarily hold one of those side-by-side coins before the other of those coin-guiding surfaces intercepts the other of those side-by-side coins. The interception and momentary holding of that one coin will enable the other coin-guiding surface to start the other coin into the tube before that one coin reaches the entrance to that tube. In this way, that funnel avoids any tendency of side-by-side coins to bridge in position above the upper end of the tube. It is, therefore, an object of the present invention to provide a funnel, for the tube of a coin-dispensing device, with two coin-guiding surfaces that are vertically spaced and are horizontally-displaced to cause side-by-side coins to pass consecutively into that tube without bridging in position above the upper end of that tube.

The coins within the hopper of the coin-dispensing device of the present invention tend to assume positions wherein the frictional forces between themselves and the belt of that hopper are minimal. It would be undesirable to permit those coins to assume positions wherein the frictional forces between themselves and that belt were so small that the belt would move but the coins would not. To keep the coins from assuming such positions, the present invention provides eccentrics which are mounted beneath the upper surface of the belt and which periodically force portions of the belt upwardly to force some of the coins to move upwardly. This periodic raising of portions of the belt and of some of the coins tends to cause the coins to move around within the hopper and to assume positions wherein the frictional forces between those coins and the belt are sufficient to assure movement of the coins with the belt. It is, therefore, an object of the present invention to provide eccentrics that periodically force portions of the belt in a coin hopper to move upwardly and thereby force some of the coins within that hopper to move upwardly.

The present invention also provides a member that periodically applies sharp blows to the belt to impart sharp blows to the coins resting on that belt. That member is dimensioned so it applies those sharp blows at just one edge of the belt; and that is important because those blows can be sufficient to force coins on that one edge of the belt to roll back toward the bottom of the hopper, when that hopper is almost empty. However, by restricting the blows to just one edge of the belt, the present invention permits coins to move uninterruptedly along the opposite edge of that belt and thus to the tube. It is, therefore, an object of the present invention to provide a member which periodically applies sharp blows to just one edge of the belt in a hopper of a coin-dispensing device.

The present invention also provides a member which extends into the hopper to apply sharp blows directly to the coins within that hopper. Those blows will force some of the coins to move around within that hopper, and will thereby keep those coins from settling in positions which enable those coins to have minimal frictional forces between themselves and the belt. The blows applied by that member can be so sharp that coins could tend to be thrown up onto the belt adjacent one of the gates. To prevent coins from being so thrown, a resiliently-mounted rod is disposed in the path of coins which could otherwise be so thrown. That rod is spaced far enough from the belt so it will not cause a jam, and the resilient mounting of that rod will absorb much of the momentum of the coins thrown toward that rod. It is, therefore, an object of the present invention to provide a member which can extend into the hopper of a coin-dispensing device to apply sharp blows to the coins within that hopper, and to provide a resiliently-mounted rod within that hopper which can intercept coins that might otherwise be thrown onto the forward end of the belt by those sharp blows.

When coins are repeatedly moved relative to each other, those coins can abrade each other; and any such abrading is undesirable. Hence it would be desirable to avoid all needless relative movement of the coins in the hopper. The present invention avoids all needless relative movement of the coins in the hopper by moving those coins only when the level of coins in the tube has fallen below a predetermined value. Furthermore, all movement of the coins will be stopped when the level of the coins in the tube has again attained that value. As a result, very little or no abrading of coins within the hopper will be experienced. It is, therefore, an object of the present invention to provide a hopper which moves the coins therein only when the level of the coins in the tube associated with that hopper falls below a predetermined value.

The hopper provided by the present invention is mounted so it can be rotated to a raised position; and, in that raised position, that hopper can release the coins held therein. Those coins will slide along the upper surface of the belt and between that surface and the edges of the gates to a suitable receptacle which can be set under the end of the belt. Such a mounting of the hopper facilitates easy and rapid emptying of the hopper whenever the amount of money in that hopper is to be checked. It is, therefore, an object of the present invention to mount the hopper of a coin-dispensing device so it can be rotated to a raised position wherein it can release the coins held therein.

Other and further objects and advantages of the present invention should become apparent from an examination of the drawing and accompanying description.

In the drawing and accompanying description, two preferred embodiments of the present invention are shown and described but it is to be understood that the drawing and accompanying description are for the purpose of illustration only and do not limit the invention and that the invention will be defined by the appended claims.

Figure 2:
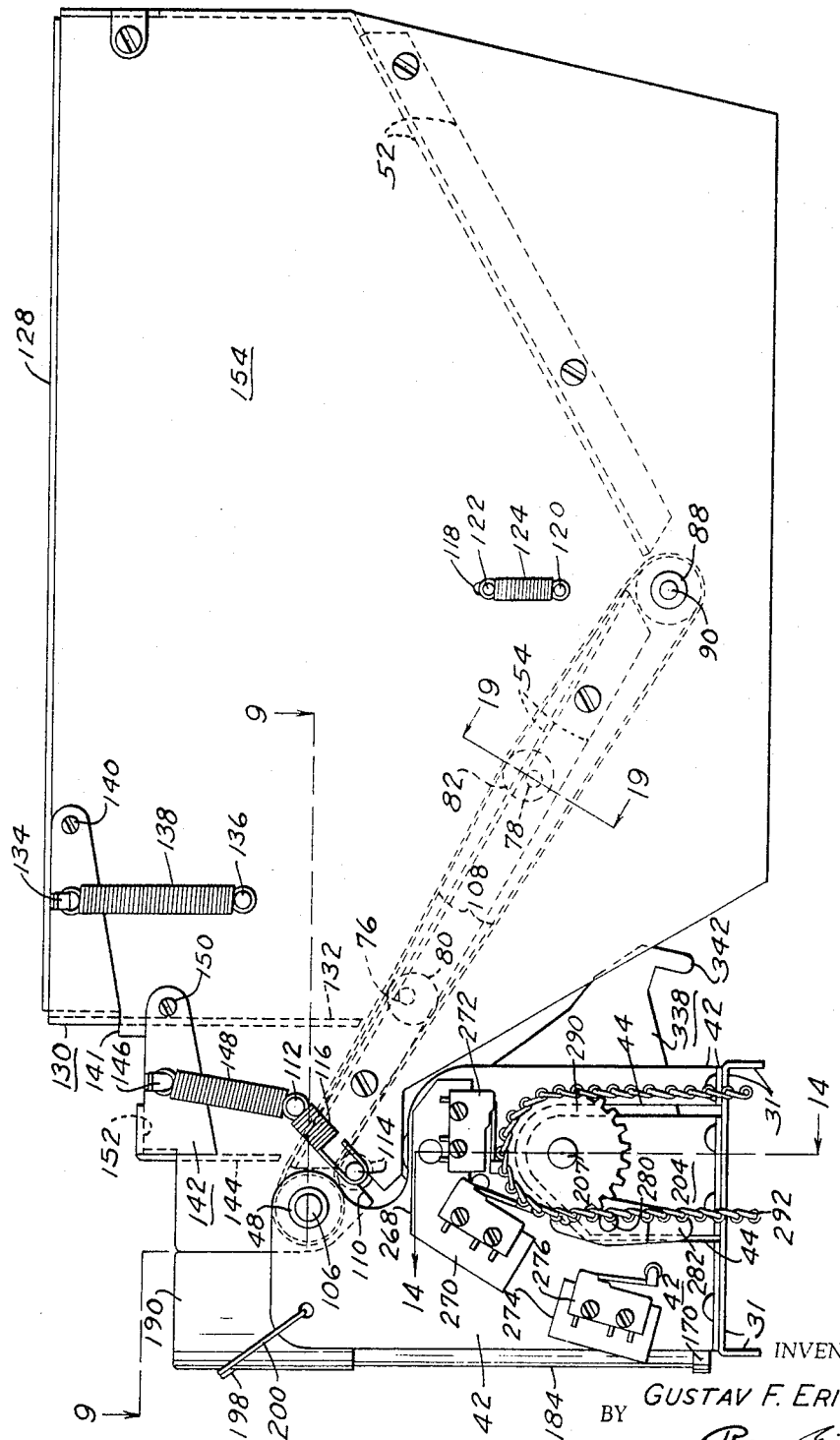
Figure 3:
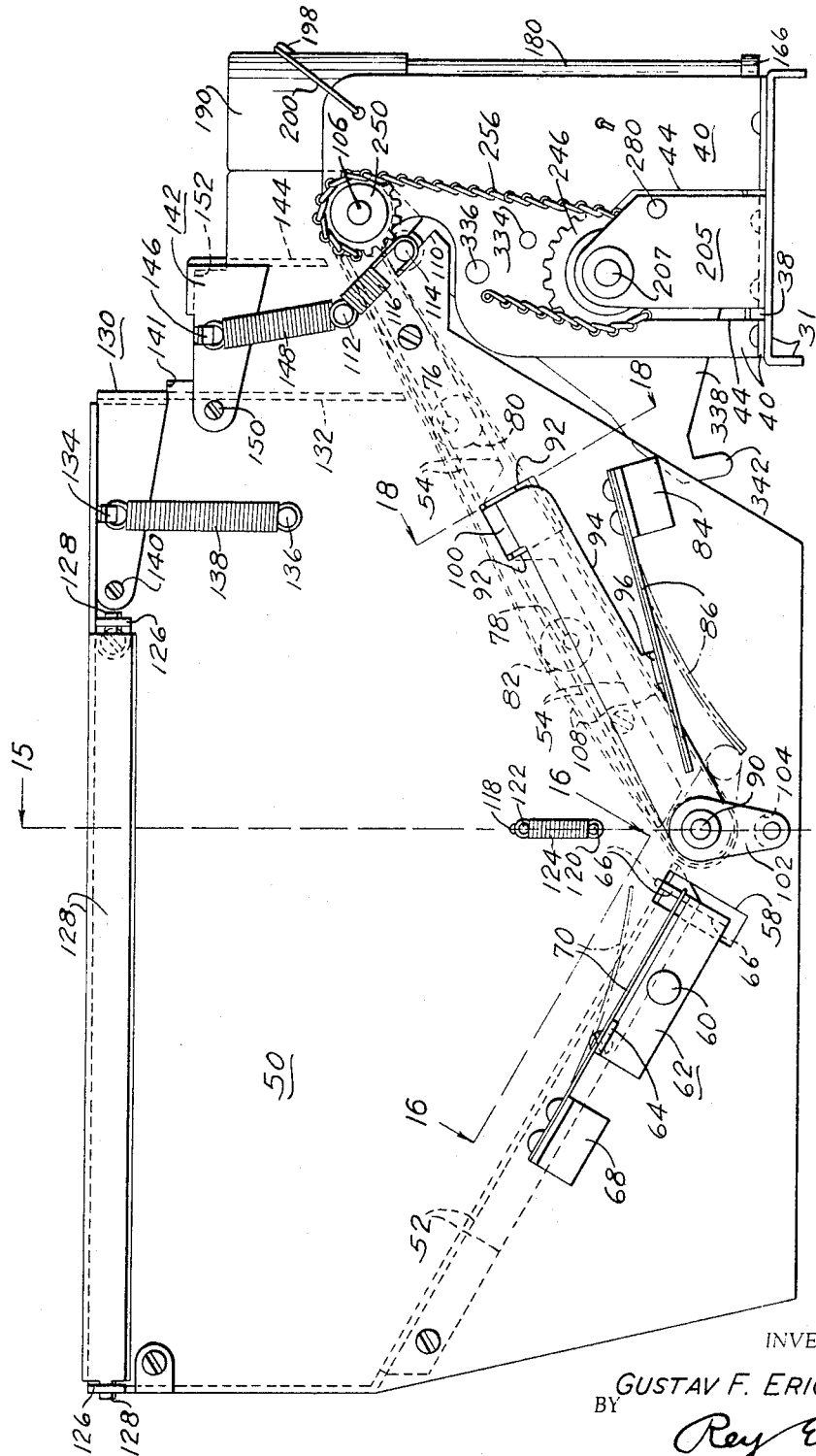
Figure 15:
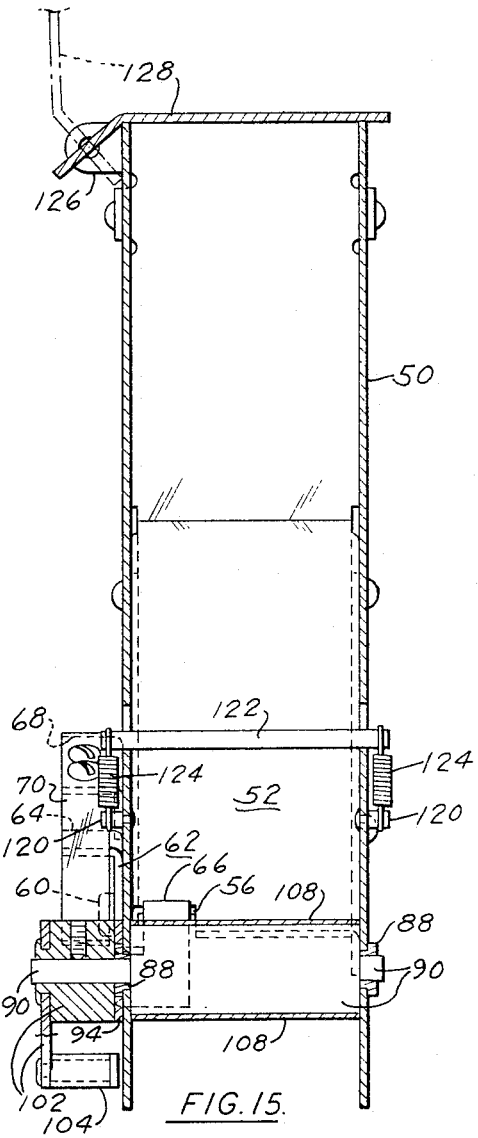
Figure 19:
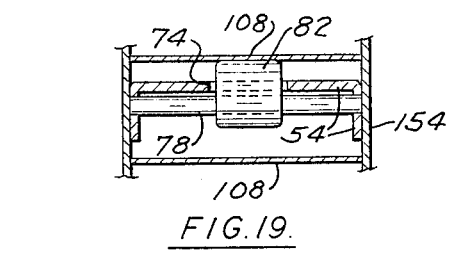
Figure 16:
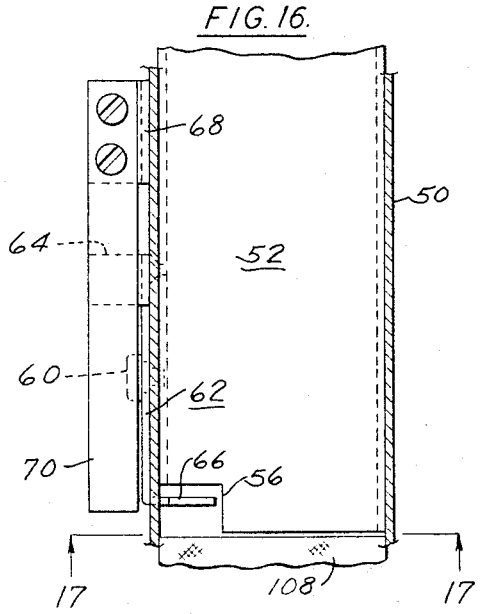
Figure 17:
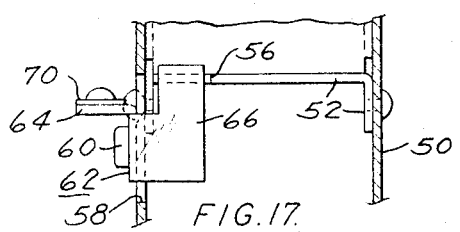
Figure 18:
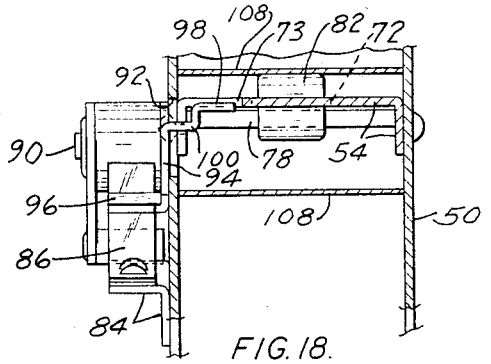
Figure 20:
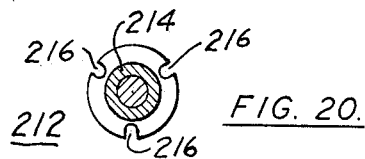
Figures 21, 22:
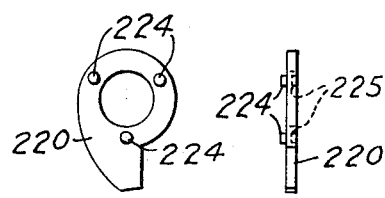
Figure 23:
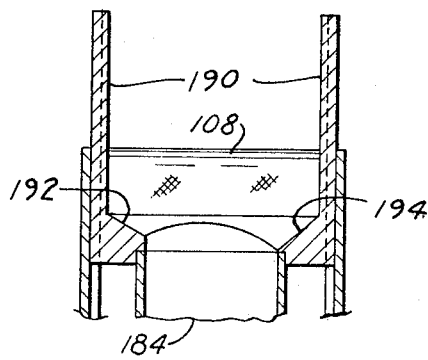
Figure 24:
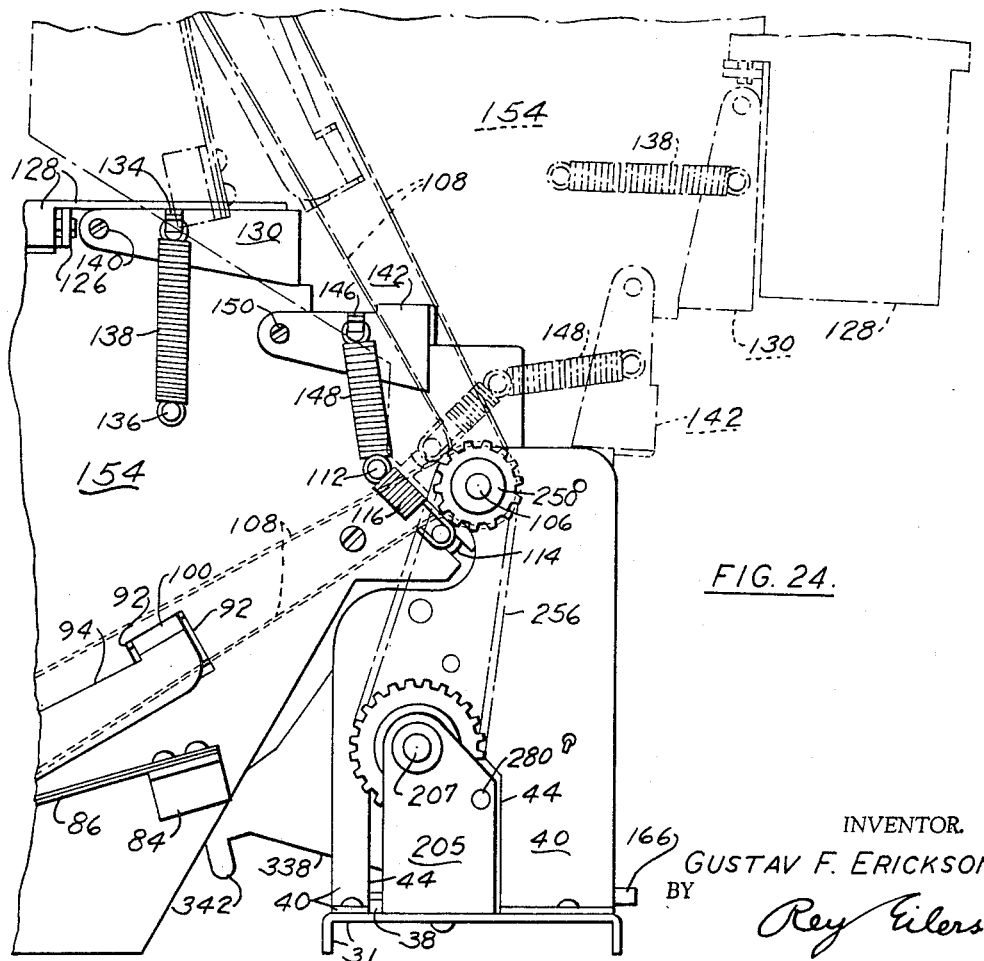
Figure 25:
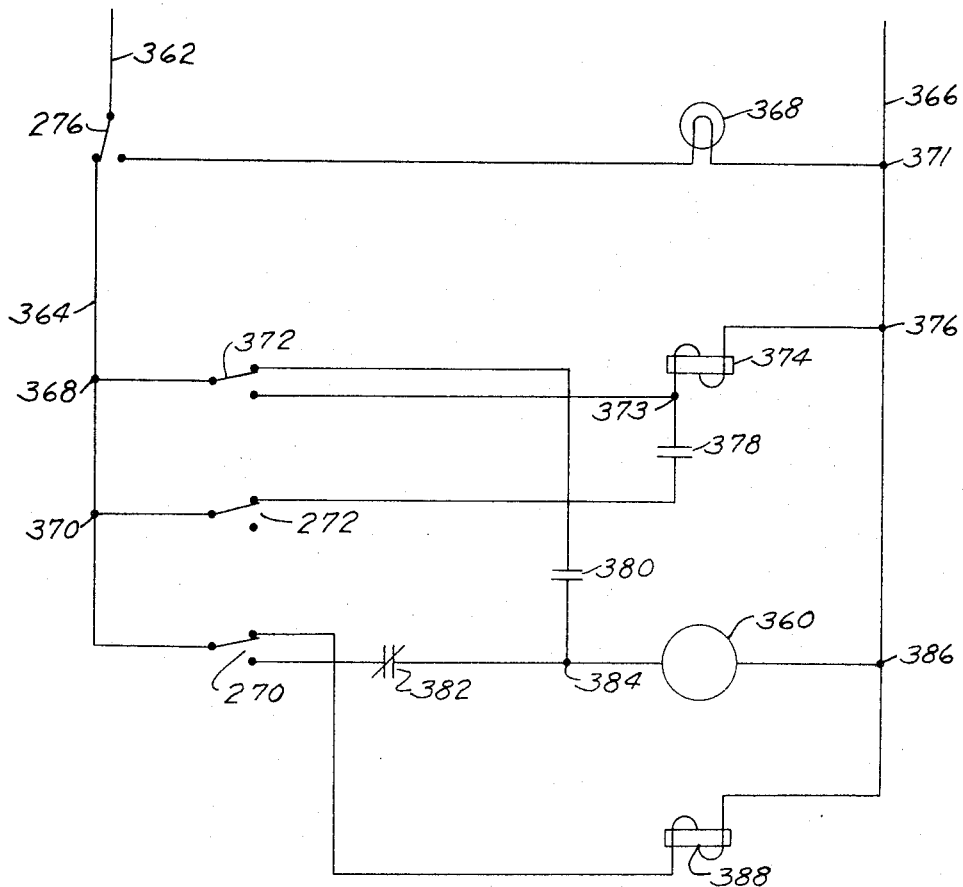

FIGURE 1 is a partially broken-away, front elevational view of one embodiment of money-handling device that is made in accordance with the principles and teachings of the present invention, FIGURE 2 is an elevational view of the right-hand side of the money-handling device of FIGURE 1, FIGURE 3 is an elevational view of the left-hand side of the money-handling device of FIGURE 1, FIGURE 4 is a partially broken-away, front elevational view, on a larger scale, of a portion of the money-handling device of FIGURE 1, FIGURE 5 is a perspective view, on the scale of FIGURE 4, of a lever that is used in the money-handling device of FIGURE 1, FIGURE 6 is a perspective view, on the scale of FIGURE 4, of a further lever that is used in the money-handling device of FIGURE 1, FIGURE 7 is a perspective view, on the scale of FIGURE 4 of the empty feeler that is used in the money-handling device of FIGURE 1, FIGURE 8 is a perspective view, on the scale of FIGURE 4, of a tapper that is used in the money-handling device of FIGURE 1, FIGURE 9 is a partially broken-away, sectional view of the portion of the money-handling device shown in FIGURE 4, and it is taken along the broken plane indicated by the broken line 9—9 in FIGURE 2, FIGURE 10 is a sectional view through the portion of the money-handling device shown in FIGURE 4, and it is taken along the plane indicated by the line 10—10 in FIGURE 4, FIGURE 11 is a sectional view through the lower part of the portion of the money-handling device shown in FIGURE 4, and it is taken along the plane indicated by the line 11—11 in FIGURE 4, FIGURE 12 is another sectional view through the lower part of the portion of the money-handling device shown in FIGURE 4, and it is taken along the plane indicated by the line 12—12 in FIGURE 4, FIGURE 13 is still another sectional view through the lower part of the portion of the money-handling device shown in FIGURE 4, and it is taken along the plane indicated by the line 13—13 in FIGURE 4, FIGURE 14 is a sectional view through the money-handling device of FIGURE 1, and it is taken along the plane indicated by the line 14—14 in FIGURE 2, FIGURE 15 is a sectional view through the portion of the money-handling device shown in FIGURE 3, and it is taken along the plane indicated by the line 15—15 in FIGURE 3, FIGURE 16 is a sectional view in plan, on the scale of FIGURE 15, through the portion of the money-handling device shown in FIGURE 3, and it is taken along the plane indicated by the line 16—16 in FIGURE 3, FIGURE 17 is a sectional view, on the scale of FIGURE 15, and it is taken along the plane indicated by the line 17—17 in FIGURE 16, FIGURE 18 is a sectional view through the portion of the money-handling device shown in FIGURE 3, and it is taken along the plane indicated by the line 18—18 in FIGURE 3, FIGURE 19 is a sectional view through the portion of the money-handling device shown in FIGURE 2, and it is taken along the plane indicated by the line 19—19 in FIGURE 2, FIGURE 20 is a sectional view of one of the coin-ejecting cams of money-handling device of FIGURE 1, and it is taken along the plane indicated by the line 20—20 in FIGURE 14, FIGURE 21 is an elevational view of the left-hand side of one of the lobe-forming plates of the cam of FIGURE 20, FIGURE 22 is a front elevational view of the lobe-forming plate of FIGURE 21, FIGURE 23 is a sectional view through one of the funnels of the money-handling device of FIGURE 1, and it is taken along the broken plane indicated by the broken line 23—23 in FIGURE 9, FIGURE 24 is a fragmentary view which is similar to FIGURE 3, and it shows the normal position of the hopper of FIGURE 3 by solid lines and shows the rotated position of that hopper by dotted lines, FIGURE 25 is a circuit diagram of the money-handling device of FIGURE 1, FIGURE 26 is a sectional view, on an enlarged scale, of the coin-dispensing portion of a modified form of money-handling device that is made in accordance with the principles and teachings of the present invention, and it is taken along the plane indicated by the line 26—26 in FIGURE 4, FIGURE 27 is a bottom view of a part of the coin-dispensing portion shown in FIGURE 26.

Figure 30:
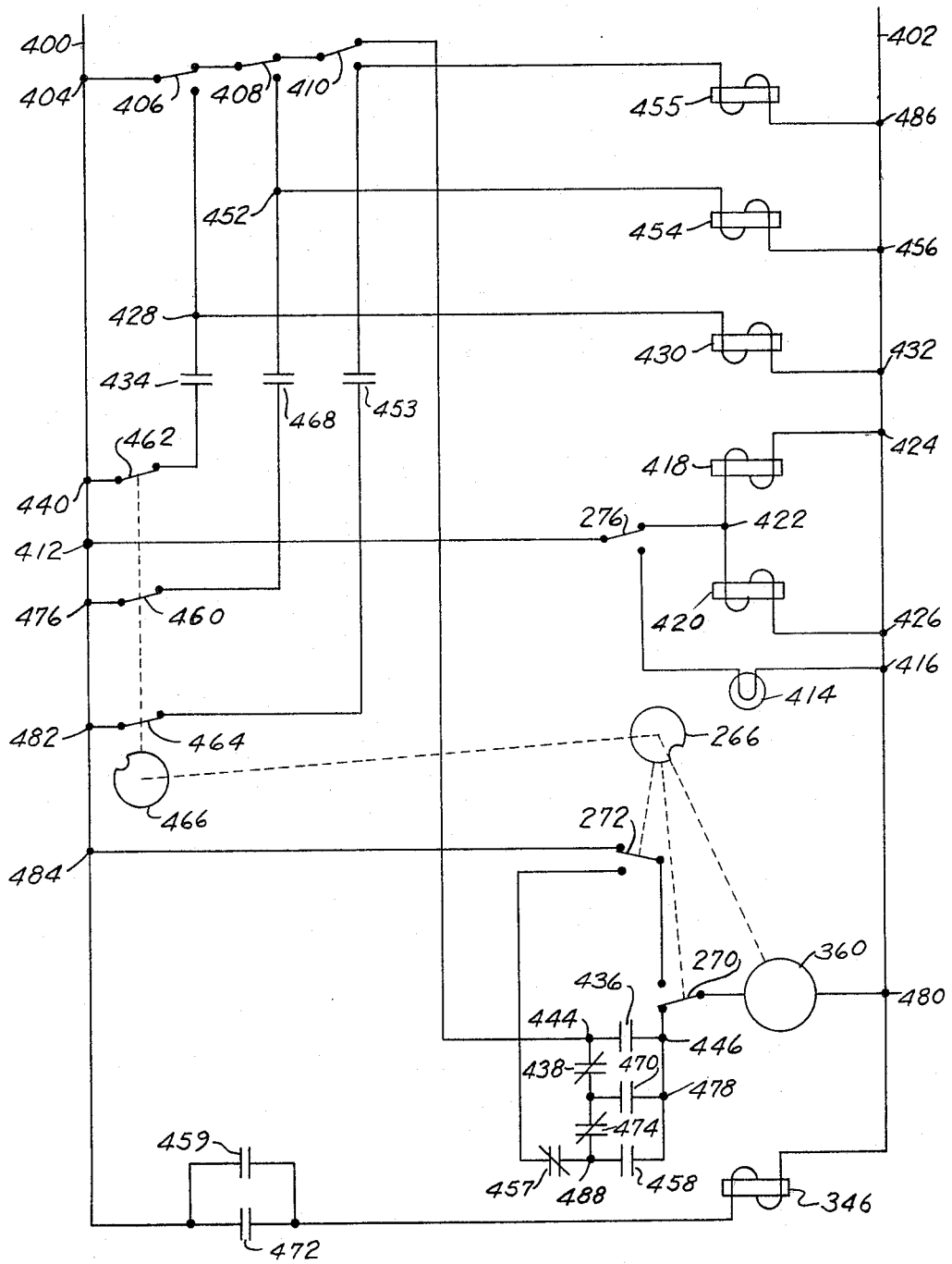

FIGURE 28 is an elevational view of part of the left-hand end of the modified form of money-handling device of FIGURE 26, FIGURE 29 is a rear elevational view of the part, of the left-hand end of the modified form of money-handling device, which is shown in FIGURE 28, and FIGURE 30 is a circuit diagram of the modified form of money-handling device of FIGURE 26.

Referring to FIGURES 1–25 in detail, the numeral 31 denotes the base of one embodiment of money-handling device that is made in accordance with the principles and teachings of the present invention. That base is elongated; and it has downwardly-directed flanges at the front and rear edges thereof. As a result, the base 31 has the configuration of a shallow channel, as indicated particularly by FIGURES 2 and 3. Three arcuate notches 32 are formed in the web of the base 31 adjacent the front edge of that base, and one of those notches is shown in FIGURE 9. Three generally rectangular notches 34 are formed in the front flange of the base 31 adjacent the arcuate notches 32; and all of those rectangular notches are shown in elevation in FIGURE 1 while one of those rectangular notches is shown in plan by FIGURE 9. Short, wide notches 35 extend rearwardly from the notches 32 to accommodate bent coins with convex lower faces, thereby facilitating the dispensing of such coins. The base 31 has three elongated slots 36 which are spaced rearwardly of, and which are aligned with, the notches 35. The slots 36 start adjacent the rear edge of the base 31 and extend forwardly toward the notches 35; but those slots have lengths which are just greater than about one-half of the width of that base. Headed pins 38 are fixedly secured to the base 31, and the heads of those pins are spaced short distances above the upper surface of that base.

The numeral 40 denotes three vertically-directed brackets which have feet at the bottoms thereof; and fasteners, shown as screws, secure those feet to the base 31. The feet of the brackets 40 all extend to the left in FIGURE 1. Three generally similar brackets 42 have feet at the bottoms thereof; and fasteners, shown as screws, secure those feet to the base 31. Those feet all extend to the right in FIGURE 1. The brackets 40 and 42 are paired; and the feet of each pair of brackets 40 and 42 extend away from each other. Openings 44 are formed in the brackets 40 and 42, and those openings have vertically-directed sides and have plano-concave tops. Small-diameter openings are provided in the brackets 40 and 42; and bushings 46 are disposed in the small-diameter openings in the brackets 40, while bushings 48 are disposed in the small-diameter openings in the brackets 42. The bushings 46 and 48 have radially-extending flanges at the inner ends thereof, as shown particularly by FIGURE 9; and those flanges abut the inner faces of the opposite walls of coin-receiving hoppers. Three coin-receiving hoppers are provided for the money-handling device shown in FIGURE 1, and the left-hand hopper is generally denoted by the numeral 50 while the right-hand hopper is generally denoted by the numeral 154. The bushings 46 and 48 serve as pivots for the hoppers; and hence those hoppers can be rotated from their normal horizontal positions to rotated positions. The normal position of the hopper 154 is shown by solid lines, and the rotated position of that hopper is shown by dotted lines, in FIGURE 24.

The three hoppers will preferably be identical, because such hoppers can be manufactured easily and with minimal cost. Each hopper has an inclined bottom wall 52 with downwardly-extending flanges at the elongated edges thereof. Those flanges abut the inner faces of the side walls of the hopper and are suitably secured to those side walls. The inclined bottom wall 52 has its lowermost end spaced a short distance from the bottom of the hopper, and has that lowermost end adjacent the longitudinal center of the hopper. That inclined bottom wall has the uppermost end thereof abutting the rear of the hopper; and, as shown by FIGURES 2 and 3, the inclined bottom wall 52 can extend upwardly and constitute the closure for the rear of the hopper. Each hopper also has an inclined bottom wall 54, with downwardly-extending flanges at the elongated edges thereof. Those flanges abut the inner faces of the side walls of the hopper and are suitably secured to those side walls. The lowermost end of the inclined bottom wall 54 is spaced a short distance forwardly of, and a short distance above the level of, the lowermost end of the inclined bottom wall 52, all as shown by FIGURES 2 and 3. The uppermost end of the inclined bottom wall 54 terminates a short distance rearwardly of, and a short distance above the level of, the bushings 46 and 48, as shown particularly by FIGURE 2.

A rectangular opening 56 is provided in the inclined bottom wall 52, as shown particularly by FIGURE 16; and that opening is adjacent the lowermost end of that inclined bottom wall while also being adjacent one of the side walls of the hopper. As shown by FIGURE 3, a rectangular opening 58 is provided in the said one wall of the hopper, and the openings 56 and 58 are immediately adjacent each other. A pivot 60, with a radially-extending head thereon, is secured to the said one wall of the hopper at a point which is disposed rearwardly of the opening 58; and that pivot rotatably supports an agitator which is generally denoted by the numeral 62. That agitator is disposed immediately adjacent the outer face of the said one wall of the hopper, and it has an ear 64 which extends away from that wall. The agitator 62 also has an ear 66 which extends inwardly through the opening 58 in the said one wall of the hopper; and that ear has a reduced-width upper portion which projects upwardly through the opening 56 in the inclined bottom wall 52. As a result, the reduced-width portion of the ear 66 on the agitator 62 can extend above the plane defined by the upper face of the inclined bottom wall 52.

The numeral 68 denotes a bracket which is generally L-shaped in cross section and which has one arm thereof secured to the outer face of the said one wall of the hopper while having the other arm thereof projecting outwardly from that wall. An elongated leaf spring 70 is suitably secured to the outwardly-projecting arm of the bracket 68; and that leaf spring is held parallel to the said one wall of the hopper. The center of gravity of the agitator 62 is disposed to the right of the pivot 60, as that agitator is viewed in FIGURE 3; and hence that agitator tends to rotate in the clockwise direction in FIGURE 3. However, the leaf spring 70 overlies the ear 64 on the agitator 62 and normally limits rotation of that agitator in the clockwise direction in FIGURE 3. The leaf spring 70 can be bowed from the solid-line to the dotted-line position shown in FIGURE 3, and it will then permit the agitator 62 to rotate a short distance in the clockwise direction. Also, the leaf spring 70 can bow downwardly from the solid-line position shown in FIGURE 3 to a lower position; and, when that spring so bows, it will force the agitator 62 to rotate in the counter clockwise direction.

The numeral 72 denotes a rectangular opening which is provided in the inclined bottom wall 54 adjacent the uppermost end of that bottom wall; and that opening is located about midway between the side walls of the hopper. A second rectangular opening 74 is provided in the inclined bottom wall 54, and that opening is spaced rearwardly of the opening 72. The opening 74 also is spaced approximately midway between the side walls of the hopper. A rectangular opening 73 is formed in the inclined bottom wall 54; and that opening is spaced rearwardly of the opening 72 while being spaced forwardly of the opening 74. The opening 73 is immediately adjacent the said one wall of the hopper on which the agitator 62 is rotatably mounted.

The numeral 76 denotes a pivot which is supported by the downwardly-extending flanges at the elongated edges of the inclined bottom wall 54; and that pivot rotatably supports an eccentric roller 80. The pivot 76 is disposed below the plane defined by the bottom face of the inclined bottom wall 54, but it is close enough to that plane to permit the eccentric roller 80 to extend through the opening 72, as shown particularly by FIGURE 10. A pivot 78 extends between the downwardly-extending flanges at the elongated edges of the inclined bottom wall 54; and that pivot rotatably supports an eccentric roller 82. The pivot 78 is disposed below the plane defined by the bottom face of the inclined bottom wall 54, but it is close enough to that plane to enable the eccentric roller 82 to extend through the opening 74, as shown particularly by FIGURE 10. The low portions of the eccentric rollers 80 and 82 will preferably project upwardly above the plane of the upper face of the inclined bottom wall 54 whenever those rollers are in the solid-line position of roller 80 in FIGURE 10.

The numeral 84 denotes an L-shaped bracket which has the lower arm thereof secured to the said one wall of the hopper on which the bracket 68 is mounted. The bracket 84 has the upper arm thereof projecting outwardly from the said one wall of the hopper. An elongated leaf spring 86 is secured to the outwardly extending arm of the bracket 84 by suitable fasteners, and that leaf spring extends rearwardly and downwardly from that arm of that bracket.

The numeral 88 denotes bushings which are mounted within small-diameter openings in the side walls of the hopper, and those bushings are shown particularly by FIGURE 15. Those bushings rotatably support shaft-like projections which extend outwardly from the opposite ends of a pulley 90, as shown by FIGURE 15. A rectangular opening 92 is provided in the said one side wall of the hopper, and that opening is immediately adjacent the opening 73 in the inclined bottom wall 54 of the hopper. An elongated lever is generally denoted by the numeral 94, and that lever is rotatably supported by one of the bushings 88. That lever is disposed immediately adjacent the outer face of the said one wall of the hopper, and it extends upwardly and forwardly from the bushing 88 which rotatably supports it. That lever has an ear 96 at the bottom edge thereof, at a point about midway of the length of that lever, and that ear extends away from the said one wall of the hopper. An ear 98 on the lever 94 underlies the opening 73 in the inclined bottom wall 54 of the hopper, and that ear is spaced from the rest of the lever 94 by an offset 100. That offset is shown particularly by FIGURE 18; and it extends through the opening 92 and holds the ear 98 in vertical registry with the opening 73. The offset 100 is dimensioned so the lever 94 can be rotated short distances relative to the opening 92 in the said one wall of the hopper. The lever 94 will respond to gravity to tend to rotate in the clockwise direction in FIGURE 3, but the ear 96 of that lever will engage the elongated leaf spring 86 and normally hold the lever 94 in the position shown by FIGURE 3.

If the leaf spring 86 is bowed down to the dotted-line position of FIGURE 3, the lever 94 will be free to rotate downwardly in the clockwise direction. However, when that spring moves back from the dotted-line position to the solid-line position in FIGURE 3, the lever 94 will be forced back up into solid-line position shown in FIGURE 3.

The numeral 102 denotes a crank arm which has the hub thereof telescoped over one of the shaft-like projections of the pulley 90. That hub can be suitably secured to that shaft-like portion by a set screw, as shown particularly by FIGURE 15. The crank arm 102 has a roller 104 which is rotatably supported by a pin carried by that arm; and that roller is held in register with the free ends of the elongated leaf springs 86 and 70. Consequently, when the crank arm 102 is rotated in the clockwise direction in FIGURE 3, it will move the free end of the leaf spring 70 from the solid-line position to the dotted-line position in FIGURE 3 and then release that free end. Subsequently, that crank arm will move the free end of the leaf spring 86 from the solid-line position to the dotted-line position in FIGURE 3, and then release that free end.

The numeral 106 denotes a pulley with shaft-like extensions which are journaled in the bushings 46 and 48, as indicated particularly by FIGURE 9. The ends of that pulley are recessed to accommodate the flanges on those bushings; so those ends can be disposed immediately adjacent the inner faces of the side walls of the hopper. Preferably the surface of the pulley 106 is scored or knurled to provide a high coefficient of friction with a flexible, endless belt 108. That belt is wide, and the elongated edges thereof will be immediately adjacent the inner faces of the side walls of the hopper. That belt will extend around the pulleys 90 and 106 and will also overlie and engage the eccentric rollers 80 and 82.

Short slots 110 are formed in the leading edges of the side walls of the hopper; and those slots are disposed rearwardly of, and below the level of, the bushings 46 and 48, as shown particularly by FIGURE 10. Pins 112 are secured to the side walls of the hopper at points in register with the axes of the slots 110, and those pins are disposed rearwardly of, and above the level of, those slots. An idler pulley 114 has pivot-like projections extending outwardly therefrom, and those projections are disposed within the slots 110. Helical extension springs 116 have the upper ends thereof hooked around the pins 112 and have the lower ends thereof hooked around the pivot-like projections on the pulley 114. Those springs urge the pulley 114 upwardly and to the right in FIGURE 10, and thus cause it to tension the belt 108. As a result, the inner face of that belt is held in non-slipping engagement with the pulleys 90 and 106; and that inner face also is held in intimate engagement with the peripheries of the eccentric rollers 80 and 82.

The numeral 118 denotes slots in the side walls of the hopper and those slots are located directly above the outwardly-projected shaft-like portions of the pulley 90, as shown by FIGURE 3. Pins 120 are secured to, and extend outwardly from, the side walls of the hopper; and those pins are directly below the slots 118. An elongated rod 122 extends between the side walls of the hopper and lodges within the slots 118 in those side walls. Those slots are large enough to permit free vertical movement of the rod 122 relative to the hopper. Helical extension springs 124 have the upper ends thereof hooked around the opposite ends of the rod 122 and have the lower ends thereof hooked around the pins 120. Those springs urge the ends of that rod downwardly toward the lower ends of the slots 118 but can yield to permit those ends of that rod to move upwardly.

Ears 126 are formed adjacent the top edge of the said one wall of the hopper which supports the brackets 68 and 84; and those ears have openings therein. A generally flat cover 128 has pivot-like extensions at the opposite ends thereof, and those extensions are disposed within the openings in the ears 126. Those extensions coact with those ears to serve as a hinge for the cover 128. The portion of the cover 128 which is adjacent the ears 126 inclines downwardly relative to the plane of that cover, as shown by FIGURE 4. That portion of that cover will respond to rotation of that cover to engage the said one wall of the hopper and thereby prevent further rotation of that cover. That portion of the cover 128 is dimensioned so that cover will stop in opened position when that portion engages the said one sidewall of the hopper, thereby facilitating ready introduction of coins into the hopper.

The numeral 130 generally denotes a gate which is U-shaped in plan. The gate has a reduced width portion 132 which is vertically-directed and which extends downwardly into the hopper and terminates immediately adjacent the upper face of the belt 108. That reduced width portion coacts with the rest of the gate to define shoulders which normally rest upon shoulders 141 on the side walls of the hopper. Ears 134 are struck outwardly from the sides of the gate 130, and those ears are disposed above the level of pins 136 which are secured to and which extend outwardly from the walls of the hopper. Pivots 140 are secured to the side walls of the hopper, and those pivots rotatably secure the gate 130 to that hopper. Helical extension springs 138 have the upper ends thereof hooked around the ears 134 and have the lower ends thereof hooked around the pins 136. Those springs bias the reduced width portion 132 of the gate 130 for movement toward the belt 108, but they can yield to permit that reduced width portion to move away from that belt.

The numeral 142 generally denotes a second gate for the money-handling device of the present invention. That gate is generally U-shaped in plan; and it has a reduced width portion 144 that extends down between the side walls of the hopper and that extends toward, but stops short of, the belt 108. Pivots 150 are secured to the side walls of the hopper, and those pivots hold the gate 142 for rotation relative to that hopper. Ears 146 are struck outwardly from the sides of the gate 142, and those ears are disposed above the level of, and a short distance rearwardly of, the pins 112. Helical extension springs 148 have the upper ends thereof hooked around the ears 146 and have the lower ends thereof hooked around the pins 112. Those springs urge the lower edge of the reduced width portion 144 of the gate 142 toward the belt 108, but those springs can yield to permit that reduced width portion to move away from that belt. Normally, those springs hold the gate 142 in engagement with shoulders 152 on the side walls of the hopper.

The numerals 160, 162 and 164 denote ejectors which are mounted so they can rest upon the upper surface of the base 31. The leading edges of those ejectors are concave, and those leading edges have radii of curvature which are generally complementary to the radii of curvature of the arcuate notches 32. If desired, the leading edges of the ejectors 160, 162 and 164 could be given different radii of curvature, so those leading edges would be exactly complementary to the diameters of the coins which they were to eject. However, it has been found sufficient to provide the same radius of curvature for the leading edge of each of the ejector slides 160, 162 and 164. In the particular embodiment shown, the ejector 160 is intended to eject nickels, the ejector 162 is intended to eject dimes, and the ejector 164 is intended to eject quarters.

Each of the ejectors 160, 162 and 164 has a slot 165 adjacent the rear edge thereof; and that slot is approximately midway between the elongated edges of that ejector. The slots 165 of the ejectors 160, 162 and 164 will be in register with the elongated slots 36 in the base 31. However, the slots 165 are much shorter than the slots 36, as shown particularly by FIGURE 11.

The numerals 166, 168 and 170 denote brackets which are associated with the ejectors 160, 162 and 164. Each bracket has notches at the rear corners thereof; and those notches accommodate the shanks of the headed pins 38. As a result, the heads of those pins can overlie the upper surfaces of those brackets and help hold those brackets in engagement with the base 31. Also, each bracket has an elongated slot 176 which can be set in register with one of the elongated slots 36 in base 31, as shown by FIGURE 11. Further, each of the brackets 166, 168 and 170 has an elongated recess 178 therein which can accommodate and guide an ejector—the recess in bracket 166 accommodating and guiding ejector 160, the recess in bracket 168 accommodating and guiding ejector 162, and the recess in bracket 170 accommodating and guiding ejector 164. Each of the brackets 166, 168 and 170 has the lower part of the front thereof cut-away to form a discharge opening 174; and those discharge openings overlie the adjacent arcuate notches 32. As indicated by FIGURE 1, the upper edges of the discharge openings 174 and the lower front edges of the tubes can be made concave; and hence those tubes and discharge openings can readily pass bent coins which have convex upper faces that are generally alined with those edges. Each of the brackets 166, 168 and 170 has a circular, horizontally-directed opening therein adjacent the front thereof; and a rabbet joint surrounds that opening.

The rabbet joint of the bracket 166 can accommodate the lower end of a tube 180 for nickels. The rabbet joint of the bracket 168 can accommodate the lower end of a tube 182 for dimes; and the rabbet joint of the bracket 170 can accommodate the lower end of a tube 184 for quarters. The tubes 180, 182 and 184 are identical except for diameter—the tube 180 being dimensioned to loosely accommodate nickels, the tube 182 being dimensioned to loosely accommodate dimes, and the tube 184 being dimensioned to loosely accommodate quarters. Each of the tubes 180, 182 and 184 has a vertically-directed slot 186 therein, as shown particularly by FIGURES 13 and 14; and each of those tubes has a second vertically-directed slot 188, as shown particularly by FIGURE 14. The slot 186 is located adjacent the upper end of each tube, and the slot 188 is adjacent the lower end of each tube.

The brackets 166, 168 and 170 will be substantially identical. In fact, those brackets will differ solely in the diameters of the circular, horizontally-directed openings therein, in the sizes of the discharge openings 174, and in the sizes of the rabbet joints thereof. Fasteners, such as screws, extend through the front portions of the brackets 166, 168 and 170 to help releasably secure those brackets to the base 31.

The numeral 190 denotes funnels which are mounted stop the tubes 180, 182 and 184. These funnels are dimensioned so the sides thereof fit snugly between the paired brackets 42 and 40. Those funnels have rabbet joints 196 to accommodate the upper ends of the tubes 180, 182 and 184; and those rabbet joints will have different diameters. Each funnel 190 has an inclined coin-guiding surface 192 and an inclined coin-guiding surface 194; and those coin-guiding surfaces are vertically spaced and horizontally displaced. As indicated particularly by FIGURE 23, the lower end of the inclined coin-guiding surface 192 is disposed above the level of the lower end of the inclined coin-guiding surface 194. Abutments 198 are formed on the front faces of the funnels 190, and wire-like clamps 200 can engage those abutments to releasably hold the funnels and the tubes in position adjacent the hoppers. Those clamps have horizontally-spaced arms which abut the confronting faces of the paired brackets 42 and 40; and those arms have outwardly-extending ears which extend into openings in those brackets. Those ears and openings serve as hinges for those clamps. In their normal unstressed conditions, the clamps 200 cannot overlie the abutments 198 on the funnels 190. However, by being bent slightly, those clamps can have the closed ends thereof set in position above the abutments 198. The restorative forces within those clamps will apply forces which incline downwardly and to the left in FIGURE 3; and those forces will hold the tubes within the rabbet joints of the brackets 166, 168 and 170 and will also hold the rear edges of the funnels 190 against the leading edges of the side walls of the hoppers. When the rear edges of those funnels 190 abut the leading edges of those side walls, the inclined coin-guiding surfaces of those funnels will be immediately adjacent the leading edges of the belts 108, as indicated particularly by FIGURE 9.

The numeral 204 denotes brackets which have vertical sides and plano-convex tops; and those brackets are dimensioned to fit loosely within the openings 44 in the brackets 42, as shown particularly by FIGURES 13 and 14. The brackets 204 have feet which are suitably secured to the base 31 by fasteners, such as screws. A bracket 205, which is identical to the brackets 204, is secured to the base 31 adjacent the left-hand side of FIGURE 1. The brackets 204 and 205 have openings therein which accommodate bushings 206, as shown particularly by FIGURE 14; and those bushings rotatably support an elongated shaft 207. A C-washer 209 is seated within an annular groove in the shaft 207 adjacent one of the bushings 206, as shown particularly by FIGURE 14; and that C-washer will thus limit shifting of that shaft to the right. A similar C-washer, not shown, will be seated in an annular groove in that shaft adjacent another bushing, and that C-washer will prevent shifting of that shaft to the left. As a result, the shaft 207 will be free to rotate relative to the brackets 204 and 205 but will be kept from shifting axially relative to those brackets.

The numerals 208, 210 and 212 generally denote coin-ejecting cams; and the cam 208 is adjacent the tube 180, the cam 210 is adjacent the tube 182, and the cam 212 is adjacent the tube 184. Each of those cams includes a hub 214 which has a radially-extending shoulder an an axially-extending threaded portion. Notches 216 ar formed in the outer periphery of that shoulder; and thos notches can accommodate abutments 224 on a lobe-form ing plate 220. The abutments 224 will preferably b formed by punching them out of the lobe-forming plat 220, because sockets 225 can then be formed in the op posite face of that plate. The sockets 225 will be large than, but will be in register with the abutments 224. Th sockets 225 in the plate 220 will accommodate the abut ments on a lobe-forming plate 218; and the sockets 22: in the plate 218 will accommodate the abutments on ; lobe-forming plate 222. The lobe-forming plates 220 218 and 222 will preferably be identical.

The notches 216, the abutments 224, and the socket 225 are spaced apart one hundred and twenty degrees Consequently, the lobe-forming plates 220, 218 and 22: can be set to form a one-lobe cam, can be set to form ; two-lobe cam wherein one lobe trails the other by on hundred and twenty or by two hundred and forty degrees or can be set to form a three-lobe cam wherein the lobe: are equally spaced apart. A nut 228 can be threaded ont the threaded portion of the hub 214 to hold the abutment: 224 on the various lobe-forming plates in the adjacen notches or sockets. However, that nut can be loosene sufficiently, without being separated from the threadec portion of the hub 214, to permit the plates 218, 220 anc 222 to be moved far enough from each other and from the shoulder on the hub 214 to facilitate rotation of those plates relative to each other. Such rotation is desirable because it permits the number of lobes on the cam to be changed without removing that cam from the shaft 207. All that one need do to change the number of lobes on one of the cams 208, 210 and 212 is to loosen the nut 228 of that cam, shift one or more of the lobe-forming plates of that cam axially and circumferentially, and then re-tighten that nut. As a result, simple and quick changing of the numbers of lobes on the cams is facilitated.

Where all of the cams 208, 210 and 212 are to be operated as one-lobe cams, the plates 218, 220 and 222 of those cams will preferably be set so the lobes of the various cams are either in alinement or are close to being in alinement. Such an arrangement will cause all of the coins to be dispensed at the same time; and this is desirable because it will minimize the likelihood of a patron taking the coins that are dispensed during the first part of the cycle of operation of the coin-dispensing device and of leaving the coins that are dispensed during the rest of that cycle.

The numerals 230, 232 and 234 generally denote clutches which are mounted on the shaft 207. The clutch 230 is adjacent the cam 208, the clutch 232 is adjacent the cam 210, and the clutch 234 is adjacent the cam 212. The clutches are identical; and each of them includes a hub 236 which has a plate 238 rotatably secured to it and which has a plate 242 fixedly secured to it. The plate 238 has an ear 240 that projects radially outwardly from it, as indicated particularly by FIGURE 13; and the plate 242 has an ear 244 which projects axially from it, as indicated particularly by FIGURE 14. Each clutch also has a sprocket pinion 246; and the hubs 236 and the sprocket pinions 246 of the clutches are coaxial and are mounted on the shaft 207. The hubs 236 of the various clutches are fixedly secured to the shaft 207 by pins 247, but the sprocket pinions 246 are free to rotate relative to that shaft. A helical torsion spring 248 is provided for each clutch; and that spring has one end thereof fixedly seated within a socket in the sprocket pinion 246 and has the other end thereof fixedly seated within an opening in the plate 238, as shown particularly by FIGURE 14.

The unstressed inner diameter of the helical torsion spring 248 is smaller than the diameter of the hub 236; and hence, whenever the spring 248 is unstressed, the turns of that spring will bear against that hub with sufficient force to rotate with that hub. Moreover, the turns of that spring will bear against that hub with sufficient force to cause the sprocket pinion 246 and the plate 238 to rotate with that hub. However, that helical torsion spring can yield to enable the turns thereof to release the force which they tend to apply to the surface of the hub 236; and, where that happens, the sprocket pinion 246 and the plate 238 need not rotate with the hub 236.

The numerals 250, 252 and 254 denote sprocket pinions which are secured to the shaft-like projections of the various pulleys 106. The sprocket pinion 250 is in register with the sprocket pinion 246 of the clutch 230, the sprocket pinion 252 is in register with the sprocket pinion 246 of the clutch 232, and the sprocket pinion 254 is in register with the sprocket pinion 246 of the clutch 234. Sprocket chains 256, 258 and 260, respectively, connect the sprocket pinions 250, 252 and 254 with the sprocket pinions 246 of the clutches 230, 232 and 234.

The numeral 262 denotes a cam which is secured to the right-hand end of the shaft 207, as that shaft is viewed in FIGURE 1. That cam includes notched plates 264 and 266; and the notches in those plates are shown particularly by FIGURE 12. As indicated particularly by FIGURE 14, a pin can pass through the cam 262 and through the shaft 207 to lock that cam to that shaft.

A sheet 268 of insulation is disposed between the right-handmost bracket 42 in FIGURE 1 and two switches 270 and 272 which are secured to that bracket. As indicated particularly by FIGURE 25, switch 270 is a single pole, double throw switch, while switch 272 is used as a single pole, single throw switch. Each of the switches 270 and 272 has an elongated actuating arm with a roller at the free end thereof; and those rollers are dimensioned to extend into the notch in the notched plate 266 of cam 262. A further sheet 274 of insulation is disposed between the bracket 42 of FIGURE 12 and an empty switch 276. As shown particularly by FIGURE 25, that switch is a single pole, double throw switch; and it has an elongated actuator with a roller at the free end thereof.

An elongated shaft 280 is journaled in bushings which are mounted within openings in the various brackets 40 and 42; and that shaft is disposed forwardly of, and below the level of, the shaft 207. A lever 282 is fixedly mounted on the right-hand end of the shaft 280, as that shaft is viewed in FIGURE 1; and that lever has a roller 283 rotatably mounted thereon. That roller is in register with the notched plate 264, and it is dimensioned to extend into the notch in that plate. The lever 282 has an offset intermediate the bottom thereof and the shaft 280, and that offset disposes the bottom of that lever in register with the roller at the free end of the actuating arm of the switch 276. As long as the full-diameter portion of the periphery of the notched plate 264 is in register with the roller 283, the lever 282 will be in the solid-line position in FIGURE 12. However, whenever the notch of the notched plate 264 moves into register with the roller 283, the lever 282 will be able to rotate to the dotted-line position shown in FIGURE 12.

The numeral 290 denotes a sprocket pinion which is fixedly secured to the right-hand end of the shaft 207, as that shaft is viewed in FIGURE 1. A sprocket chain 292 connects the sprocket pinion 290 to a sprocket pinion, not shown, on the shaft of electric motor 360 shown in the circuit diagram of FIGURE 25. That motor is arranged so it will rotate the sprocket pinion 290 and the shaft 207 in the counter clockwise direction in FIGURE 2.

The numerals 294, 296 and 298 generally denote level-sensing devices; and those level-sensing devices are associated with the tubes 180, 182 and 184 respectively. Each of those level-sensing devices includes a lever 300 which is shown in detail in FIGURE 6 and a lever 308 which is shown in detail in FIGURE 5. The lever 300 has an opening which telescopes over the shaft 280, has an ear 302, has a feeler 304, has a hub 309, and has a second ear 306. The ear 306 has an opening therein; and that ear and the ear 302 are short. The feeler 304 is long; and it has a right-angle bend therein which makes the free end of that feeler parallel to the plane of the lever 300. The lever 308 has an elongated offset ear 310, and also has a short ear 312 which is struck out of that lever. A stiff wire-like spring 314 is wound around the hub 309 and has one end thereof disposed within the opening in the ear 306 while having the other end thereof hooked under the ear 312 of the lever 308. That spring urges the lever 308 for rotation relative to the lever 300 in the clockwise direction in FIGURE 13, but the ear 302 on the lever 300 limits such rotation. The spring 314 can yield to permit rotation of the lever 308 in the counter clockwise direction relative to the lever 300. The numeral 316 denotes a helical extension spring which has the lower end thereof hooked through the opening in the ear 306 on the lever 300 and which has the upper end thereof hooked through an opening in the bracket 40. The spring 316 biases the level-sensing device for rotation in the clockwise direction in FIGURE 13; but that spring can yield to permit rotation of that level-sensing device in the counter clockwise direction. While the level-sensing devices 294, 296 and 298 are mounted on the shaft 280, the levers 300 and 308 of those devices can rotate independently of that shaft.

The shaft 280 has a number of short pins 318 that are disposed within radially-directed openings in that shaft; and the outer ends of those pins project outwardly beyond the periphery of that shaft, as shown particularly by FIGURES 10 and 11. Empty feelers 320 have ears 324 which are in register with, and which can engage, the pins 318. Those feelers have openings therein which are loosely telescoped over portions of the hubs 329 of tappers 328; and those tappers and those feelers can rotate relative to each other and relative to the shaft 280. The empty feelers 320 have fingers 322 that can extend inwardly through the slots 188 in the tubes 180, 182 and 184. Wire-like springs 326 are wound around the hubs of the tappers 328 and have the lower ends thereof hooked around the empty feelers 320 while having the upper ends thereof hooked around the tappers 328. One of the tappers is shown particularly by FIGURE 18; and it has an ear 330 which is disposed in register with the ear 244 on the plate 242 of one of the clutches 230, 232 and 234. The tapper 328 has an opening 331 therein which receives and holds a resilient button 332; and those resilient buttons are in register with the tubes 180, 182 and 184.

The numeral 334 denotes rods which have the opposite ends thereof disposed within and held by openings in the paired brackets 40 and 42. Those rods are disposed above the level of, but rearwardly of, the shaft 280; and those rods also are disposed above the level of, but forwardly of, the shaft 207, as shown particularly by FIGURE 13. The numeral 336 denotes pivots which extend between, and which have the opposite ends thereof supported within openings in, the paired brackets 40 and 42. Those pivots are disposed above the level of, and are mounted rearwardly of, the rods 334, as shown particularly by FIGURE 13. Actuators 338 have hubs that are rotatably mounted on the pivots 336; and those actuators have rollers 339 thereon which are in register with the lobe-forming plates 218, 220 and 222 of the cams 208, 210 and 212. The actuators 338 have ears 340 thereon which extend through the slots 176 in the brackets 170, through the slots 165 in the ejectors 160, 162 and 164, and through the slots 36 in the base 31. Each actuator 338 also has a second ear 342. Helical extension springs 344 have the forward ends thereof hooked around the rods 334 and have the other ends thereof hooked around pins 345 on the actuators 338. Those springs bias the actuators 338 for rotation in the clockwise direction in FIGURE 10; but those springs can yield to permit rotation of those actuators in the counter clockwise direction.

The helical torsion springs 248 of the various clutches 230, 232 and 234 are wound so the application of holding forces to the right-hand ends of those springs, as those springs are viewed in FIGURE 14, will urge those springs into even tighter engagement with the hubs 236 of those clutches. Those springs also are wound so that if the plates 238 are held stationary, the hubs 236 of the clutches 230, 232 and 234 will apply forces to those springs which will tend to loosen the engagements between those springs and those hubs. The frictional engagements between the shaft-like projections of pulleys 106 and the bushings 46 and 48, the frictional engagements between the pivot-like projections of the pulleys 90 and the bushings 88, the frictional engagements between the sprocket pinions 246 and the shaft 207, the frictional losses in the sprocket chains 256, 258 and 260, the frictional losses at the eccentric rollers 80 and 82, the resistance of the belts 108 to bending, and the resistance of the springs 70 and 86 to bending will cause the sprocket pinions 246 to tend to remain stationary. This means that those sprocket pinions will apply holding forces to the right-hand ends of the springs 248, as those springs are viewed in FIGURE 14; and those holding forces will force those springs into even tighter engagement with the hubs 236. Such engagement will force those springs, and hence the sprocket pinions 246, to rotate with those hubs. As a result, as long as the plates 238 are not held stationary, the hubs 236 and the springs 248 will force the sprocket pinions 246 to rotate with the shaft 207. However, if the plates 238 are held stationary, the engagements between the springs 248 and the hubs 236 will loosen; and those springs and the sprocket pinions 246 will come to rest even though the hubs 236 will continue to rotate with the shaft 207.

Referring to FIGURE 25, the numerals 362, 364 and 366 denote conductors, and the numerals 368, 370, 371, 373, 376, 384 and 386 denote junctions. The numeral 268 denotes an empty lamp which is mounted on the money-actuated device with which the coin-dispensing device of FIGURE 1 is used. The numeral 374 denotes the coil of a relay; and that coil controls relay contacts 378, 380 and 382. The contacts 378 and 380 are normally open while the contacts 382 are normally closed. The numeral 372 denotes contacts which are controlled by a money-checking device; as for example, a currency detector. The movable contact 372 is normally in engagement with the upper fixed contact 372, but it will respond to the acceptance of an authentic dollar bill to momentarily shift down into engagement with the lower fixed contact 372. The numeral 388 denotes an electromagnet which will, as long as it is energized, permit authentic dollar bills to be accepted by the money-checking device but will, whenever it is de-energized, keep that money-checking device from accepting a dollar bill.

In the coin-dispensing device of FIGURE 1, one tube and one hopper are provided for nickels, a second tube and a second hopper are provided for dimes, and a third tube and a third hopper are provided for quarters. This means that if those tubes are to coact to pay out a dollar in coins, during each cycle of operation of that device, more than one coin must be paid out from one or more of those tubes during that cycle of operation. To provide optimum capacity for the coin-dispensing device of FIGURE 1, that device should be provided with enough tubes and hoppers so no more than one coin need be paid out from each tube during each cycle of operation of that device. For example, if the tubes of the coin-dispensing device should pay out three quarters, two dimes, and one nickel during each cycle of operation of that device, that device should have three tubes and hoppers for quarters, two tubes and hoppers for dimes, and one tube and hopper for nickels. With that arrangement of tubes and hoppers, the cams associated with the various tubes could all be set to act as one-lobe cams. Such an arrangement of tubes and hoppers would provide the coin-dispensing device with ample coin-handling capacity, because each hopper can hold one thousand coins.

In actual practice, it will be preferable to have enough tubes and hoppers so each tube will not have to dispense more than one coin during any cycle of operation of the coin-dispensing device. However, where optimum coin-holding capacity is not necessary, fewer tubes and hoppers can be use; and, where that is done, one or more tubes will have to dispense more than one coin during a given cycle of operation of the coin-dispensing device. For example, if the coin-dispensing device of FIGURE 1 should dispense one dollar in coins during each cycle of operation of device, the tube 180 will dispense one nickel, the tube 182 will dispense two dimes and the tube 184 will dispense three quarters during each such cycle. To make that possible, the cam 208 should have all of the lobe-forming plates 218, 220 and 222 thereof set in the position occupied by the lobe-forming plate 220 in FIGURE 10, the cam 210 should have the plates 220 and 218 thereof set in the position occupied by the lobe-forming plate 220 in FIGURE 10 while the lobe-forming plate 222 of that cam should be left in the position shown by FIGURE 10, and the lobe-forming plates 218, 220 and 222 of the cam 212 should be left in the positions shown by FIGURE 10.

In describing the operation of the coin-dispensing device of FIGURES 1–25, it will be assumed that the movable contact 372 moves down momentarily when an authentic dollar bill is accepted, and it will further be assumed that the tube 180 is to pay out one nickel, the tube 182 is to pay out two dimes, and the tube 184 is to pay out three quarters. In addition, it will be assumed that the tubes and hoppers are filled with coins.

Prior to the insertion of a dollar bill into the money-checking device, the empty switch 276 will have the movable contact thereof in the left-hand position shown by FIGURE 25. Also, the movable contact 372 will be in its upper position, the switch 272 will be closed, and the moveable contact of the switch 270 will be in its upper position. This means that the relay coil 374 will be de-energized but that the electromagnet 388 will be energized—current flowing from conductor 362 via the movable and left-hand contacts of empty switch 276, conductor 364, the movable and upper contacts of switch 270, and electromagnet 388 to conductor 366.

When an authentic dollar bill is accepted, the movable contact 372 will move downwardly; and current will then flow from conductor 362 via the movable and left-hand contacts of empty switch 276, conductor 364, junction 368, the movable and lower contacts 372, junction 373, relay coil 374, and junction 376 to the conductor 366. The resulting energization of relay coil 374 will close relay contacts 378 and 380 and will open relay contacts 382. The closing of relay contacts 378 will complete a holding circuit which extends from conductor 362 via the movable and left-hand contacts of empty switch 276, conductor 364, junction 370, switch 272, now-closed relay contacts 378, junction 373, relay coil 374, and junction 376 to the conductor 366. That holding circuit will keep that relay coil energized as long as the switch 272 remains closed.

The opening of the relay contacts 382 will not have any immediate effect. The closing of the relay contacts 380 will preset an enrgizing circuit for the motor 360; and that circuit will be completed when the movable contact 372 returns to its upper position. Thereupon, current will flow from conductor 362 via the movable and left-hand contacts of empty switch 276, conductor 364, junction 368, the movable and upper contacts 372, now-closed relay contacts 380, junction 384, motor 360, and junction 386 to the conductor 366. The motor 360 will then act through the sprocket chain 292 to start rotating the sprocket pinion 290 and the shaft 207 in the counter clockwise direction in FIGURE 2.

As that shaft so rotates, the cam 262 and the notched plates 264 and 266 thereof will rotate in the counter clockwise direction in FIGURE 12. Almost immediately, the notch in the plate 266 will move out of register with the roller on the actuating arm of the switch 270; and, thereupon, the movable contact of that switch will shift to its lower position in FIGURE 25. The shifting of that movable contact will interrupt the circuit of the electromagnet 388; and that is desirable, because it will keep further authentic dollar bills from being accepted until the coin-dispensing device of FIGURE 1 has completed its cycle of operation. That shifting of that movable contact can not, at this time, establish a running circuit for the motor 360, because the relay contacts 382 are open.

Continued energization of the motor 360 will cause the ears 244 on the plates 242 to move into engagement with the ears 310 on the lever 308. The ears 244 will force the levers 308 to rotate from the solid-line position to the dotted-line position in FIGURE 13; and the springs 314 will respond to such rotation of the levers 308 to urge the feelers 304 of levers 300 into the slots 186 in the tubes 180, 182 and 184. Since those tubes are full, the feelers 304 will be held close to the position shown by solid lines in FIGURE 13.

This means that the ears 302 on the levers 300 will remain in the paths of the ears 240 on the plates 238; and, in doing so, they will hold the plates 238 stationary. As explained hereinbefore, the springs 248 and the sprocket pinions 246 will remain stationary when the plates 238 are held stationary, even though the hubs 236 must continue to rotate with the shaft 207. All of this is desirable, because it avoids needless rotation of the sprocket pinions 246, 250, 252 and 254, and thus avoids all needless movements of the belts 108.

Further rotation of the shaft 207 will cause the lobe-forming plates 220 of the various cams 208, 210 and 212 to act through the rollers 339 to rotate the actuators 338 in the counter clockwise direction in FIGURE 10. Such rotation will enable the ears 340 of those actuators to shift the ejectors 160, 162 and 164 rearwardly of the tubes 180, 182 and 184; and, thereupon, a nickel, a dime and a quarter will move downwardly in those tubes and come to rest on the base 31 adjacent the concave leading edges of those ejectors. As the lobe-forming plates 220 force the actuators 338 to rotate in a counter clockwise direction, the helical extension springs 344 will be extended; and, as soon as the outer ends of the lobe-forming plates 220 move beyond the rollers 339 on the actuators 338, those springs will force those actuators 338 to return to the position shown in FIGURE 10. As those actuators return to that position, the ears 340 on those actuators will cause the ejectors 160, 162 and 164 to move forwardly and to shift the centers of gravity of the nickel, dime and quarter beyond the arcuate recesses 32 in the base 31. Consequently, one nickel, one dime and one quarter will fall downwardly and pass to a cup-like receptacle at the exterior of the money-actuated device with which the coin-dispensing device of the present invention is used.

Further rotation of the shaft 207 will cause the ears 244 on the plates 242 to engage the ears 330 on the tappers 328. The engagements between the ears 244 and 330 will force those tappers to rotate from the solid-line to the dotted-line position in FIGURE 11. Such rotation of those tappers will increase the forces which the springs 326 apply to the empty feelers 320 to urge the fingers 322 of those feelers into the dotted position shown by FIGURE 11. However, since the notched plate 264 will have the circular portion of the periphery thereof in register with the roller 283 on the lever 282, that notched plate will force the shaft 280 to hold the pins 318 in the position shown by FIGURE 10. Those pins will thus positively keep the fingers 322 of the feelers 320 from entering the slots 188 in the tubes.

Continued rotation of the shaft 207 will move the ears 244 beyond the ears 330 on the tappers 328; and, thereupon, the springs 326 will force the resilient buttons 332 of those tappers into engagement with the rear faces of the tubes 180, 182 and 184. The application of the resulting taps to those tubes will not be significant at this time, because those tubes are full. However, if those tubes were in the process of receiving coins from the hoppers, those taps would cause coins, which tended to stand on edge or assume leaning positions within the tubes, to fall downwardly and lie flat within those tubes.

Further rotation of the shaft 207 will move the lobe-forming plates 222 of the cams 210 and 212 into engagement with the rollers 339 of the actuators 338 adjacent the tubes 182 and 184. The lobe-defining plate 222 of the cam 208 is in register with the lobe-defining plate 220 of that cam; and hence has already passed by the roller 339 on the actuator 338 adjacent the tube 180.

The engagements between the lobe-defining plates 222 of the cams 210 and 212 with the rollers 339 of the actuators 338 adjacent tubes 182 and 184 will shift the ejectors 162 and 164 rearwardly of the tubes 182 and 184; and thereupon a second dime and a second quarter will move down and come to rest on the base 31. As the lobe-defining plates 222 of the cams 210 and 212 move beyond the rollers 339 on the actuators 338 adjacent the tubes 182 and 184, the springs 344 will return those actuators 338 to the position shown by FIGURE 10; and, as those actuators return to that position, they will cause the ejectors 162 and 164 to eject the second dime and the second quarter. Those coins then pass to the cup-like receptacle at the exterior of the money-actuated device.

Still further rotation of the shaft 207 will cause the lobe-forming plate 218 of the cam 212 to move into engagement with the roller 339 of the actuator 338 adjacent the tube 184. The lobe-defining plates 218 of the cams 208 and 210 will be in register with the lobe-defining plates 220 of those cams, and will thus already have passed beyond the rollers 339 of the actuators adjacent the tubes 180 and 182. Hence no more nickels or dimes can be paid out during the rest of the cycle of operation of the coin-dispensing device of FIGURES 1–25. However, the lobe-forming plate 218 of the cam 212 will cause the actuator 338 adjacent the tube 184 to move rearwardly and permit a third quarter to move downwardly and come to rest on the base 31. As that lobe-forming plate moves beyond the roller 339 on the actuator 338 adjacent tube 184, the spring 344 for that actuator will return that actuator to the position shown in FIGURE 10. As that actuator returns to that position it will cause the ejector 164 to shift the center of gravity of the third quarter beyond the arcuate notch 32; and, thereupon, that third quarter will pass downwardly to the cup-like receptacle at the exterior of the money-actuated device.

Shortly before the shaft 207 completes one full revolution, the notch of the notched plate 266 will move into register with the roller on the actuating arm of the switch 272. That roller will move into that notch and permit the switch 272 to open. The relay coil 374 will become de-energized; and the relay contacts 378 and 380 will re-open while the relay contacts 382 will re-close. The re-opening of the relay contacts will not be effective at this time; but the re-opening of the relay contacts 380 will interrupt the starting circuit of the motor 360. However, the interruption of that circuit will not interrupt the operation of that motor; because current will flow from conductor 362 via the movable and left-hand contacts of empty switch 276, conductor 364, the movable and lower contacts of switch 270, re-closed relay contacts 382, junction 384, motor 360, and junction 386 to the conductor 366.

As the motor 360 continues to rotate the shaft 207, the notched plate 266 will move the roller on the actuating arm of the switch 272 back to its normal position. As that roller is so moved, the switch 272 will re-close; but the reclosing of that switch will have no effect at this time.

Shortly thereafter, the notch of the notched plate 264 will move into register with the roller 283 on the lever 282. At such time, the shaft 280 will be able to respond to the forces applied to the empty feelers 320 by the springs 326 to rotate in the clockwise direction in FIGURE 10. However, since the tubes 180, 182 and 184 are filled with coins, the fingers 322 of those empty feelers will not be able to move very far into the slots 188 in those tubes. Consequently while the shaft 280 will rotate a short distance in the clockwise direction, that distance will be too short to cause the lower end of the lever 282 to engage the roller on the free end of the actuating arm of the empty switch 276. As a result, the movable contact of the empty switch 276 will remain in its left-hand position, and the motor 360 will continue to rotate the shaft 207 in the counter clockwise direction in FIGURE 12.

That rotation will finally move the notch in the notched plate 266 into register with the roller on the actuating arm of the switch 270; and, thereupon, that roller will move into that notch. As that roller moves into that notch, the movable contact of the switch 270 will return to its upper position in FIGURE 25. At that time, both of the circuits for the motor 360 will be open, and hence that motor will stop; but at this time, the circuit to the electromagnet 388 will be reestablished. All of this means that the coin-dispensing device of FIGURE 1 has completed one full cycle of operation, but that the money-directing device is free to accept a further authentic dollar bill.

In the foregoing description of the operation of the coin-dispensing device of FIGURES 1–25, it was assumed that the tubes 180, 182 and 184 were filled with coins. However, when the operator of a money-actuated device, with which the coin-dispensing device of the present invention is used, initially installs that money-actuated device at a location, those tubes will be empty. Furthermore, the hoppers associated with those tubes will be empty. If the cam 262 and the notched plates 264 and 266 thereon are in the position shown by FIGURE 12, the notched plate 264, the lever 282, the shaft 280, and the pins 318 of that shaft will coact with the springs 326 to hold the empty feelers 320 in the position shown by FIGURE 10. Furthermore, the springs 316 will hold the feelers 304 on the levers 300 of the various level-sensing devices out of the tubes 180, 182 and 184. As a result, the interiors of the tubes 180, 182 and 184 will be unobstructed; and all the operator need do is introduce a quantity of nickels into the tube 180, introduce a quantity of dimes into the tube 182, and introduce a quantity of quarters into the tube 184. That operator will then add a quantity of nickels to the hopper 50, add a quantity of dimes to the middle hopper, and add a quantity of quarters to the hopper 154. As many as one thousand quarters can be held by the hopper 154, a larger number of nickels can be held by the hopper 50, and a still larger number of dimes can be held by the middle hopper. Once the tubes 180, 182 and 184 and their hoppers have been filled, the coin-dispensing device of FIGURES 1–25 can provide the hereinbefore-described cycle of operation.

If at the time the operator wishes to fill the tubes 180, 182 and 184, the notched plate 264 of the cam 262 is in position to permit the lever 282 to assume the dotted-line position of FIGURE 12, the fingers 322 on the various empty feelers 320 will be in the dotted-line position of FIGURE 11. It would be undesirable to try to fill those tubes while those fingers were in that position, because those fingers would tend to keep any coins which entered those tubes from assuming their proper positions within those tubes. To withdraw those fingers from those tubes, the operator need only grasp the lever 282 and rotate it from the dotted-line toward the solid-line position in FIGURE 12. Thereupon, the movable contact of empty switch 276 would shift from its right-hand position to its left-hand position in FIGURE 25; and current would flow from conductor 362 via the movable and left-hand contacts of switch 276, conductor 364, the movable and lower contacts of switch 270, relay contacts 382, junction 384, motor 360, and junction 386 to the conductor 366. That flow of current would cause the motor 360 to rotate the shaft 207 in the counter clockwise direction in FIGURE 12 until the notched plates 264 and 266 of the cam 262 reach the position shown by FIGURE 12. At such time, the notched plate 264 will hold the lever 282 in the solid-line position in FIGURE 12, and that lever will coact with the shaft 280 and with the pins 318 of that shaft to hold the fingers 322 of the empty feelers 320 out of the tubes 180, 182 and 184. Once those fingers have been moved out of those tubes, the operator can easily fill those tubes with coins.

During each cycle of operation of the coin-dispensing device of FIGURES 1–25, one nickel, two dimes and three quarters will be dispensed. As a result, the levels of the coins in the tubes 180, 182 and 184 will move down during each such cycle of operation. Very quickly, the level of the quarters in the tube 184 will move down below the level of the feeler 304 on the lever 300 adjacent that tube. This means that when during the next cycle of operation of the coin-dispensing device of FIGURES 1–25, the ear 244 on the plate 242 of clutch 234 engages the ear 310 on the adjacent lever 308, the lever 308 and the spring 314 will force the feeler 304 on the lever 300 to move inwardly through the slot 186 in the tube 184. As that feeler moves inwardly, the ear 302 on the lever 300 will move out of the path of the ear 240 on the plate 238; thereby freeing that plate for rotation with the shaft 207. Immediately, the spring 248 of the clutch 234 will cause the sprocket pinion 246 of that clutch to start rotating with the shaft 207; and the sprocket chain 260 will start driving the sprocket pinion 254. The sprocket pinion 254 will rotate the pulley 106 in the counter clockwise direction in FIGURE 10; and that pulley will cause the upper face of the belt 108 to move upwardly and to the left in FIGURE 10. Quarters in the hopper 154 will tend to cling to that upper face of that belt and to move toward the funnel associated with the tube 184. Because the hopper 154 is narrower than twice the diameter of a quarter, the quarters will not be able to approach that funnel in side-by-side relation; and as each quarter approaches that funnel it will tilt off of the trailing edge of the belt 108 and pass downwardly through that funnel into the tube 184.

As the quarters move upwardly along the upper surface of the belt 108, those quarters will pass under the reduced width portion 132 of the gate 130; and that reduced width portion will intercept and hold any quarters which are superimposed upon other quarters. However, that reduced width portion will permit the lowermost quarters to pass freely below it and move toward the gate 142. If, by chance, any superimposed quarters were to pass below the lower edge of the reduced width portion 132 of the gate 130, the reduced width portion 144 of the gate 142 would intercept and hold those superimposed quarters. As a result, only the lowermost quarters on the belt 108 will be able to pass beneath the reduced width portion 144 of the gate 142. Three quarters are indicated by dotted lines in FIGURE 10, and one of those quarters is about to tilt over and fall into the funnel 190, another of those quarters is passing under the reduced width portion 144 of the gate 142, and the last of those quarters has just passed under the reduced width portion 132 of the gate 130.

In the event several quarters were, somehow, to become locked together and engage the reduced width portion 132 of the gate 130, that gate would rotate toward the dotted-line position in FIGURE 10 rather than jam the coin-dispensing device. Throughout the time the reduced width portion 132 of the gate 130 is displaced from the solid-line position of FIGURE 10, that portion will apply a downward force to those quarters; and that force may separate those quarters so they can pass freely under the reduced width portion 144 of the gate 142 and into the funnel 190 associated with the tube 184. However, if those quarters do not separate but, instead, remain locked together, those quarters will urge the reduced width portion 144 of the gate 142 toward the dotted-line position of FIGURE 10. Throughout the time the reduced width portion 144 of the gate 142 is displaced from the solid-line position of FIGURE 10, that portion will apply a downward force to those quarters; and that force may separate those quarters so they can freely pass into the funnel 190 associated with the tube 184. In this way, the gates 130 and 142 can provide forces which will tend to cause quarters passing to the funnel 190, associated with the tube 184, to separate and lie flat on the belt 108.

As the belt 108 is driven by the pulley 106, that belt will force the eccentric rollers 80 and 82 to rotate in the counter clockwise direction in FIGURE 10. The eccentric roller 80 will recurrently rotate from the solid-line to the dotted line position in FIGURE 10 and back, and the roller 82 will recurrently rotate from the solid-line to the dotted-line position in FIGURE 10 and back. As those eccentric rollers so rotate, they will provide a "heaving" action for the coins which are disposed above those rollers; and that heaving action will tend to keep those coins from assuming positions wherein the frictional forces between those coins and the belt 108 are minimal. Those eccentric rollers will thus facilitate movement of quarters upwardly along the belt 108 toward the funnel 190 associated with the tube 184.

Also, as the belt 108 is driven by the pulley 106, that belt will cause the pulley 90 to rotate. The rotation of that pulley will cause the roller 104 on crank arm 102 to engage the free end of leaf spring 70 and bow that free end upwardly to the dotted-line position of FIGURE 3. That roller will then release that spring; and that spring will snap back down through the solid-line position shown in FIGURE 3; and, as that spring does so, it will strike the ear 64 on the actuator 62 and cause the ear 66 of that actuator to apply a sharp, upwardly-directed blow to coins adjacent the V-shaped bottom of the hopper 154. The blow applied by the ear 166 is powerful; and it sometimes causes coins to be thrown upwardly toward the upper end of the belt 108. However, most such coins are intercepted by the rod 122 and are thus kept from moving into engagement with the upper end of the belt 108. As those coins strike the rod 122, the springs 124 yield slightly and enable that rod to absorb much of the kinetic energy of those coins.

The roller 104 on crank arm 102 also will cause the free end of the leaf spring 86 to bow from the solid-line to the dotted-line position of FIGURE 3. As that free end is bowed down to the dotted-line position of FIGURE 3, the lever 94 will rotate in the clockwise direction in FIGURE 3. However, as the roller 104 moves beyond the free end of the leaf spring 86, that spring will force the lever 94 to rotate sharply in the counter clockwise direction; and the ear 98 on that lever will apply a sharp, upwardly-directed blow to the belt 108 adjacent one edge of that belt. That blow will force the coins above that edge of the belt to move relative to each other.

The blows which the agitator 62 and the one edge of the belt 108 apply to the coins in the hopper 154 will displace many of those coins. That displacement will coact with the heaving action provided by the eccentric rollers 80 and 82 to keep the coins within the hopper 154 from assuming positions wherein the frictional forces between these coins and the belt 108 are minimal. The overall result is that the belt 108 will provide a steady succession of quarters moving toward the upper end of the belt 108 for delivery into the funnel 190 and thence into the tube 184.

The sprocket pinions 250, 252 and 254 have pitch diameters which are smaller than the pitch diameters of the sprocket pinions 246 of the clutches 230, 232 and 234. Consequently, the sprocket pinion 250, 252 or 254 will make more than one revolution for each revolution of the sprocket pinion 246 of the corresponding clutch. This means that more than three quarters will be introduced into the tube 184 during each cycle of operation of the coin-dispensing device wherein the feeler 306 of the lever 300 of the level-sensing device adjacent the tube 184 is able to enter the slot 186 in that tube. As a result, as long the hopper 154 has any quarters, an adequate supply of quarters within the tube 184 will be maintained.

While the ear 244 on the plate 242 of clutch 234 acted through lever 308 and spring 314 to force the feeler 304 of lever 300 inwardly through the slot 186 in the tube 184, the ear 244 quickly moved past the ear 310 on the lever 308. Thereupon, the spring 316 moved the ear 304 on the lever 300 out of the tube 184 and rendered the interior of that tube free of obstructions. This means that as the quarters enter the tube 184, they will be free to move downwardly and assume their proper positions within that tube. Even if those coins tended to stand on edge or to lean against the interior of that tube, the tap which the resilient button 332 on the tapper 328 subsequently applies to the tube 184 will cause those coins to assume their proper positions.

During the next cycle of operation of the coin-dispensing device of FIGURES 1-25, the ear 244 on the plate 242 of clutch 234 will again engage the ear 310 on plate 308 and thereby urge feeler 304 on lever 300 inwardly of the slot 186 in tube 184. However, the quarters which were introduced into that tube during the preceding cycle of operation will block inward movement of that feeler; and hence the ear 302 on the lever 300 will lie in the path of the ear 240 on plate 238 of clutch 234. As a result, the plate 238 will be intercepted and held by the ear 302; and, thereupon, the spring 248 will loosen its engagement with the hub 236 of clutch 234, and the sprocket pinion 246 will come to rest. This is very desirable, because it avoids needless movement of the belt 108 and of the components driven by that belt. Further, it avoids needless movement and abrading of the coins in the hopper 154.

It should be noted that the ear 244 on the plate 242 engages the ear 310 on the lever 308 very shortly after the beginning of a cycle of operation of the coin-dispensing device. Further, it should be noted that if the ear 302 is out of the path of the ear 240 on the plate 238, the belt 108 will supply coins to the tube throughout the rest of that cycle of operation and during the first part of the next cycle of operation. As a result, enough coins will be supplied to the tube to more than replace the coins that were dispensed. However, the number of coins supplied to the tube will not be so great that the tube will overflow.

The levels of the nickels and dimes in the tubes 180 and 182 will not move downwardly as rapidly as will the level of the quarters in the tube 184. However, the levels of the nickels and dimes in the tubes 180 and 182 will steadily move downwardly; and eventually the ears 244 on the plates 242 of the clutches 230 and 232 will be able to move the levers 300 far enough toward the tubes 180 and 182 to free the ears 240 on the plates 238 of those clutches. Once those ears have been freed, those clutches will act through the sprocket chains 256 and 258, the sprocket pinions 250 and 252, and the pulleys 106 to cause the belts 108 within the hopper 50 and the central hopper to move nickels and dimes into the funnels 190 associated with the tubes 180 and 182. Further, those belts will cause the eccentric rollers 80 and 82 associated with those belts to provide a heaving action for the nickels and dimes in the hopper 50 and in the middle hopper. In addition, those belts will cause the springs 70 and 86 to force the agitators 62 and the levers 94 to apply sharp, upwardly-directed blows to the coins and to the edges of the belts 108. Those sharp upwardly-directed blows will coact with the said heaving action to force the nickels and dimes in the hopper 50 and in the middle hopper to move relative to each other, and will thereby keep those coins from assuming positions wherein the frictional forces between those coins and the belts 108 are minimal.

If the hopper 50 were made narrower than twice the diameter of a nickel, and if the middle hopper were made narrower than twice the diameter of a dime, those hoppers would keep nickels and dimes from moving along the belts 108 in side-by-side relation. However, such hoppers would not be freely interchangeable with the hopper 154. Consequently, in commercial usage, the hopper 50 and the middle hopper will have the same widths as the hopper 154. This means that two nickels will be able to approach the funnel 190 associated with the tube 180 in side-by-side relation, and it also means that two dimes will be able to approach the funnel 190 associated with the tube 182 in side-by-side relation. However, those nickels and those dimes will not be able to bridge in position above the tubes 180 and 182, respectively; because the funnels associated with those tubes have vertically-spaced and horizontally displaced coin-guiding surfaces 192 and 194 that will force nickels to pass successively into the tube 180 and that will force dimes to pass successively into the tube 182. Similar vertically-spaced and horizontally displaced coin-guiding surfaces 192 and 194 are shown in the funnel associated with the tube 184; and those coin-guiding surfaces are shown in section in FIGURE 23. It will be noted that the coin-guiding surface 192 has an inclination which is not as sharp as the inclination of the coin-guiding surface 194. As a result, when a first coin is intercepted and momentarily held by one of the coin-guiding surfaces 192, a second coin can strike the nearby sharply inclined coin-guiding surface 194 and pass directly into the tube. In this way, any coins which tend to enter the funnels 190 in side-by-side relation are kept from bridging over the ends of the tubes.

As long as there are coins in the hoppers, the levels of the coins in the tubes 180, 182 and 184 will be kept above the levels of the slots 188 in the lower ends of those tubes. Even when there are so few coins in a hopper that there are not enough coins to provide a full layer of coins over the entire surface of the belt 108, the remaining coins will group themselves adjacent that edge of that belt which is spaced from the ear 98 on the lever 94. That edge of that belt will move those coins upwardly into the funnel and thence into the tube.

However, if a hopper ever becomes empty, the level of the coins within the adjacent tube will continue to fall until that level is below the level of the finger 322 of the empty feeler 320. During the next cycle of operation of the coin dispensing device of FIGURES 1–25, the movement of the notch in the notched plate 264 into register with the roller 283 on the lever 282 will permit the spring 326 for the empty feeler 320, adjacent the empty tube, to move the finger 322 thereof inwardly through the slot 188 of that tube. As that finger so moves, the ear 324 on that empty feeler will force the pin 318 and the shaft 280 to the dotted-line position of FIGURE 11; and, thereupon, the lever 282 will be moved to the dotted-line position of FIGURE 12. As that lever is so moved, the movable contact of the empty switch 276 will shift to its right-hand position, thereby breaking the circuit to the motor 360 and completing a circuit to the empty lamp 368. This means that the coin-dispensing device of FIGURES 1–25 will come to rest. It will be noted that at the time the movable contact of the empty switch 276 shifted to the right, that switch made sure that the electromagnet 388 could not be reenergized. This is desirable because it makes sure that no further dollar bills can be accepted, and hence that no further cycles of operation of the coin-dispensing device of FIGURES 1–25 can be initiated, until the supply of coins has been replenished. It should also be noted that the movable contact of the switch 276 was not permitted to shift its position until after the lobe-forming plates 220, 222 and 218 had moved and then released the actuators 338. This is desirable because it means that the patron will receive the money due him before the circuit to the coin-dispensing device is broken. In this way, patrons of the money-actuated device, with which the coin-dispensing device of FIGURES 1–25 is used, are protected.

Whenever the operator of the money-actuated device, with which the coin-dispensing device of FIGURE 1 is used, wishes to replenish the supply of change, he need only raise the covers 128 of the various hoppers and introduce coins of the proper denominations. If that operator ever finds a tube which is so empty that the finger 322 of the corresponding empty feeler has entered that tube, he need only start moving the lever 282 to the solid-line position shown in FIGURE 12; and, thereupon, the motor 360 will rotate the shaft 207 and the notched plates 264 and 266 to the position shown by FIGURE 12. At such time, the notched plate 264 will coact with the lever 282, the shaft 280, and the pins 318 to force the fingers 322 of the empty feelers 320 out of the tube 180, 182 and 184. The interiors of those tubes will then be unobstructed, and the operator will be able to fill the tubes 180, 182 and 184 with ease.

It will be noted that the eccentric rollers 80 and 82 underlie and help support the belts 108. Also, the inclined bottom walls 54 of the hoppers will underlie and help support those belts; because, while the eccentric rollers 80 and 82 can hold the belts 108 spaced above those inclined bottom walls when the hoppers are empty, as shown by FIGURES 2, 3, 10, 18 and 19, the weights of the coins in the hoppers will bend portions of the belts down into engagement with the inclined bottom walls 54. The support which the eccentric rollers 80 and 82 and which the inclined bottom walls 54 provide for the belts 108 is important, because it will relieve those belts of the unduly great tensile forces to which those belts would be subjected if they had to serve as the sole support for those coins.

It will be noted that the various coins leave the hoppers adjacent the upper ends of those hoppers rather than at the bottoms of those hoppers. This is important because it means that the coins which are moved toward the funnels are not being subjected to the heavy weights of large masses of closely-packed coins. As a result, the coins which are moved toward the funnels are able to assume positions on the belts which are natural and which will enable those belts to move those coins steadily upwardly toward the funnels. Also, because the various coins leave the hoppers adjacent the upper ends of those hoppers rather than at the bottoms of those hoppers, the forces which tend to hold the coins against separation from the masses of coins in those hoppers are minimal.

The ejectors 160, 162 and 164 are made quite thin— all of those ejectors being thinner than a thin dime. This is desirable because it will enable the ejector 160 to eject a dime from the tube 180 if that dime accidentally gets into the hopper 50 or the tube 180. Similarly, it will enable the ejector 164 to eject a dime from the tube 184 if that dime accidentally gets into the hopper 154 or the tube 184. If the ejectors 160 and 164 were thick, and if the dimes accidentally got into the hoppers 50 and 154 or into the tubes 180 and 184, those ejectors would engage the nickels or quarters overlying those dimes and tend to jam those nickels or quarters against the side walls of the tubes 180 and 184.

The men who service money-actuated devices frequently find it desirable to count the amount of money stored within the coin-dispensing devices used with those money-actuated devices. The coin-dispensing device provided by the present invention facilitates rapid emptying of the tubes and hoppers by making those tubes readily removable and by pivotally mounting those hoppers. To empty the tubes 180, 182 and 184, it is only necessary to slip the wire-like clamps 200 forwardly and away from the abutments 198 on the funnels 190, and then to pull the funnels and tubes upwardly and forwardly. To empty the hoppers, it is only necessary to rotate those hoppers from the normal position shown by solid lines in FIGURE 24 toward the rotated position shown by dotted lines in FIGURE 24. In that rotated position, the upper faces of the belts 108 incline forwardly and downwardly at a steep angle; and, as the hoppers are moved toward that position, the coins therein will slide along the upper faces of those belts, will slide under the reduced width portions 132 and 144, respectively, of the gates 130 and 142, and will fall into a suitable receptacle which is held adjacent the pulleys 106. The hoppers can be rotated individually; and hence the coins from one hopper need not be mixed with coins from the other hoppers.

If desired, the sprocket chains 256, 258 and 260 could be replaced with gear trains. Where that is done, the hoppers could be made so they could be bodily lifted up and separated from the brackets 40 and 42.

If the operator of a money-actuated device, with which the coin-dispensing device of FIGURE 1 is used, ever wished to change the denomination of coins dispensed by any given tube, he need only remove that tube, its funnel, and its bracket 170 and insert a tube, funnel, and bracket 170 designed for the different denomination coin. The removal of the funnel and tube will merely require bending of the wire-like clamp 200, and the removal of the bracket 170 will merely require the removal of two screws. Nothing whatsoever need be done to the hopper, except to empty it and then fill it with coins of the desired denomination.

The short notches 35 in the base 31 are helpful in facilitating the dispensing of coins which are bent so the lower faces thereof are convex. Also, as described hereinbefore, the concave edges of the discharge openings 174 of brackets 166, 168 and 170 facilitate the dispensing of coins which are bent so the upper faces thereof are convex.

The hoppers of FIGURE 1 supply coins to tubes which have circular cross sections. However, those hoppers could also be used to supply coins to channel-like tubes of the type shown in Erickson et al. U.S. Patent No. 3,004,541 for Change Coin Delivery Mechanism which was granted October 17, 1961. It should also be noted that while the hoppers of FIGURE 1 are used to supply that coins to tubes which are intended to dispense coins, those hoppers could also be used to supply coins to other types of tubes.

FIGURES 26–30 show a modified form of coin-dispensing device that is made in accordance with the principles and teachings of the present invention. That modified form differs from the coin-dispensing device of FIGURES 1–25 solely in the mounting of an electromagnet on the hopper 154, in the mounting of three switches 460, 462 and 464 adjacent the shaft 207, in the mounting of a cam 466 on that shaft to actuate those switches, in the shifting of the cams 208, 210 and 212 circumferentially of the shaft 207, and in the use of a different electrical circuit.

A bracket 348 is used to mount the said electromagnet on one wall of the hopper 154, as shown by FIGURES 26 and 27; and the coil of that electromagnet is denoted by the numeral 346. That electromagnet has an armature 350 which is biased into the path of the ear 342, on the actuator 338 for ejector 164, by the spring 347 of that electromagnet. However, that armature can respond to energization of the coil 346 to move out of the path of that ear.

The switches 460, 462 and 464 are, for convenience, mounted on the bracket 40 adjacent the left-hand end of the coin-dispensing device of FIGURE 1. Those switches are spaced apart about one hundred and twenty degrees. Suitable sheets of insulation are shown in position between those switches and that bracket. The cam 466 is a notched plate, and the notch in that cam can successively accommodate the rollers on the actuating arms of the switches 460, 462 and 464. The shaft 207 rotates in the clockwise direction in FIGURE 28.

The cams 208, 210 and 212 of the coin-dispensing device of FIGURES 26–30 have been rotated almost ninety degrees in the clockwise direction from the positions which those cams occupy in the coin-dispensing device of FIGURES 1–25. Consequently, instead of having the smallest-radius portion of the lobe-forming plate 220 abutting the roller 339, as does FIGURE 10, FIGURE 26 has the largest-radius portion of that plate abutting that roller. This means that the cams 208, 210 and 212 of the modified coin-dispensing device will dispense coins earlier in the cycle of operation of that device than will the cams 208, 210 and 212 of the coin-dispensing device of FIGURES 1–25.

The circuit of FIGURE 30 has conductors 400 and 402 which can be suitably connected to a source of power; and the conductor 400 has junctions 404, 440, 412, 476, 482 and 484 therein, while the conductor 402 has junctions 486, 456, 432, 424, 426, 416 and 480 therein. Junctions 422, 428, 444, 446, 452, 478, and 488 also are present in the circuit of FIGURE 30. The numeral 406 denotes contacts that are actuated momentarily whenever a quarter is inserted in the money-actuated device with which the coin-dispensing device of FIGURES 26–30 is used.

The numeral 408 denotes contacts that are actuated momentarily whenever a half-dollar is inserted in the money-actuated device with which the coin-dispensing device of FIGURES 26–30 is used. The contacts 410 are controlled by a currency-checking device which is associated with the money-actuated device with which the coin-dispensing device of FIGURES 26–30 is used; and the movable contact 410 will move down momentarily whenever an authentic dollar bill has been accepted by that currency-checking device.

The numeral 455 denotes a relay coil which controls normally-open relay contacts 453, 458 and 459 and also controls normally-closed relay contacts 457. The numeral 454 denotes a relay coil which controls normally-open relay contacts 468, 470 and 472 and also controls normally-closed relay contacts 474. The numeral 430 denotes a relay coil which controls normally-open relay contacts 434 and 436 and also controls normally-closed relay contacts 438. The numeral 414 denotes an empty lamp; and the numerals 418 and 420 denote the normally-energized coils of mechanically-latched relays. Whenever the coils 418 and 420 become de-energized, those relays will latch themselves in position to keep further quarters, half-dollars and dollars from shifting the movable contacts 406, 408 and 410, respectively. However, a service man can easily reset those relays when he fills the tubes and hoppers of the coin-dispensing device of FIGURES 26–30.

If a quarter is inserted in the money-actuated device, the movable contact 406 will move downwardly and complete a circuit which extends from conductor 400 via junction 404, the movable and lower contacts 406, junction 428, relay coil 430, and junction 432 to the conductor 402. The resulting energization of that relay coil will close relay contacts 434 and 436 and will open relay contacts 438. The closing of relay contacts 434 will establish a holding circuit which extends from conductor 400 via junction 440, switch 462, now-closed relay contacts 434, junction 428, relay coil 430, and junction 432 to conductor 402; and that circuit will hold that relay coil energized until the switch 462 is opened. The opening of relay contacts 438 is not significant at this time, but the closing of relay contacts 436 pre-sets the motor-starting circuit. That circuit will be completed, as soon as the movable contact 406 moves back up to its normal position; and current will then flow from conductor 400 via the movable and upper contacts 406, the movable and upper contacts 408, the movable and upper contacts 410, junction 444, now-closed relay contacts 436, junction 446, the lower and movable contacts of switch 270, motor 360, and junction 480 to conductor 102. That motor will act through sprocket chain 292 and sprocket pinion 290 to rotate shaft 207 in the counter clockwise direction in FIGURE 12 and in the clockwise direction in FIGURE 28.

Almost immediately the notched plate 266 will shift the movable contact of switch 270 into its upper position; and current will then flow from conductor 400 via junction 484, the upper and movable contacts of switch 272, the upper and movable contacts of switch 270, motor 360, and junction 480 to conductor 402. This means that the motor 360 will remain energized when the relay coil 430 subsequently becomes de-energized.

As the shaft 207 continues to rotate, the lobe-forming plates 220 of the cams 208, 210 and 212 will act upon the rollers 339 to force the actuators 338 even further in the clockwise direction in FIGURE 26, and will then release those rollers. Thereupon the springs 344 will start those actuators moving in the counter clockwise direction in FIGURE 26; and the actuators adjacent tubes 180 and 182 will be able to move the ejectors 160 and 162 forwardly to eject a nickel and a dime. The actuator 338 adjacent the tube 185 will not, however, be able to move the ejector 164 more than a fraction of an inch, because the armature 350 of the electromagnet will intercept and hold that actuator. Shortly thereafter, the notch in the notched plate 466 will move into register with the roller on the actuator of the switch 460 and permit that switch to open. However, the opening of that switch is not significant at this time, because that switch merely controls the relay coil 454; and that relay coil is not energized when a quarter is inserted.

Continued rotation of the shaft 207 will cause the ears 244 on the plates 242 of the clutches 230, 232 and 234 to engage the ears 310 on the levers 308, all as described hereinbefore. Since the tubes 180, 182 and 184 are assumed to be full, the ears 302 on the levers 300 will continue to hold the ears 240 of the plates 238; and hence the clutches 230, 232 and 234 will not set the belts 108 of the various hoppers in motion.

As the motor 360 continues to rotate the shaft 207, the lobe-forming plates 222 on the cams 210 and 212 will engage the rollers 339 on the actuators 338 adjacent the tubes 182 and 184; and those plates will rotate those actuators in the clockwise direction in FIGURE 26. The rotation of the actuator 338 which is adjacent the tube 182 will move the concave leading edge of the ejector 162 rearwardly of the lower end of that tube; and, thereupon, a further dime will move downwardly and come to rest upon the base 31. As the shaft 207 continues to rotate, the lobe-forming plates 222 will move past the pins 339 on the actuators 338 adjacent the tubes 182 and 184, and will release those actuators for rotation in the counter clockwise direction in FIGURE 26. The actuator 338 which is adjacent the tube 182 will move the actuator 162 forwardly and thereby eject a second dime from the tube 182; but the actuator 338 adjacent the tube 184 will again be intercepted and held by the armature 350.

Continued rotation of the shaft 207 will move the notch of the notched plate 466 into engagement with the roller on the actuator of the switch 462 and, thereupon, that switch will open. The opening of that switch will de-energize the relay coil 430, with consequent re-opening of relay contacts 434 and 436 and with consequent re-closing of the relay contacts 438. However, the re-opening of the relay contacts 436 will not de-energize the motor 360 because that motor receives current via switches 272 and 270.

Further rotation of the shaft 207 will cause the ears 244 on the plates 242 to engage the ears 330 on the tappers 328, and thereby move the resilient buttons 332 away from the tubes 180, 182 and 184. After a short time, the ears 244 will move past the ears 330 and permit the springs 326 to move those buttons back into engagement with those tubes, all as described hereinbefore.

As the shaft 207 continues to rotate, the lobe-forming plate 218 of the cam 212 will engage and then pass by the roller 339 on the actuator 338 which is adjacent the tube 184. That actuator will not be able to move the ejector 164 to quarter-dispensing position, because the armature 350 will again intercept and hold that actuator. Shortly thereafter, the notch in the plate 466 will move into register with the roller on the actuator of switch 464; and, thereupon, that switch will open. However, because that switch merely controls the relay coil 455, and because that relay coil is not energized when a quarter is inserted, the opening of the switch 464 is not significant at this time.

Continued rotation of shaft 207 will move the notch in the plate 266 into register with the roller on the actuator of switch 272. The movable contact of that switch will then move downwardly; but while that movement will interrupt one circuit for the motor 360 it will complete a further circuit for that motor. The latter circuit will extend from conductor 400 via junction 404, the movable and upper contacts 406, the movable and upper contacts 408, the movable and upper contacts 410, junction 444, relay contacts 438 and 474, junction 488, relay contacts 457, the lower and movable contacts of switch 272, the upper and movable contacts of switch 270, motor 360, and junction 480 to conductor 402. Almost immediately thereafter, the plate 266 will cause the movable contact of switch 272 to move back up to its normal position; and current will once again flow to the motor 360 via the upper and movable contacts of switches 272 and 270.

Further rotation of the shaft 207 will move the notch in plate 264 into register with the roller 283 on the lever 282. However, because all of the tubes 180, 182 and 184 are full, the springs 326 adjacent the empty feelers 320 will be unable to rotate the lever 282 from the solid-line to the dotted-line position in FIGURE 12. As a result, the movable contact of the empty switch 276 will continue to remain in its upper position in FIGURE 30.

As the shaft 207 approaches the end of its revolution, the notch in the plate 266 will move into register with the roller on the actuator of the switch 270. That roller will move into that notch; and, as it does so, the movable contact of that switch will shift down to its normal position. Since the relay contacts 436, 470 and 458 are all open, the motor 360 will be de-energized and the shaft 207 will come to rest.

During the said revolution of the shaft 207, one nickel and two dimes were dispensed. The actuator 338 for the ejector 164 was moved and then released three times by the lobe-forming plates of the cam 212; but no quarters were dispenesd, because the armature 150 intercepted and held that actuator each time it started moving forwardly. In this way, just the right amount of change is dispensed when a quarter is inserted.

If a half-dollar is ineserted in the money-actuated device, the movable contact 408 will move downwardly and complete a circuit which extends from conductor 400 via junction 404, the movable and upper contacts 406, the movable and lower contacts 408, junction 452, relay coil 454, and junction 456 to conductor 402. The resulting energization of relay coil 454 will close relay contacts 468, 470 and 472 and will open relay contacts 474. The closing of the relay contacts 468 will establish a holding circuit for relay coil 454; and current will flow from conductor 400 via junction 476, switch 460, now-closed relay contacts 468, junction 452, relay coil 454, and junction 456 to conductor 402. The closing of relay contacts 472 will energize the coil 346 of the electromagnet and thereby tend to move the armature 350 out of the path of the ear 342 on the actuator 338 which is adjacent tube 184. The opening of relay contacts 474 is not significant at this time; but the closing of relay contacts 470 will pre-set a circuit for the motor 360. That circuit will be completed when the movable contact 408 moves back up to its upper position; and then current will flow from conductor 400 via junction 404, the movable and upper contacts 406, the movable and upper contacts 408, the movable and upper contacts 410, junction 444, relay contacts 438, relay contacts 470, junctions 478 and 446, the lower and movable contacts of switch 270, motor 360, and junction 480 to conductor 402. That motor will act through sprocket chain 292 and sprocket pinion 290 to rotate shaft 207 in the counter clockwise direction in FIGURE 12 and in the clockwise direction in FIGURE 28.

Almost immediately the notched plate 266 will shift the movable contact of switch 270 into its upper position; and current will then flow from conductor 400 via junction 484, the upper and movable contacts of switch 272, the upper and movable contacts of switch 270, motor 360, and junction 480 to conductor 402. This means that the motor 360 will remain energized when the relay coil 454 subsequently becomes de-energized.

As the shaft 207 continues to rotate, the lobe-forming plates 220 of the cams 208, 210 and 212 will act upon the rollers 339 to force the actuators 338 even further in the clockwise direction in FIGURE 26, and will then release those rollers. Thereupon the springs 344 will start those actuators moving in the counter clockwise direction in FIGURE 26; and these actuators will cause the ejectors 160, 162 and 164 to dispense a nickel, a dime and a quarter—the coil 346 of the electromagnet holding the armature 350 out of the path of the ear 342 on the actuator which moves the ejector 164. Shortly thereafter, the notch in the notched plate 466 will move into register with the roller on the actuator of the switch 460 and permit that switch to open. The opening of that switch will de-energize the relay coil 454, with consequent re-opening of relay contacts 468, 470 and 472 and with consequent re-closing of the relay contacts 474. The motor 360 will continue to rotate—receiving current via the upper and movable contacts of the switches 272 and 270; but, significantly, the coil 346 of the electromagnet will become de-energized and will permit the armature 350 to move into the path of the ear 342 on the actuator 338 which is adjacent the tube 184. The re-closing of the relay contacts 474 is not significant at this time.

Continued rotation of the shaft 207 will cause the ears 244 on the plates 242 of the clutches 230, 232 and 234 to engage the ears 310 on the levers 308, all as described hereinbefore. Since the tubes 180, 182 and 184 are assumed to be full, the ears 302 on the levers 300 will continue to hold the ears 240 of the plates 238; and hence the clutches 230, 232 and 234 will not set the belts 108 of the various hoppers in motion.

As the motor 360 continues to rotate the shaft 207, the lobe-forming plates 222 on the cams 210 and 212 will engage the rollers 339 on the actuators 338 adjacent the tubes 182 and 184; and those plates will rotate those actuators in the counter clockwise direction in FIGURE 26. That rotation will move the ejectors 162 and 164 rearwardly of the tubes 182 and 184 and permit a second dime and a second quarter to move downwardly and come to rest upon the base 31. As the actuator 338 which is adjacent the tube 184 is moved rearwardly, the ear 342 on that actuator will engage the armature 350; but the spring 347 will yield to permit that ear to move that armature out of its path. However, once the ear 342 has moved rearwardly of that armature, that spring will move that armature back into position to block forward movement of that ear. As the shaft 207 continues to rotate, the lobe-forming plates 222 will move past the pins 339 on the actuators 338 adjacent the tubes 182 and 184, and will release those actuators for rotation in the counter clockwise direction in FIGURE 26. The actuator 338 adjacent ejector 162 will move that actuator forwardly and dispense a second dime, but the armature 350 will intercept and hold the actuator 338 which is adjacent ejector 164.

Continued rotation of the shaft 207 will move the notch of the notched plate 466 into engagement with the roller on the actuator of the switch 462; and thereupon, that switch will open. The opening of that switch will not be effective at this time; because that switch merely controls the relay coil 430, and that relay coil is not actuated when a half-dollar is inserted. Further rotation of the shaft 207 will cause the ears 244 on the plate 242 to engage the ears 330 on the tappers 328, and thereby move the resilient buttons 332 away from the tubes 180, 182 and 184. After a short time, the ears 244 will move past the ears 330 and permit the springs 326 to move those buttons back into engagement with those tubes, all as described hereinbefore.

As the shaft 207 continues to rotate, the lobe-forming plate 218 of the cam 212 will engage and then pass by the roller 339 on the actuator 338 which is adjacent the tube 184. That actuator will not be able to move the ejector 164 to quarter-dispensing position, because the armature 450 will again intercept and hold that actuator. Shortly thereafter, the notch in the plate 466 will move into register with the roller on the actuator of switch 464; and, thereupon, that switch will open. However, because that switch merely controls the relay coil 455, and because that relay coil is not energized when a half-dollar is inserted, the opening of the switch 464 is not significant at this time.

Continued rotation of shaft 207 will move the notch in the plate 266 into register with the roller on the actuator of switch 272. The movable contact of that switch will then move downwardly; but while that movement will interrupt one circuit for the motor 360 it will complete a further circuit for that motor. The latter circuit will extend from conductor 400 via junction 404, the movable and upper contacts 406, the movable and upper contacts 408, the movable and upper contacts 410, junction 444, relay contacts 438 and 474, junctions 488, relay contacts 457, the lower and movable contacts of switch 272, the upper and movable contacts of switch 270, motor 360, and junction 480 to conductor 402. Almost immediately thereafter, the plate 266 will cause the movable contact of switch 272 to move back up to its normal position; and current will once again flow to the motor 360 via the upper and movable contacts of switches 272 and 270.

Further rotation of the shaft 207 will move the notch in plate 264 into register with the roller 283 on the lever 282. However, because all of the tubes 180, 182 and 184 are full, the springs 326 adjacent the empty feelers 320 will be unable to rotate the lever 282 from the solid-line to the dotted-lined position in FIGURE 12. As a result, the movable contact of the empty switch 276 will continue to remain in its upper position in FIGURE 30.

As the shaft 207 approaches the end of its revolution, the notch in the plate 266 will move into register with the roller on the actuator of the switch 270. That roller will move into that notch; and, as it does so, the movable contact of that switch will shift down to its normal position. Since the relay contacts 436, 470 and 458 are all open, the motor 360 will be de-energized and the shaft 207 will come to rest.

During the said revolution of the shaft 207, one nickel, two dimes, and a quarter were dispensed. The actuator 338 for the ejector 164 was moved and then released three times by the lobe-forming plates of the cam 212; but only one quarter was dispensed, because the switch 452 re-opened after the first quarter was dispensed and the armature 350 thereafter blocked forward movement of that actuator. In this way, just the right amount of change is dispensed when a half-dollar is inserted.

If a dollar is inserted in the money-actuated device, the movable contact 410 will move downwardly and complete a circuit which extends from conductor 400 via junction 404, the movable and upper contacts 406, the movable and upper contacts 408, the movable and lower contacts 410, relay coil 455, and junction 486 to conductor 402. The resulting energization of that relay coil will close relay contacts 453, 458 and 459 and will open relay contacts 457. The closing of relay contacts 453 will establish a holding circuit which extends from conductor 400 via junction 482, switch 464, now-closed relay contacts 453, relay coil 455, and junction 486 to container 402; and that circuit will hold that relay coil energized until the switch 464 is opened. The opening of relay contacts 457 is not significant at this time, but the closing of relay contacts 459 energizes the coil 346 of the electromagnet and thereby tends to move the armature 350 out of the path of the ear 342 on the actuator 338 which is adjacent tube 184. The closing of the relay contacts 458 pre-sets the motor starting circuit; and that circuit will be completed as soon as the movable contact 410 moves back up to its normal position. Current will then flow from conductor 400 via the movable and upper contacts 406, the movable and upper contacts 408, the movable and upper contacts 410, junction 444, relay contacts 438 and 474, now-closed relay contacts 458, junctions 478 and 446, the lower and movable contacts of switch 270, motor 360, and junction 480 to conductor 102. That motor will act through sprocket pinion 290 to rotate shaft 207 in the counter clockwise direction in FIGURE 12 and in the clockwise direction in FIGURE 28.

Almost immediately the notched plate 266 will shift the movable contact of switch 270 into its upper position; and current will then flow from conductor 400 via junction 484, the upper and movable contacts of switch 272, the upper and movable contacts of switch 270, motor 360, and junction 480 to conductor 402. This means that the motor 360 will remain energized when the relay coil 455 subsequently becomes de-energized.

As the shaft 207 continues to rotate, the lobe-forming plates 220 of the cams 208, 210 and 212 will act upon the rollers 339 to force the actuators 338 even further in the clockwise direction in FIGURE 26, and will then release those rollers. Thereupon the springs 344 will start those actuators moving in the counter clockwise direction in FIGURE 26; and those actuators will cause the ejectors 160, 162 and 164 to dispense a nickel, a dime and a quarter—the coil 346 of the electromagnet holding the armature 350 out of the path of the ear 342 on the actuator which moves the ejector 164. Shortly thereafter, the notch in the notched plate 466 will move into register with the roller on the actuator of the switch 460 and permit that switch to open. However, the opening of that switch is not significant at this time, because that switch merely controls the relay coil 454; and that relay coil is not energized when a dollar is inserted.

Continued rotation of the shaft 207 will cause the ears 244 on the plates 242 of the clutches 230, 232 and 234 to engage the ears 310 on the levers 308, all as described hereinbefore. Since the tubes 180, 182 and 184 are assumed to be full, the ears 302 on the levers 300 will continue to hold the ears 240 of the plates 238; and hence the clutches 230, 232 and 234 will not set the belts 108 of the various hoppers in motion.

As the motor 360 continues to rotate the shaft 207, the lobe-forming plates 222 on the cams 210 and 212 will engage the rollers 339 on the actuators 338 adjacent the tubes 182 and 184; and those plates will rotate those actuators in the counter clockwise direction in FIGURE 26. That rotation will move the ejectors 162 and 164 rearwardly of the tubes 182 and 184 and permit a second dime and a second quarter to move downwardly and come to rest upon the base 31. As the shaft 207 continues to rotate, the lobe-forming plates 222 will move past the pins 339 on the actuators 338 adjacent the tubes 182 and 184, and will release those actuators for rotation in the counter clockwise direction in FIGURE 26. Those actuators will then move forwardly and dispense a second dime and a second quarter—the coil 346 of the electromagnet holding the armature 350 out of the path of the ear 342 on the actuator which moves the ejector 164.

Continued rotation of the shaft 207 will move the notch of the notched plate 466 into engagement with the roller on the actuator of the switch 462; and, thereupon, that switch will open. The opening of that switch will not be effective at this time; because that switch merely controls the relay coil 430, and that relay coil is not actuated when a dollar is inserted. Further rotation of the shaft 207 will cause the ears 244 on the plates 242 to engage the ears 330 on the tappers 328, and thereby move the resilient buttons 332 away from the tubes 180, 182 and 184. After a short time, the ears 244 will move past the ears 330 and permit the springs 326 to move those buttons back into engagement with those tubes, all as described hereinbefore.

As the shaft 207 continues to rotate, the lobe-forming plate 218 of the cam 212 will engage the roller 339 on the actuator 338 which is adjacent the tube 184 and will move that actuator rearwardly. The ejector 164 will move rearwardly with that actuator and will permit a third quarter to move downwardly and come to rest on the base 31. When the lobe-forming plate 218 of the cam 212 subsequently moves beyond the roller 339 on that actuator, that actuator and the ejector 164 will move forwardly and dispense that third quarter—the coil 346 of the electromagnet holding the armature 350 out of the path of the ear 342 on that actuator.

Shortly thereafter, the notch in the plate 466 will move into register with the roller on the actuator of switch 464; and, thereupon, that switch will open. Thereupon, the relay coil 455 will become de-energized; and then relay contacts 453, 459 and 458 will re-open and relay contacts 457 will re-close. The motor 360 will continue to rotate—receiving current via the upper and movable contacts of the switches 272 and 270; but the coil 346 of the electromagnet will become de-energized and will permit the armature 350 to move into the path of the ear 342 on the actuator 338 which is adjacent the tube 184. The re-closing of the relay contacts 457 is not significant at this time.

Continued rotation of shaft 207 will move the notch in the plate 266 into register with the roller on the actuator of switch 272. The movable contact of that switch will then move downwardly; but while that movement will interrupt one circuit for the motor 360 it will complete a further circuit for that motor. The latter circuit will extend from conductor 400 via junction 404, the movable and upper contacts 406, the movable and upper contacts 408, the movable and upper contacts 410, junction 444, relay contacts 438 and 474, junction 488, relay contacts 457, the lower and movable contacts of switch 272, the upper and movable contacts of switch 270, motor 360, and junction 480 to conductor 402. Almost immediately thereafter, the plate 266 will cause the movable contact of switch 272 to move back up to its normal position; and current will once again flow to the motor 360 via the upper and movable contacts of switches 272 and 270.

Further rotation of the shaft 207 will move the notch in plate 264 into register with the roller 283 on the lever 282. However, because all of the tubes 180, 182 and 184 are full, the springs 326 adjacent the empty feelers 320 will be unable to rotate the lever 282 from the solid-line to the dotted-line position in FIGURE 12. As a result, the movable contact of the empty switch 276 will continue to remain in its upper position in FIGURE 30.

As the shaft 207 approaches the end of its revolution, the notch in the plate 266 will move into register with the roller on the actuator of the switch 270. That roller will move into that notch; and, as it does so, the movable contact of that switch will shift down to its normal position. Since the relay contacts 436, 470 and 458 are all open, the motor 360 will be de-energized and the shaft 207 will come to rest.

During the said revolution of the shaft 207, one nickel, two dimes, and three quarters were dispensed. In this way, the correct amount of change is dispensed when a dollar is inserted.

The relay contacts 436, 470 and 458 perform a dual function. The first function of those relay contacts is to keep open the starting circuits of the motor 360 until after money has been introduced into the money-actuated device. The second function of those relay contacts is to make sure that the movable contacts 406, 408 and 410 return to their upper positions, as by requiring the starting current for the motor 360 to pass through the movable and upper contacts 406, 408 and 410. The normally-closed relay contacts 438, 474 and 457 coact with the switch 272 to halt further rotation of the shaft 207 if one or more of the relay coils 430, 454 and 455 fails to become de-energized. Specifically, if any one of those relay coils has, prior to the time the movable contact of switch 272 has been moved downwardly, failed to become de-energized, the normally-closed contacts controlled by that one relay coil will still be open and will keep current from flowing to the motor 360.

In the foregoing description of the operation of the coin-dispensing device of FIGURES 26–30, it was assumed that the tubes 180, 182 and 184 were full. Whenever the level of the coins in any of those tubes falls below the level of the feeler 304 for that tube, that feeler will pass into that tube during the next cycle of operation of that coin-dispensing device. The ear 240 on the plate 238 of the clutch adjacent that tube will then be free to rotate; and, consequently, the belt 108 in the hopper adjacent that tube will start moving coins into the funnel 190 for that tube—all as described hereinbefore. The lower edges of the feelers 304 are located far enough below the tops of the tubes 180, 182 and 184 to make sure that the amounts of coins introduced into those tubes after those feelers have entered and then moved back out of those tubes will not cause those tubes to overflow.

If a hopper adjacent one of the tubes of the coin-dispensing device of FIGURES 26–30 were to become empty, the level of the coins in that tube could, during a cycle of operation of that device, fall below the level of the finger 322 of the empty feeler 320 for that tube. Subsequently, during that cycle of operation, the notched plate 264 will free the lever 282; and, thereupon, the spring 326 adjacent that empty feeler will rotate the shaft 280 and the lever 282 to the dotted-line position in FIGURE 12. The movable contact of switch 276 will then move downwardly, thereby illuminating the empty lamp 414 and de-energizing the relays 418 and 420. The empty lamp 414 will indicate to patrons that they should not insert further quarters, half-dollars and dollars into the money-actuated devices, and the relays 418 and 420 will prevent the acceptance of any further quarters, half-dollars and dollars which might, nevertheless, be inserted.

In replenishing the supply of coins for the coin-dispensing device of FIGURES 26–30, the operator will proceed in the manner described hereinbefore. Further, in initially filling the tubes and hoppers of that coin-dispensing device, the operator will proceed in the manner described hereinbefore.

The circuits shown in FIGURES 25 and 30 are intended to illustrate the operation of the coin-dispensing devices of FIGURES 1–25 and 26–30. However, other circuits could be used with those coin-dispensing devices.

In the operation of the coin-dispensing device of FIGURES 1–25, each cycle of operation of that device will dispense one nickel, two dimes, and three quarters. Specifically, the cam 208 is set to operate as a one-lobe cam and will dispense one nickel, the cam 210 is set to operate as a two-lobe cam and will dispense two dimes, and the cam 212 is set to operate as a three-lobe cam and will dispense three quarters. The same amount of change could be dispensed by providing one nickel tube and hopper, two dime tubes and hoppers, and three quarter tubes and hoppers and by mounting a one-lobe cam adjacent each of those tubes. The arrangement of FIGURES 1–25 offers economy of space, whereas the arrangement which uses six tubes and hoppers offers optimum coin-holding capacity.

In the operation of the coin-dispensing device of FIGURES 26–30, a nickel and two dimes are dispensed when a quarter is inserted, a nickel, two dimes and a quarter are dispensed when a half-dollar is inserted, and a nickel, two dimes and three quarters are dispensed when a dollar is inserted. Those amounts of change could be dispensed from a coin-dispensing device which had one nickel tube and hopper, two dime tubes and hoppers, and three quarter tubes and hoppers where a one-lobe cam was mounted adjacent each of those tubes and an electromagnet was mounted adjacent each of the quarter tubes. Twenty-five cents in change would be dispensed when none of those electromagnets were energized, fifty cents in change would be dispensed when one of those electromagnets was energized, and a dollar in change would be dispensed when all of those electromagnets were energized.

The coin-dispensing devices of FIGURES 1–25 and 26–30 can be used in vending machines where a product or service is vended and change is then paid out. Where a fixed amount of change is to be paid out, a coin-dispensing device of the type shown in FIGURES 1–25 can be used. Where the amount of change that is to be paid out is variable, an electromagnet should be mounted adjacent most or all of the tubes of that coin-dispensing device. Proper actuation of those electromagnets would then provide the desired amounts of change.

Also, if desired, just one hopper and tube could be mounted in a vending machine. Further, if desired, more than three lobe-forming plates could be provided for the cam of that tube and hopper or for the tubes and hoppers of the coin-dispensing devices of FIGURES 1–25 and 26–30.

Whereas the drawing and accompanying description have shown and described two preferred embodiments of the present invention, it should be apparent to those skilled in the art that various changes may be made in the form of the invention without affecting the scope thereof.

I claim:
1. A coin-dispensing device that comprises:
 (a) a plurality of coin-holding tubes,
 (b) said tubes having inlet and outlets,
 (c) coin ejectors disposed adjacent said outlets of said tubes and being movable relative to said outlets of said tubes to eject coins from said tubes,
 (d) coin-holding hoppers that are adjacent said tubes and that can hold coins which are to be transferred to said tubes,
 (e) funnels at said inlets of said tubes which abut said hoppers and which can receive coins from said hoppers and guide said coins into said tubes,
 (f) at least one of said funnels having vertically spaced and horizontally displaced coin-guiding surfaces,
 (g) said coin-guiding surfaces inclining toward said tube at different angles,
 (h) said coin-guiding surfaces being adapted to guide coins, entering said one funnel, into the inlet of the tube associated with said one funnel,
 (i) the uppermost of said coin-guiding surfaces being adapted to intercept one coin of a pair of coins entering said one funnel in side-by-side relation and to momentarily hold said one coin, whereby the other coin of said pair of coins can move downwardly below the level of said one coin and be guided by said second coin-guiding surface into the tube associated with said one funnel so said coins will successively pass into said tube and not bridge in position above said inlet of said tube, (j) said hoppers being pivoted relative to said tubes for rotation from a normal position to an elevated position, (k) said funnels and said tubes being readily removable to permit ready discharge of coins from said hoppers when said hoppers are rotated toward said elevated position, (l) each of said hoppers having a bottom wall that inclines forwardly and downwardly from the rear of said hopper toward the center of said hopper and having a second bottom wall that inclines forwardly and upwardly from said center of said hopper toward the front of said hopper, (m) the lowermost ends of said bottom walls being spaced apart, (n) a pulley rotatably mounted in the space between said lowermost ends of said bottom walls of each said hopper, (o) a second pulley that is rotatably supported by each said hopper adjacent the front of said hopper and adjacent said funnel, (p) a wide endless belt in each said hopper that is supported by the first said and said second pulleys and that has the upper surface thereof overlying said second bottom wall of said hopper, (q) idler pulleys that engage the under surfaces of said belts and tension said belts, (r) a plurality of eccentric rollers that underlie the upper face of each said belt and that are rotated by said belt, (s) said eccentric rollers periodically rising the portions of each said belt which are in engagement with and which drive said eccentric rollers, (t) said bottom walls providing support for the upper faces of said belts and thereby relieving said belts of the need of carrying the weights of coins within said hoppers, (u) a pivoted lever, for each hopper, that has the axis thereof coaxial with the axis of the first said pulley and that has an ear thereon underlying the upper face of said belt, (v) an elongated leaf spring, for each hopper, that underlies a second ear on said lever and normally holds said lever close to the under surface of said belt, (w) an agitator, for each hopper, that is mounted for rotation relative to the first said bottom wall of said hopper and that has an ear thereon which projects upwardly above the plane defined by the upper surface of the first said bottom wall of said hopper, (x) an elongated leaf spring, for each hopper, adjacent said agitator that ordinarily holds said ear on said agitator in a predetermined position relative to said plane, (y) a crank arm, for each hopper, that is mounted on and that is rotatable with the first said pulley and that can engage and move the free ends of said springs to store energy within said springs, (z) said crank arm moving out of engagement with said free ends of said springs and thereby permitting the restorative forces within said springs to act upon said lever and upon said agitator to apply sharp blows to said belt and to coins, respectively, (aa) said lever applying blows to just one edge of said belt, whereby said belt can cause coins to move along the opposite edge thereof despite the sharp blows imparted to the said one edge of said belt by said lever, (ab) a rod, for each hopper, that is held in position adjacent the lowermost ends of the bottom walls of said hopper and that can move vertically, when struck by coins thrown by said agitator, (ac) springs that normally hold said rods in a lower position but that can respond to forces applied to said rods by thrown coins to permit said rods to move upwardly, (ad) a gate, for each hopper, that is rotatably mounted on said hopper and that has a portion thereof extending toward but terminating short of the upper surface of said belt, (ae) said portion of said gate being spaced from said upper surface of said belt a distance greater than the thickness of coins to be held within said hopper but less than a distance twice the thickness of said coins, (af) a second gate, for each hopper, that is rotatably secured to said hopper and that has a portion thereof extending toward but terminating short of said upper surface of said belt, (ag) said portion of said second gate being spaced from said upper surface of said belt a distance greater than the thickness of coins to be held within said hopper but less than twice the thickness of said coins, (ah) said portions of said gates being resiliently biased toward said upper surfaces of said belts but being adapted to move away from said upper surfaces of said belts, to keep coins from jamming against said portions, (ai) the gates for each hopper being in tandem whereby said portions of said second gates can intercept and hold superimposed coins which manage to pass between said belt and said portions of the first said gates, (aj) a shaft that extends adjacent each of said tubes, (ak) a plurality of clutches mounted on said shaft so a clutch is disposed adjacent each tube, (al) each of said clutches having a driving member that is coupled to the second pulley of the adjacent hopper, whereby said clutch can transmit power from said shaft to said second pulley to rotate said pulley and thereby cause the upper surface of said belt to move coins upwardly along said surface of said belt toward said funnel, (am) a lever-sensing device for each of said tubes that has a feeler alined with an opening adjacent the upper end of said tube, (an) said level-sensing devices being adapted to coact with the clutches for said tubes to keep said clutches from driving the second pulleys of said hoppers in the event the levels of coins in said tubes are high enough to prevent the entry of said feelers into said tubes but being adapted to cause said clutches to permit said shaft to drive said second pulleys of said hoppers in the event said feelers are permitted to enter said tubes, (ao) a tapper rotatably mounted adjacent each said tube and responding to rotation of said shaft to apply a blow to said tube during each revolution of said shaft, and thereby facilitate the proper positioning of coins within said tube, (ap) an empty feeler that is mounted adjacent each tube and that is biased for movement into said tube, (aq) a second shaft that extends adjacent each of said tubes, (ar) a member that holds said second shaft in a predetermined position throughout most of the cycle of operation of said coin-dispensing device but that permits said second shaft to move to a second position shortly before the end of said cycle of operation, (as) abutments on said shaft that hold said empty feelers out of feeling position whenever said second shaft is in said predetermined position but that permit said empty feelers to move toward feeling position whenever said second shaft is permitted to move to said second position, (at) the bias on one of said empty feelers being adapted to move said second shaft to said second position during the latter part of a cycle of operation of said coin-dispensing device in the event the level of coins in the tube with which said one empty feeler is associated is below the level of said empty feeler, (au) actuators adjacent the coin ejectors of said tubes, (av) cams that are mounted on the first said shaft and that can cause said actuators to move said coin ejectors and thereby effect the dispensing of coins from said tubes, (aw) each said cam having a hub with a recessed shoulder thereon and with a threaded portion thereon, (ax) each said cam having a plurality of lobe-forming plates that have abutments and recesses thereon and that are interposed between said shoulder and said threaded portion of said cam, (ay) each said cam having a nut that is releasably held on said threaded portion of said cam, (az) said abutments and said recesses of said lobe-forming plates and said recesses of said cams permitting said plates to be set and held in angularly-displaced positions relative to each other and relative to said cams, (ba) said nuts coacting with said threaded portions of said cams to hold said lobe-forming plates in desired positions, (bb) said nuts being movable relative to said threaded portions to facilitate adjustment of the desired positions of said lobe-forming plates, (bc) the first said shaft causing said level-sensing devices to sense for the presence of coins in said tubes close to the start of a cycle of operation of said coin-dispensing device, and promptly causing said belts to move and direct coins toward the tubes associated with said belts if the level-sensing devices of said tubes sense low levels of coins within said tubes, and (bd) electrically-controlled members that can intercept said actuators and thereby keep said actuators from moving said coin ejectors to ejecting position.

2. A coin-handling device that comprises:

(a) a tube that can receive and hold coins, (b) a hopper that can hold coins to be transferred to said tube, (c) a funnel that can guide coins into said tube, (d) said hopper being pivoted relative to said tube for rotation from a normal position to an elevated position, (e) said funnel and said tube being readily removable to permit ready discharge of coins from said hopper when said hopper is rotated toward said elevated position, (f) said hopper having a bottom wall that inclines forwardly and upwardly toward the front of said hopper, (g) pulleys mounted adjacent said bottom wall, (h) an endless belt that is supported by said pulleys and that has the upper surface thereof overlying said bottom wall, (i) an eccentric roller that periodically raises the portions of said belt which are in engagement with and which drive said eccentric roller, (j) said bottom wall helping support said belt, (k) a lever that can apply sharp blows to one edge of said belt, (l) a spring that can store energy and apply that energy to said lever to enable said lever to apply said sharp blows to said one edge of said belt, (m) an agitator that can apply sharp blows to coins held within said hopper, (n) a second spring that can store energy and apply that energy to said agitator to enable said agitator to apply said sharp blows to said coins, (o) a rod that can intercept coins thrown by the sharp blows applied by said agitator, (p) a gate that is disposed adjacent said belt and that can keep superimposed coins from passing between it and said belt, (q) a clutch that can selectively cause said pulleys and said belt to move and to advance coins toward said funnel, (r) a level-sensing device for said tube that can sense the level of coins adjacent the upper end of said tube, (s) said clutch and said level-sensing device coacting to cause said pulleys and said belt to move and to advance coins toward said funnel whenever said level-sensing device fails to sense coins in said tube, (t) said level-sensing device sensing the level of coins adjacent the upper end of said tube during the early part of a cycle of operation of said coin-handling device, (u) a tapper that is mounted adjacent said tube and that can tap said tube, (v) said tapper tapping said tube after the time when said clutch can cause said pulleys and said belt to move and to advance coins toward said funnel, (w) said clutch being adapted to initiate movement of said pulleys and said belt during one cycle of operation of said coin-handling device and to continue said movement during part of the succeeding cycle of operation of said coin-handling device, and (x) an empty feeler that can sense the level of coins adjacent the lower end of said tube, (y) said empty feeler sensing the level of coins adjacent the lower end of said tube during the late part of a cycle of operation of said coin-handling device, (z) said level-sensing device being adapted to help cause said hopper to transfer coins to said tube whenever said level-sensing device fails to sense coins in said tube, (aa) the lower edge of said level-sensing device being spaced below the top of said tube a distance greater than the total height of the coins which said belt can introduce into said tube during a cycle of operation of said coin-handling device, (ab) said empty feeler being adapted to help de-energize said coin-handling device whenever said hopper cannot keep said tube filled.

3. A coin-handling device that comprises:

(a) a tube that can receive and hold coins, (b) a hopper that can hold coins to be transferred to said tube, (c) a funnel that can guide coins into said tube, (d) said hopper being pivoted relative to said tube for rotation from a normal position to an elevated position, (e) said funnel and said tube being readily removable to permit ready discharge of coins from said hopper when said hopper is rotated toward said elevated position, (f) said hopper having a bottom wall that inclines forwardly and upwardly toward the front of said hopper, (g) pulleys mounted adjacent said bottom wall, (h) an endless belt that is supported by said pulleys and that has the upper surface thereof overlying said bottom wall, (i) an eccentric roller that periodically raises portions of said belt, (j) said bottom wall helping support said belt, (k) a lever that can apply sharp blows to said belt, (l) a spring that can store energy and apply that energy to said lever to enable said lever to apply said sharp blows to said surface of said belt, (m) an agitator that can apply sharp blows to coins held within said hopper, (n) a second spring that can store energy and apply that energy to said agitator to enable said agitator to apply said sharp blows to said coins, (o) a gate that is disposed adjacent said belt and that can keep superimposed coins from passing between it and said belt, (p) a clutch that can selectively cause said pulleys and said belt to move and to advance coins toward said funnel, (q) a level-sensing device for said tube that can sense the level of coins adjacent the upper end of said tube, (r) said clutch and said level-sensing device coacting to cause said pulleys and said belt to move and to advance coins toward said funnel whenever said level-sensing device fails to sense coins in said tube, (s) said level-sensing device sensing the level of coins adjacent the upper end of said tube during the early part of a cycle of operation of said coin-handling device, (t) said clutch being adapted to initiate movement of said pulleys and said belt during one cycle of operation of said coin-handling device and to continue said movement during part of the succeeding cycle of operation of said coin-handling device, and (u) an empty feeler that can sense the level of coins adjacent the lower end of said tube, (v) said empty feeler sensing the level of coins adjacent the lower end of said tube during the late part of a cycle of operation of said coin-handling device, (w) the lower edge of said level-sensing device being spaced below the top of said tube a distance greater than the total height of the coin which said belt can introduce into said tube during a cycle of operation of said coin-handling device, (x) said empty feeler being adapted to help de-energize said coin-handling device whenever said hopper cannot keep said tube filled.

4. A coin-handling device that comprises:

(a) a tube that can receive and hold coins, (b) a hopper that can hold coins to be transferred to said tube, (c) a funnel that can guide coins into said tube, (d) said hopper having a bottom wall that inclines forwardly and upwardly toward the front of said hopper, (e) pulleys mounted adjacent said bottom wall, (f) an endless belt that is supported by said pulleys and that has the upper surface thereof overlying said bottom wall, (g) an eccentric roller that periodically raises portions of said belt, (h) said bottom wall helping support said belt, (i) a lever that can apply sharp blows to said belt, (j) a spring that can store energy and apply that energy to said lever to enable said lever to apply said sharp blows to said surface of said belt, (k) an agitator that can apply sharp blows to coins held within said hopper, (l) a second spring that can store energy and apply that energy to said agitator to enable said agitator to apply said sharp blows to said coins, (m) a gate that is disposed adjacent said belt and that can keep superimposed coins from passing between it and said belt, (n) a clutch that can selectively cause said pulleys and said belt to move and to advance coins toward said funnel, (o) a level-sensing device for said tube that can sense the level of coins adjacent the upper end of said tube, (p) said clutch and said level-sensing device coacting to cause said pulleys and said belt to move and to advance coins toward said funnel whenever said level-sensing device fails to sense coins in said tube, (q) said level-sensing device sensing the level of coins adjacent the upper end of said tube during the early part of a cycle of operation of said coin-handling device, and (r) an empty feeler that can sense the level of coins adjacent the lower end of said tube, (s) said empty feeler sensing the level of coins adjacent the lower end of said tube during the late part of a cycle of operation of said coin-handling device, (t) the lower edge of said level-sensing device being spaced below the top of said tube a distance greater than the total height of the coins which said belt can introduce into said tube during a cycle of operation of said coin-handling device.

5. A coin-handling device that comprises:

(a) a tube that can receive and hold coins, (b) a hopper that can hold coins to be transferred to said tube, (c) a funnel that can guide coins into said tube, (d) said hopper having a bottom wall that inclines forwardly and upwardly toward the front of said hopper, (e) pulleys mounted adjacent said bottom wall, (f) an endless belt that is supported by said pulleys and that has the upper surface thereof overlying said bottom wall, (g) said bottom wall helping support said belt, (h) a lever that can apply sharp blows to said belt, (i) a spring that can store energy and apply that energy to said lever to enable said lever to apply said sharp blows to said surface of said belt, (j) a gate that is disposed adjacent said belt and that can keep superimposed coins from passing between it and said belt, (k) a clutch that can selectively cause said pulleys and said belt to move and to advance coins toward said funnel, (l) a level-sensing device for said tube that can sense the level of coins adjacent the upper end of said tube, (m) said clutch and said level-sensing device coacting to cause said pulleys and said belt to move and to advance coins toward said funnel whenever said level-sensing device fails to sense coins in said tube, (n) said level-sensing device sensing the level of coins adjacent the upper end of said tube during the early part of a cycle of operation of said coin-handling device, and (o) an empty feeler that can sense the level of coins adjacent the lower end of said tube, (p) said empty feeler sensing the level of coins adjacent the lower end of said tube during the late part of a cycle of operation of said coin-handling device, (q) the lower edge of said level-sensing device being spaced below the top of said tube a distance greater than the total height of the coins which said belt can introduce into said tube during a cycle of operation of said coin-handling device.

6. A coin-handling device that comprises:

(a) a tube that can receive and hold coins, (b) a hopper that can hold coins to be transferred to said tube, (c) said hopper having a bottom wall that inclines forwardly and upwardly toward the front of said hopper, (d) pulleys mounted adjacent said bottom wall, (e) an endless belt that is supported by said pulleys and that has the upper surface thereof overlying said bottom wall, (f) said bottom wall helping support said belt, (g) a lever that can apply sharp blows to said belt, (h) a spring that can store energy and apply that energy to said lever to enable said lever to apply said sharp blows to said surface of said belt, (i) a gate that is disposed adjacent said belt and that can keep superimposed coins from passing between it and said belt, (j) a clutch can selectively cause said pulleys and said belt to move and to advance coins toward said funnel, (k) a level-sensing device for said tube that can sense the level of coins adjacent the upper end of said tube, (1) said clutch and said level-sensing device coacting to cause said pulleys and said belt to move and to advance coins toward said funnel whenever said level-sensing device fails to sense coins in said tube, and (m) an empty feeler that can sense the level of coins adjacent the lower end of said tube, (n) said empty feeler sensing the level of coins adjacent the lower end of said tube during the late part of a cycle of operation of said coin-handling device, (o) the lower edge of said level-sensing device being spaced below the top of said tube a distance greater than the total height of the coins which said belt can introduce into said tube during a cycle of operation of said coin-handling device.

7. A coin-handling device that comprises:
(a) a tube that can receive and hold coins,
(b) a hopper that can hold coins to be transferred to said tube,
(c) said hopper having a bottom wall that inclines forwardly and upwardly toward the front of said hopper,
(d) pulleys mounted adjacent said bottom wall,
(e) an endless belt that is supported by said pulleys and that has the upper surface thereof overlying said bottom wall,
(f) a source of power,
(g) a mechanical clutch that can selectively connect at least one of said pulleys to said source of power and thereby cause said pulleys and said belt to advance coins toward said tube,
(h) a level-sensing device for said tube that can sense the level of coins adjacent the upper end of said tube,
(i) a mechanical connection between said source of power and said level-sensing device that enables said source of power to move said level-sensing device relative to said tube,
(j) a mechanical connection between said level-sensing device and said mechanical clutch,
(k) said level-sensing device being disposed outwardly of said tube during a portion of each cycle of operation of said coin-handling device but being urged inwardly of said tube during another portion of said cycle,
(l) said level-sensing device responding to the presence of a predetermined number of coins within said tube to remain substantially outwardly of said tube during said other portion of said cycle,
(m) said mechanical connection between said level-sensing device and said mechanical clutch keeping said mechanical clutch from interconnecting said source of power and said one pulley when said level-sensing device engages a coin during said other portion of said cycle and is thus forced to remain substantially outwardly of said tube,
(n) said clutch and said level-sensing device and said mechanical connection between said level-sensing device and said mechanical clutch coacting to cause said pulleys and said belt to advance coins toward said tube whenever said lever-sensing device fails to sense coins in said tube, and
(o) an empty feeler that can sense the level of coins adjacent the lower end of said tube,
(p) the lower edge of said level-sensing device being spaced below the top of said tube a distance greater than the total height of the coins which said belt can introduce into said tube during a cycle of operation of said coin-handling device.

8. A coin-handling device that comprises:
(a) a tube that can receive and hold coins,
(b) a hopper that can hold coins to be transferred to said tube,
(c) a member that can move coins, within said hopper, toward said tube,
(d) a source of power that can selectively move said member to move said coins,
(e) a level-sensing device for said tube that can sense the level of coins adjacent the upper end of said tube,
(f) a mechanical connection between said source of power and said level-sensing device that enables said source of power to move said level-sensing device relative to said tube,
(g) said level-sensing device being disposed outwardly of said tube during a portion of each cycle of operation of said coin-handling device but being urged inwardly of said tube during another portion of said cycle,
(h) said level-sensing device responding to the presence of a predetermined number of coins within said tube to remain substantially outwardly of said tube during said other portion of said cycle,
(i) said source of power and said level-sensing device co-acting to cause said member to move coins toward said tube whenever said level-sensing device fails to sense coins in said tube during said other portion of said cycle, and
(j) an empty feeler that can sense the level of coins adjacent the lower end of said tube,
(k) said empty feeler sensing the level of coins adjacent the lower end of said tube during the late part of a cycle of operation of said coin-handling device,
(l) the lower edge of said level-sensing device being spaced below the top of said tube a distance greater than the total height of the coins which said member can introduce into said tube during a cycle of operation of said coin-handling device.

9. A coin-dispensing device which comprises:
(a) a tube that can hold coins to be dispensed by said coin-dispensing device,
(b) a hopper that is adjacent said tube and that can hold coins which are to be transferred to said tube,
(c) a movable member in said hopper that can move coins, within said hopper, toward said tube,
(d) a source of power to move said movable member and thereby move coins, within said hopper, toward said tube,
(e) said member moving coins upwardly to permit those coins to enter the upper part of said tube and then pass downwardly in said tube,
(f) said member being substantially as wide as said hopper to keep coins from coming to rest on the bottom of said hopper alongside said member,
(g) a level-sensing device adjacent said tube,
(h) a mechanical connection between said source of power and said level-sensing device that enables said source of power to move said level-sensing device relative to said tube,
(i) a mechanical clutch that can selectively connect said movable member to said source of power, and
(j) a mechanical connection between said level-sensing device and said mechanical clutch,
(k) said level-sensing device being disposed outwardly of said tube during a portion of each cycle of operation of said coin-handling device but being urged inwardly of said tube during another portion of said cycle,
(l) said level-sensing device responding to the presence of a predetermined number of coins within said tube to remain substantially outwardly of said tube during said other portion of said cycle,
(m) said mechanical connection between said level-sensing device and said mechanical clutch keeping said mechanical clutch from interconnecting said source of power and said movable member when said level-sensing device engages a coin during said other portion of said cycle and is thus forced to remain substantially outwardly of said tube, (n) said mechanical connection between said level-sensing device and said mechanical clutch permitting said mechanical clutch to interconnect said source of power and said movable member when said level-sensing device fails to engage a coin in said tube during said other portion of said cycle.

10. A coin-dispensing device which comprises:
(a) a tube that can hold coins to be dispensed by said coin-dispensing device,
(b) a hopper that is adjacent said tube and that can hold coins which are to be transferred to said tube,
(c) a movable member in said hopper that can move coins, within said hopper, toward said tube,
(d) a source of power to move said movable member and thereby move coins, within said hopper, toward said tube,
(e) said movable member being an endless belt which serves as part of the bottom of said hopper,
(f) said belt directly contacting coins in said hopper and coacting with the walls of said hopper to keep coins from coming to rest alongside said belt,
(g) a level-sensing device adjacent said tube,
(h) a mechanical connection between said source of power and said level-sensing device that enables said source of power to move said level-sensing device relative to said tube,
(i) a mechanical clutch that can selectively connect said movable member to said source of power,
(j) said level-sensing device being disposed outwardly of said tube during a portion of each cycle of operation of said coin-handling device but being urged inwardly of said tube during another portion of said cycle, and
(k) a mechanical connection between said level-sensing device and said mechanical clutch permitting said mechanical clutch to interconnect said source of power and said movable member when said level-sensing device fails to engage a coin in said tube.

11. A coin-dispensing device which comprises:
(a) a tube that can hold coins to be dispensed by said coin-dispensing device,
(b) a hopper that is adjacent said tube and that can hold coins which are to be transferred to said tube,
(c) a movable member in said hopper that can move coins, within said hopper, toward said tube,
(d) a source of power to move said movable member and thereby move coins, within said hopper, toward said tube,
(e) said hopper having a portion of the bottom thereof inclining upwardly toward the upper part of said tube,
(f) said member moving coins relative to said portion of said bottom of said hopper and thereby moving said coins upwardly to permit those coins to enter the upper part of said tube and then pass downwardly in said tube,
(g) said member being open in nature and permitting coins thereon to abut each other as those coins rest upon and are moved by said member,
(h) a level-sensing device adjacent said tube,
(i) a mechanical clutch that can selectively connect said movable member to said source of power, and
(j) a mechanical connection between said level-sensing device and said mechanical clutch,
(k) said mechanical connection between said level-sensing device and said mechanical clutch including a blocking surface on said level-sensing device that selectively blocks and frees a surface movable with said mechanical clutch,
(l) said mechanical connection between said level-sensing device and said mechanical clutch keeping said mechanical clutch from interconnecting said source of power and said movable member when said level-sensing device engages a coin in said tube,
(m) said mechanical connection between said level-sensing device and said mechanical clutch permitting said mechanical clutch to interconnect said source of power and said movable member when said level-sensing device fails to engage a coin in said tube.

12. A coin-dispensing device which comprises:
(a) a tube that can hold coins to be dispensed by said coin-dispensing device,
(b) a hopper that is adjacent said tube and that can hold coins which are to be transferred to said tube,
(c) a support that holds said tube and also holds pivot for said hopper,
(d) said support normally holding said tube close enough to said hopper to force coins issuing from said hopper to pass to said tube,
(e) said tube being removable,
(f) a movable member in said hopper that can move coins, within said hopper, toward said tube, and
(g) a source of power to move said movable member and thereby move coins, within said hopper, toward said tube,
(h) said hopper being rotatable about said pivot from its normal position wherein it can hold coins to rotated position wherein it can release coins.

13. A coin-dispensing device which comprises:
(a) a tube that can hold coins to be dispensed by said coin-dispensing device,
(b) a hopper that is adjacent said tube and that can hold coins which are to be transferred to said tube,
(c) a movable belt in said hopper that can move coins within said hopper, toward said tube,
(d) a source of power to move said movable belt and thereby move coins, within said hopper, toward said tube, and
(e) a member that raises a portion of said belt to force coins disposed above said portion of said belt to move relative to each other,
(f) said member being mounted adjacent said hopper and adjacent said belt and being movable relative to said hopper and relative to said portion of said belt,
(g) said member responding to said source of power to recurrently engage and raise said portion of said belt.

14. A coin-dispensing device which comprises:
(a) a tube that can hold coins to be dispensed by said coin-dispensing device,
(b) a hopper that is adjacent said tube and that can hold coins which are to be transferred to said tube,
(c) a movable belt in said hopper that can move coins within said hopper, toward said tube,
(d) a source of power to move said movable belt and thereby move coins, within said hopper, toward said tube, and
(e) a member that can apply sharp, upwardly-directed blows to a portion of said belt to force coins disposed above said portion of said belt to move relative to each other,
(f) said member being mounted adjacent said hopper and adjacent said belt and being movable relative to said hopper and relative to said portion of said belt,
(g) said member responding to said source of power to recurrently engage and apply sharp, upwardly directed blows to said portion of said belt.

15. A coin-dispensing device which comprises:
(a) a tube that can hold coins to be dispensed by said coin-dispensing device,
(b) a hopper that is adjacent said tube and that can hold coins which are to be transferred to said tube,
(c) a movable belt in said hopper that can move coins within said hopper, toward said tube,
(d) a source of power to move said movable belt and thereby move coins, within said hopper, toward said tube, and
(e) a member that can apply sharp, upwardly-directed blows to said belt adjacent one edge of said belt to force coins disposed above said one edge of said belt to move relative to each other, (f) said member permitting the opposite edge of said belt to remain sufficiently quiet to enable said opposite edge of said belt to move coins toward said tube despite the application of said sharp, upwardly-directed blows to said belt adjacent said one edge of said belt, (g) said member being mounted adjacent said hopper and adjacent said belt and being movable relative to said hopper and relative to said portion of said belt, (h) said member responding to said source of power to recurrently engage and apply sharp, upwardly-directed blows to said belt adjacent said one side of said belt.

16. A coin-dispensing device which comprises:
(a) a tube that can hold coins to be dispensed by said coin-dispensing device,
(b) a hopper that is adjacent said tube and that can hold coins which are to be transferred to said tube,
(c) a movable belt in said hopper that can move coins, within said hopper, toward said tube,
(d) a source of power to move said movable belt and thereby move coins, within said hopper, toward said tube, and
(e) an eccentric that underlies the upper face of said belt and that selectively raises a portion of said belt to force coins disposed above said portion of said belt to move relative to each other,
(f) said eccentric being mounted adjacent said hopper and adjacent said belt and being movable relative to said hopper to recurrently engage and raise said portion of said belt,
(g) said eccentric responding to said source of power to recurrently engage and raise said portion of said belt.

17. A coin-dispensing device which comprises:
(a) a tube that can hold coins to be dispensed by said coin-dispensing device,
(b) a hopper that is adjacent said tube and that can hold coins which are to be transferred to said tube,
(c) a movable belt in said hopper that can move coins, within said hopper, toward said tube,
(d) a source of power to move said movable belt and thereby move coins, within said hopper, toward said tube, and
(e) an eccentric roller that underlies and helps support the upper face of said belt,
(f) said eccentric roller responding to rotation thereof to raise a portion of said belt to force coins disposed above said portion of said belt to move relative to each other.

18. A coin-dispensing device which comprises:
(a) a tube that can hold coins to be dispensed by said coin-dispensing device,
(b) a hopper that is adjacent said tube and that can hold coins which are to be transferred to said tube,
(c) a movable belt in said hopper that can move coins, within said hopper, toward said tube,
(d) a source of power to move said movable belt and thereby move coins, within said hopper, toward said tube, and
(e) an eccentric roller that underlies and helps support the upper face of said belt,
(f) said eccentric roller responding to rotation thereof to raise a portion of said belt to force coins disposed above said portion of said belt to move relative to each other,
(g) said eccentric roller being driven by said belt as said belt moves relative to said hopper.

19. A coin-dispensing device which comprises:
(a) a tube that can hold coins to be dispensed by said coin-dispensing device,
(b) a hopper that is adjacent said tube and that can hold coins which are to be transferred to said tube,
(c) a movable belt in said hopper that can move coins, within said hopper, toward said tube,
(d) a source of power to move said movable belt and thereby move coins, within said hopper, toward said tube,
(e) a member that can apply sharp, upwardly-directed blows to a portion of said belt to force coins disposed above said portion of said belt to move relative to each other, and
(f) a spring that can have energy stored therein and that can suddenly apply that energy to said member to cause said member to apply said sharp, upwardly-directed blows to said portion of said belt,
(g) said member being mounted adjacent said hopper and adjacent said belt and being movable relative to said hopper to recurrently engage said belt and apply sharp, upwardly-directed blows to said portion of said belt,
(h) said source of power storing energy in said spring so said spring can suddenly apply that energy to said member.

20. A coin-dispensing device which comprises:
(a) a tube that can hold coins to be dispensed by said coin-dispensing device,
(b) a hopper that is adjacent said tube and that can hold coins which are to be transferred to said tube,
(c) a movable member in said hopper that can move coins, within said hopper, toward said tube,
(d) a source of power to move said movable member and thereby move coins, within said hopper, toward said tube,
(e) said hopper having an area into which coins tend to gravitate and in which said coins can be held until said movable member can move said coins toward said tube, and
(f) an agitator that has a portion which can extend a short distance into the lower part of said area to engage coins that are resting upon or are adjacent to the bottom of said hopper in said lower part of said area,
(g) said agitator being movable transversely of said bottom of said hopper and being movable relative to said movable member and being adapted to strike said coins sharply enough to throw said coins upwardly and away from said bottom of said hopper.

21. A coin-dispensing device which comprises:
(a) a tube that can hold coins to be dispensed by said coin-dispensing device,
(b) a hopper that is adjacent said tube and that can hold coins which are to be transferred to said tube,
(c) a movable member in said hopper that can move coins, within said hopper, toward said tube,
(d) a source of power to move said movable member and thereby move coins, within said hopper, toward said tube,
(e) said hopper having an area into which coins tend to gravitate and in which said coins can be held until said movable member can move said coins toward said tube,
(f) an agitator that has a portion which can extend into said area to engage coins that are resting upon or are adjacent to the bottom of said hopper, and
(g) a spring that is adjacent said agitator, that can engage said agitator, that can store energy, and that can use that energy to cause said agitator to apply sharp blows to coins in said area,
(h) said agitator being movable transveresly of said bottom of said hopper and being movable relative to said movable member,
(i) said source of power storing energy in said spring so said spring can cause said agitator to apply sharp blows to coins in said area and thereby cause coins in said area to move upwardly and away from said bottom of said hopper.

22. A coin-dispensing device which comprises:
  (a) a tube that can hold coins to be dispensed by said coin-dispensing device,
  (b) a hopper that is adjacent said tube and that can hold coins which are to be transferred to said tube,
  (c) a movable member in said hopper that can move coins, within said hopper, toward said tube,
  (d) a source of power to move said movable member and thereby move coins, within said hopper, toward said tube,
  (e) a pivot, and
  (f) a gate that is rotatably mounted on said pivot and that has a portion which extends toward the path of coins moved by said movable member,
  (g) said gate being adapted to keep superimposed coins from passing to said tube,
  (h) said portion of said gate being eccentric of said pivot and coacting with said movable member to subtend an obtuse angle,
  (i) said gate being yieldably mounted so it can bodily move upwardly and away from said path rather than be jammed by coins moved by said movable member.

23. A coin-dispensing device which comprises:
  (a) a tube that can hold coins to be dispensed by said coin-dispensing device, and
  (b) a funnel at the upper end of said tube,
  (c) said funnel having vertical spaced and horizontally displaced coin-guiding surfaces therein,
  (d) the uppermost of said coin-guiding surfaces being adapted to intercept and momentarily hold one of a pair of coins that enter said funnel in side-by-side relation,
  (e) the lowermost of said coin-guiding surfaces being adapted to direct the other of said pair of coins toward said tube before said one coin reaches the level of said lowermost of said coin-guiding surfaces, whereby said coins can pass successively to said tube rather than bridge over said tube,
  (f) both of said coin-guiding surfaces being immediately adjacent said tube so a coin can simultaneously have one portion thereof disposed within said tube and another portion thereof engaging either of said coin-guiding surfaces.

24. A coin-handling device which comprises:
  (a) a tube that can receive and hold coins, and
  (b) a funnel at the upper end of said tube,
  (c) said funnel having vertically spaced and horizontally displaced coin-guiding surfaces therein,
  (d) the uppermost of said coin-guiding surfaces being adapted to intercept and momentarily hold one of a pair of coins that enter said funnel in side-by-side relation,
  (e) the lowermost of said coin-guiding surfaces being adapted to direct the other of said pair of coins toward said tube before said one coin reaches the level of said lowermost of said coin-guiding surfaces, whereby said coins can pass successively to said tube rather than bridge over said tube,
  (f) said coin-guiding surfaces inclining toward said coin tube at different angles,
  (g) both of said coin-guiding surfaces being immediately adjacent said tube so a coin can simultaneously have one portion thereof disposed within said tube and another portion thereof engaging either of said coin-guiding surfaces.

25. A coin-handling device which comprises:
  (a) a tube that can receive and hold coins,
  (b) a hopper that is adjacent said tube and that can hold coins which are to be transferred to said tube,
  (c) a movable member that can move coins, within said hopper, toward said tube,
  (d) a source of power to move said movable member and thereby move coins, within said hopper, toward said tube, and
  (e) a funnel at the upper end of said tube,
  (f) said funnel having vertically spaced and horizontally displaced coin-guiding surfaces therein,
  (g) the uppermost of said coin-guiding surfaces being adapted to intercept and momentarily hold one of pair of coins that enter said funnel in side-by-side relation,
  (h) the lowermost of said coin-guiding surfaces being adapted to direct the other of said pair of coins toward said tube before said one coin reaches the level of said lowermost of said coin-guiding surfaces whereby said coins can pass successively to said tube rather than bridge over said tube,
  (i) both of said coin-guiding surfaces being immediately adjacent said tube so a coin can simultaneously have one portion thereof disposed within said tube and another portion thereof engaging either of said coin-guiding surfaces.

26. A coin-handling device which comprises:
  (a) a support for said coin-handling device,
  (b) a tube that can be rigidly secured to said support to be held stationary and that can receive and hold coins,
  (c) a tapper that is mounted adjacent said tube, that is movable transversely of the axis of said tube, and that can tap said tube to urge coins within said tube to assume their proper positions, and
  (d) a source of power that can cause said tapper to recurrently tap said tube.

27. A coin-handling device which comprises:
  (a) a support for said coin-handling device,
  (b) a tube that can be rigidly secured to said support to be held stationary and that can receive and hold coins,
  (c) a hopper that is stationary during normal operation of said coin-handling device, that is adjacent said tube, and that can hold coins which are to be transferred to said tube,
  (d) a movable member that can move coins, within said hopper, toward said tube,
  (e) a source of power to move said movable member and thereby move coins, within said hopper, toward said tube, and
  (f) a tapper that is mounted adjacent said tube, that is movable transversely of the axis of said tube, and that can tap said tube to urge coins within said tube to assume their proper positions,
  (g) said source of power causing said tapper to recurrently tap said tube.

28. In a coin-dispensing device:
  (a) a tube that can hold coins to be dispensed by said coin-dispensing device,
  (b) a coin ejector that is mounted adjacent said tube and that can eject coins from said tube, and
  (c) a cam that is mounted adjacent said tube and that can cause movement of said coin ejector,
  (d) said cam having a plurality of lobe-forming plates,
  (e) said cam and said lobe-forming plates having interacting surfaces that can hold said lobe-forming plates in desired angular positions,
  (f) said cam having a threaded portion and a nut which normally hold said lobe-forming plates fixed relative to said cam but which can be loosened to permit said lobe-forming plates to be moved both axially and circumferentially while said nut is still in engagement with said threaded portion.

29. In a coin-dispensing device:
  (a) a tube that can hold coins to be dispensed by said coin-dispensing device,
  (b) a coin ejector that is mounted adjacent said tube and that can eject coins from said tube, and
  (c) a cam that is mounted adjacent said tube and that can cause movement of said coin ejector,
  (d) said cam having a hub with recesses therein,
  (e) said cam having a plurality of lobe-forming plates, (f) said lobe-forming plates having abutments and recesses thereon, (g) said abutments on said lobe-forming plates coacting with said recesses of said cam and of said lobe-forming plates to selectively hold said lobe-forming plates in desired angular positions, (h) said cam having a threaded portion and a nut which normally hold said lobe-forming plates fixed relative to said cam but which can be loosened to permit said lobe-forming plates to be moved both axially and circumferentially while said nut is still in engagement with said threaded portion.

30. In a coin-handling device:
(a) a support for said coin-handling device,
(b) a tube that can be rigidly secured to said support to be held stationary and that can receive and hold coins,
(c) a hopper that is stationary during normal operation of said coin-handling device and that can hold coins which are to be transferred to said tube,
(d) a movable member that can move coins from said hopper to said tube, and
(e) a tapper that is movable transversely of the axis of said tube and that can tap said tube to help coins within said tube assume their proper positions within said tube,
(f) said tapper tapping said tube after the time when said movable member can start moving coins from said hopper to said tube.

31. In a coin-dispensing device:
(a) a tube that can hold coins to be dispensed by said coin-dispensing device,
(b) a coin ejector that is mounted adjacent said tube and that can eject coins from said tube, and
(c) a cam that is mounted adjacent said tube and that can cause movement of said coin ejector,
(d) said cam having a plurality of lobe-forming plates,
(e) said cam and said lobe-forming plates having interacting surfaces that can hold said lobe-forming plates in desired angular positions,
(f) said cam having a securing member that can hold said lobe-forming plates fixed relative to said cam and that can selectively free said lobe-forming plates for movement relative to said cam.

32. A coin-handling device that comprises:
(a) a tube that can receive and hold coins,
(b) a hopper that can hold coins to be transferred to said tube,
(c) said hopper having a bottom wall that inclines forwardly and upwardly toward the front of said hopper,
(d) pulleys mounted adjacent said bottom wall,
(e) an endless belt that is supported by said pulleys and that has the upper surface thereof overlying said bottom wall,
(f) a source of power,
(g) a mechanical clutch that can selectively connect at least one of said pulleys to said source of power and thereby cause said pulleys and said belt to advance coins toward said tube,
(h) a level-sensing device for said tube that can sense the level of coins adjacent the upper end of said tube,
(i) a mechanical connection between said source of power and said level-sensing device that enables said source of power to move said level-sensing device relative to said tube, and
(j) a mechanical connection between said level-sensing device and said mechanical clutch,
(k) said mechanical connection between said level-sensing device and said source of power causing said level-sensing device to feel for coins in said tube during part of each cycle of operation of said coin-handling device,
(l) said mechanical connection between said level-sensing device and said mechanical clutch keeping said mechanical clutch from interconnecting said source of power and said one pulley when said level-sensing device engages a coin within said tube,
(m) said clutch and said level-sensing device and said mechanical connection between said level-sensing device and said clutch coacting to cause said pulleys and said belt to advance coins toward said tube whenever said level-sensing device fails to sense coins in said tube.

33. A coin-handling device that comprises:
(a) a tube that can receive and hold coins,
(b) a hopper that can hold coins to be transferred to said tube,
(c) a belt that is movable to transport coins from said hopper to said tube,
(d) a source of power,
(e) means including a mechanical clutch to selectively enable said source of power to cause said belt to transport coins toward said tube,
(f) a level-sensing device for said tube that can sense the level of coins in said tube,
(g) mechanical means, connecting said level-sensing device to said source of power, that enables said source of power to move said level-sensing device relative to said tube,
(h) said mechanical means between said level-sensing device and said source of power causing said level-sensing device to feel for coins in said tube during part of each cycle of operation of said coin-handling device,
(i) a mechanical connection between said level-sensing device and said mechanical clutch,
(j) said means and said level-sensing device and said mechanical connection between said level-sensing device and said clutch coacting to cause said belt to transport coins toward said tube whenever said level-sensing device fails to sense coins in said tube.

34. In a coin-handling device which has a tube that can receive and hold coins, a hopper that can hold coins to be transferred to said tube, a member that can move coins within said hopper toward said tube, and a source of power to cause said member to move coins within said hopper toward said tube, the improvement which comprises:
(a) level-sensing means adjacent said tube for sensing the level of coins within said tube,
(b) mechanical means, connecting said level-sensing means to said source of power, that enables said source of power to move said level-sensing means relative to said tube,
(c) said mechanical means between said level-sensing means and said source of power causing said level-sensing means to feel for coins in said tube during part of each cycle of operation of said coin-handling device,
(d) mechinical clutch means to selectively connect said source of power to said member,
(e) a mechanical connection between said level-sensing means and said mechanical clutch means,
(f) said level-sensing means normally sensing coins within said tube and responding to such coins to act through said mechanical connection between said level-sensing means and said mechanical clutch means to cause said mechanical clutch means to enable said said source of power to permit said member to leave the coins in said hopper at rest, thereby avoiding needless wearing of said coins within said hopper, and
(g) said level-sensing means, whenever it fails to sense coins within said tube, acting through said mechanical connection between said level-sensing means and said mechanical clutch means to cause said mechanical clutch means to enable said source of power to cause said member to move coins within said hopper toward said tube.

35. In a coin-dispensing device which has a tube that can hold coins to be dispensed, a hopper that can hold coins to be transferred to said tube, a member that can move coins within said hopper toward said tube, and a source of power to cause said member to move coins within said hopper toward said tube, the improvement which comprises:
  (a) said member having a portion thereof that is disposed within said hopper and that underlies coins within said hopper and that is movable sideways in said hopper to carry coins toward said tube,
  (b) said portion of said member having an upper surface which is generally planar in cross section to permit coins to lie flat thereon and to abut each other as said portion of said member moves sideways is said hoppor to carry coins toward said tube,
  (c) said portion of said member moving coins within said hopper along an upwardly inclined path as it carries those coins toward said tube,
  (d) said hopper having a width less than twice the diameter of said tube, and
  (e) said portion of said member having a width substantially equal to the width of said hopper, whereby two of said coins cannot be transferred by said portion of said member from said hopper to said tube in side-by-side relation.

36. In a coin-dispensing device which has a tube that can hold coins to be dispensed, a hopper that can hold coins to be transferred to said tube, a member that can move coins within said hopper toward said tube, and a source of power to cause said member to move coins within said hopper toward said tube, the improvement which comprises:
  (a) said member having a portion thereof that is disposed within said hopper and that underlines coins within said hopper and that is movable sideways in said hopper to carry coins toward said tube,
  (b) said hopper having a portion of the bottom thereof inclined upwardly toward the upper part of said tube,
  (c) said hopper having a second portion of the bottom thereof inclined downwardly toward the lower end of the first said portion of said bottom,
  (d) said second portion of said bottom of said hopper urging coins, within said hopper, toward said lower end of the first said portion of said bottom,
  (e) said portion of said member being movable sideways in said hopper along the first said portion of said bottom to carry coins along an upwardly inclined path to cause those coins to enter the upper part of said tube and then pass downwardly in said tube,
  (f) said portion of said member having an upper surface that is generally planar in cross section so coins can lie flat thereon as said portion of said member moves sidewardly in said hopper to carry said coins toward said tube,
  (g) a level-sensing device adjacent said tube,
  (h) a mechanical connection between said source of power and said level-sensing device that enables said source of power to move said level-sensing device relative to said tube,
  (i) a mechanical clutch that can inter-connect said source of power to said member, and
  (j) a mechanical connection between said level-sensing device and said mechanical clutch,
  (k) said mechanical connection between said level-sensing device and said mechanical clutch keeping said mechanical clutch from interconnecting said source of power and said one pulley when said level-sensing device engages a coin in said tube,
  (l) said mechanical connection between said level-sensing device and said mechanical clutch permitting said mechanical clutch to interconnect said source of power and said member when said level-sensing device fails to engage a coin in said tube.

37. In a coin-dispensing device which has a tube that can hold coins to be dispensed, a hopper that can hold coins to be transferred to said tube, a member that can move coins within said hopper toward said tube, and a source of power to cause said member to move coins within said hopper toward said tube, the improvement which comprises:
  (a) said hopper having a portion of the bottom thereof inclining upwardly toward the upper part of said tube,
  (b) said hopper having walls, immediately adjacent said portion of the bottom thereof, which are substantially vertical,
  (c) said member having a portion thereof substantially coextensive with said portion of said bottom and coacting with said substantially vertical walls to cause substantially all coins in vertical registry with said portion of said bottom to overlie, and be supported by, said portion of said member,
  (d) said portion of said member being movable sideways in said hopper to carry coins along said portion of said bottom toward said tube,
  (e) mechanical clutch means that can selectively interconnect said source of power and said member to cause said member to move coins within said hopper toward said tube, and
  (f) level-responsive means adjacent said tube,
  (g) said level-responsive means holding said mechanical clutch means inactive, and thereby permitting said member to be at rest, whenever said level-responsive means senses a coin within said tube,
  (h) said mechanical clutch means acting, whenever said level-responsive means fails to sense a coin within said tube, to interconnect said source of power to said member and thereby cause said member to move coins within said hopper toward said tube.

38. In a coin-dispensing device which has a tube that can hold coins to be dispensed, a hopper that can hold coins to be transferred to said tube, a member that can move coins within said hopper toward said tube, and a source of power to cause said member to move coins within said hopper toward said tube, the improvement which comprises:
  (a) said hopper having a portion of the bottom thereof inclining upwardly toward the upper part of said tube,
  (b) said hopper having walls, immediately adjacent said portion of the bottom thereof, which are substantially vertical,
  (c) said member having a portion thereof substantially coextensive with said portion of said bottom and coacting with said substantially vertical walls to cause substantially all coins in vertical registry with said portion of said bottom to overlie, and be supported by, said portion of said member,
  (d) said portion of said member being movable sideways in said hopper to carry coins along said portion of said bottom toward said tube,
  (e) said member being an endless belt,
  (f) said portion of said member being the upper surface of said endless belt,
  (g) said portion of said bottom underlying said upper surface of said endless belt to help said upper surface of said endless belt support the coins that overlie and that are supported by said upper surface of said endless belt,
  (h) mechanical clutch means that can selectively interconnect said source of power to said member to cause said member to move coins within said hopper toward said tube,
  (i) said mechanical clutch means normally being held inactive by a blocking surface so said source of power normally is not connected to said member,
  (j) said blocking surface selectively freeing said mechanical clutch means to enable said clutch means to interconnect said source of power and said member to cause said member to move coins through said hopper toward said tube.

39. In a coin-dispensing device which has a tube that can hold coins to be dispensed, a hopper that can hold coins to be transferred to said tube, a member that can move coins within said hopper toward one end of said hopper and thus toward said tube, and a source of power to cause said member to move coins within said hopper toward said one end of said hopper and thus toward said tube, the improvement which comprises:
(a) a pivot that is adjacent said tube and that rotatably supports said one end of said hopper and that holds said one end of said hopper adjacent said tube,
(b) said hopper normally being in position to hold coins therein,
(c) said hopper being selectively rotatable about said pivot from its normal position to a rotated position wherein the coins therein cannot rest in said hopper and, instead, must fall downwardly toward the level of said pivot,
(d) said tube being readily removable from its position adjacent said pivot and said one end of said hopper to facilitate rotation of said hopper from its normal position to its rotated position.

40. In a coin-dispensing device which has a tube that can hold coins to be dispensed, a hopper that can hold coins to be transferred to said tube, a member that can move coins within said hopper toward said tube, and a source of power to cause said member to move coins within said hopper toward said tube, the improvement which comprises:
(a) said member being a belt that has a portion thereof disposed within said hopper which underlies coins within said hopper and which is movable sideways within said hopper to carry coins toward said tube,
(b) level-sensing means adjacent said tube for sensing the level of coins within said tube,
(c) said level-sensing means normally sensing coins within said tube and responding to such coins to enable said source of power to permit said belt to leave the coins in said hopper at rest, thereby avoiding needless movement of said belt, and
(d) said level-sensing means, whenever it fails to sense coins within said tube, enabling said source of power to cause said belt to move and thereby cause said portion of said belt to carry coins within said hopper toward said tube,
(e) a mechanical clutch means that can selectively interconnect said source of power with said member,
(f) a mechanical connection between said source of power and said level-sensing means to cause said level-sensing means to move relative to said tube during each cycle of operation of said coin-dispensing device, and
(g) a mechanical connection between said level-sensing means and said mechanical clutch means,
(h) said connection between said source of power and said level-sensing means effecting the withdrawal of said level-sensing means from said tube during a portion of each cycle of operation of said coin-dispensing device so coins can freely move downwardly within said tube,
(i) said connection between said source of power and said level-sensing means enabling said level-sensing means to be urged inwardly of said tube during another portion of each cycle of operation of said coin-dispensing device,
(j) said level-sensing means remaining outwardly of said tube in the event said level-sensing means engages and is held by a coin within said tube,
(k) said connection between said level-sensing means and said mechanical clutch means permitting said mechanical clutch means to interconnect said source of power and said member only when said level-sensing means is moved inwardly of said tube.

41. In a coin-dispensing device which has a tube that can hold coins to be dispensed, a hopper that can hold coins to be transferred to said tube, a member that can move coins within said hopper toward said tube, and a source of power to cause said member to move coins within said hopper toward said tube, the improvement which comprises:
(a) said hopper having an area into which coins tend to gravitate and in which said coins can be held until said movable member can move said coins toward said tube,
(b) agitating means which has a portion thereof that can extend into said area, that is movable transversely of the bottom of said hopper, and that can throw coins upwardly and away from said bottom of said hopper, and
(c) coin-intercepting means disposed within said hopper above the level of said agitating means but below the level of the top of said hopper,
(d) said coin-intercepting means being adapted to intercept coins which are thrown upwardly and away from said bottom of said hopper by said agitating means, and thereby keep said coins from being thrown out of said hopper.

42. In a coin-dispensing device which has a tube that can hold coins to be dispensed, a hopper than can hold coins to be transferred to said tube, a member that can move coins within said hopper toward said tube, and a source of power to cause said member to move coins within said hopper toward said tube, the improvement which comprises:
(a) said hopper having an area into which coins tend to gravitate,
(b) agitating means which has a portion thereof that can extend into said area and that can throw coins, and
(c) coin-intercepting means disposed within said hopper above the level of said agitating means but below the level of the top of said hopper,
(d) said coin-intercepting means being adapted to intercept coins which are thrown by said agitating means, and thereby keep said coins from being thrown out of said hopper,
(e) said coin-interrupting means being biased toward said area of said hopper but being adapted to respond to a thrown coin which strikes it to move upwardly away from said area of said hopper,
(f) the upward movement of said coin-intercepting means, as said coin-intercepting means is struck and moved by a coin, absorbing energy from said coin.

43. In a coin-dispensing device which has a tube that can hold coins to be dispensed, a hopper that can hold coins to be transferred to said tube, a member that can move coins within said hopper toward said tube, and a source of power to cause said member to move coins within said hopper toward said tube, the improvement which comprises:
(a) said member having a portion thereof that is disposed within said hopper and that underlies coins within said hopper and that is movable sideways in said hopper to carry coins toward said tube,
(b) said hopper having a V-shaped bottom and having vertical sides abutting one side of said V-shaped bottom,
(c) said portion of said member extending into said V-shaped bottom of said hopper and overlying said one side of said V-shaped bottom,
(d) said V-shaped bottom of said hopper urging coins in said hopper to gravitate toward the lowermost area of said bottom,
(e) said portion of said member having the sides thereof closely adjacent said vertical sides of said hopper, and said portion of said member being substantially coextensive with said one side of said V-shaped bottom to keep coins from coming to rest alongside said portion of said member,
(f) said portion of said member underlying coins which are in vertical registry with, and which overlie, said one side of said V-shaped bottom and moving sideways to carry said coins upwardly along an inclined path from said lowermost area toward said tube to cause said coins to pass into said tube,
(g) level-sensing means adjacent said tube that can sense for the presence of coins within said tube,
(h) mechanical clutch means that can selectively interconnect said source of power with said member to move coins toward said tube, and
(i) a mechanical connection between said level-sensing means and said mechanical clutch means,
(j) said level-sensing means and said mechanical connection between said level-sensing means and said mechanical clutch means keeping said mechanical clutch means from interconnecting said source of power to said member whenever said level-sensing means engages and is held by a coin within said tube,
(k) said level-sensing means and said mechanical connection between said level-sensing means and said mechanical clutch means enabling said mechanical clutch means to interconnect said member and said source of power whenever said level-sensing means moves inwardly of said tube,
(l) said mechanical connection between said level-sensing means and said mechanical clutch means including a blocking surface on said level-sensing means and a surface on said mechanical clutch means which is selectively intercepted or released by said blocking means on said level-sensing means,
(m) said blocking surface on said level-sensing means moving out of the path of said surface on said mechanical clutch means whenever said level-sensing means does not engage a coin within said coin reservoir.

44. In a coin-dispensing device which has a tube that can hold coins to be dispensed, a hopper that can hold coins to be transferred to said tube, a member that can move coins within said hopper toward said tube, and a source of power to cause said member to move coins within said hopper toward said tube, the improvement which comprises:
(a) gate means mounted adjacent said hopper and extending toward said member and thus extending toward the path of coins moved by said member towards said tube,
(b) said gate means being spaced away from said member to permit single coins to pass under said gate means and into said tube,
(c) said gate means being adapted to keep superimposed coins from passing into said tube,
(d) said member recurrently moving superimposed coins up to said gate means, and said gate means keeping said superimposed coins from passing to said tube while permitting single coins to pass into said tube,
(e) level-sensing means adjacent said tube that can sense for the presence of coins within said tube,
(f) mechanical clutch means that can selectively interconnected said source of power with said member to move coins toward said tube, and
(g) a mechanical connection between said level-sensing means and said mechanical clutch means,
(h) said level-sensing means and said mechanical connection between said level-sensing means and said mechanical clutch means keeping said mechanical clutch means from interconnecting said source of power to said member whenever said level-sensing means engages and is held by a coin within said tube,
(i) said level-sensing means and said mechanical connection between said level-sensing means and said mechanical clutch means enabling said mechanical clutch means to interconnect said member and said source of power whenever said level-sensing means moves inwardly of said tube.

45. In a coin-dispensing device which has a tube that can hold coins to be dispensed, a hopper than can hold coins to be transferred to said tube, a member that can move coins within said hopper toward said tube, and a source of power to cause said member to move coins within said hopper toward said tube, the improvement which comprises:
(a) a level-sensing means for said tube that can sense the level of coins within said tube and that can, whenever it fails to sense coins within said tube, enable said source of power to cause said member to move coins within said hopper towards said tube,
(b) said source of power and said level-sensing device coacting to permit said member to be inactive whenever said sensing member senses coins in said tube, and coacting to cause said member to move coins toward said tube whenever said level-sensing means fails to sense coins in said tube,
(c) said level-sensing means sensing for coins in said tube during the early part of each cycle of operation of said coin-dispensing device, whereby said level-sensing means and said source of power are adapted to cause said member to start moving coins toward said tube during the early part of a given cycle of operation of said coin-dispensing device,
(d) said level-sensing means and said source of power being adapted to cause said member to continue to move coins towards said tube during the rest of said given cycle of operation of said coin-dispensing device and during the early part of the next succeeding cycle of operation of said coin-dispensing device, and
(e) a connection between said level-sensing means and said source of power,
(f) said connection between said level-sensing means and said source of power forcing said level-sensing means to move relative to said tube during each cycle of operation of said coin-dispensing device,
(g) said connection between said level-sensing means and said source of power normally holding said level-sensing means out of said tube but acting during one portion of each cycle of operation of said coin-dispensing device to urge said level-sensing device into said tube,
(h) said connection between said source of power and said level-sensing means including a lost-motion device, whereby said connection between said source of power and said level-sensing device will not be broken in the event said level-sensing device engages and is held by a coin within said tube.

46. In a coin-dispensing device which has a tube that can hold coins to be dispensed, a hopper that can hold coins to be transferred to said tube, a member that can move coins within said hopper toward said tube, and a source of power to cause said member to move coins within said hopper toward said tube, the improvement which comprises:
(a) a level-sensing means for said tube that can sense the level of coins within said tube and that can, whenever it fails to sense coins within said tube, enable said source of power to cause said member to move coins within said hopper towards said tube,
(b) said source of power and said level-sensing means coacting to permit said member to be inactive whenever said sensing means senses coins in said tube and coacting to cause said member to move coins toward said tube whenever said level-sensing means fails to sense coins in said tube, and (c) an empty feeler means that can sense the level of coins adjacent the lower end of said tube and that can, whenever it fails to sense coins, move into said tube to indicate that said tube is empty,
(d) said emtpy feeler means being disposed below the level of said level-sensing means, and
(e) a connection between said level-sensing means and said source of power,
(f) said connection between said level-sensing means and said source of power forcing said level-sensing means to move relative to said tube during each cycle of operation of said coin-dispensing device.

References Cited by the Examiner
UNITED STATES PATENTS

| | | | |
|---|---|---|---|
| 634,506 | 10/1899 | Scott | 133—8 |
| 844,308 | 2/1907 | Johnson | 133—8 |
| 2,557,181 | 6/1951 | Flack | 53—254 X |
| 2,709,880 | 6/1955 | Jorgensen | 53—254 X |
| 2,881,774 | 4/1959 | Labbe | 133—2 |
| 2,935,830 | 5/1960 | Collins et al. | 53—254 |

ROBERT B. REEVES, *Primary Examiner.*

STANLEY H. TOLLBERG, *Examiner.*